United States Patent [19]
Phillips et al.

[11] Patent Number: 5,321,828
[45] Date of Patent: Jun. 14, 1994

[54] HIGH SPEED MICROCOMPUTER IN-CIRCUIT EMULATOR

[75] Inventors: Michael D. Phillips, Santa Clara; Darrell L. Wilburn, Saratoga; Van T. Hua, San Jose; Gordon A. Minami, Palo Alto; Robert J. Kresge, Cupertino; Charles Verhaegh, Arkata, all of Calif.

[73] Assignee: Step Engineering, Sunnyvale, Calif.

[21] Appl. No.: 712,917

[22] Filed: Jun. 7, 1991

[51] Int. Cl.5 ............................................. G06F 11/30
[52] U.S. Cl. ................................ 395/500; 364/232.3; 364/264.3; 364/DIG. 1
[58] Field of Search ................. 395/375, 500; 371/16.2

[56] References Cited

U.S. PATENT DOCUMENTS

| | | | |
|---|---|---|---|
| 4,674,089 | 6/1987 | Poret et al. | 371/25 |
| 5,047,926 | 9/1991 | Kuo et al. | 395/500 |
| 5,053,949 | 10/1991 | Allison et al. | 395/375 |
| 5,056,013 | 10/1991 | Yamamoto | 395/500 |
| 5,132,971 | 7/1992 | Oguma et al. | 371/16.2 |

Primary Examiner—Robert B. Harrell
Assistant Examiner—Ayni Mohamed
Attorney, Agent, or Firm—Thomas E. Schatzel

[57] ABSTRACT

An in-circuit emulator (ICE) for hardware/software development and debugging microprocessors. Program execution reconstruction is extracted from an on-board cache memory. An external ICE enclosure interfaces to a target system microprocessor via a cable and a buffer/interface pod. A control program directs a non-intrusive emulation and a monitor program resides in a personal computer host and supports ICE commands. The monitor program allows a user to follow a target system's program flow, to capture related processor information, to make program modifications, and allows the user to restart programs. An on-line disassembler presents a display so as to allow the designer to examine memory, using instruction mnemonics rather than hexadecimal values, thus improving the designer's ability to read program memory. A bit trace buffer records the state of each the microprocessor's signals during each cycle of each instruction. Multiple breakpoints allow a system developer to control a program in ROM, as well as one resident in RAM. An external-range hardware breakpoint and up to sixteen software breakpoints are provided and these allow a designer to display, set and reset breakpoint addresses.

9 Claims, 7 Drawing Sheets

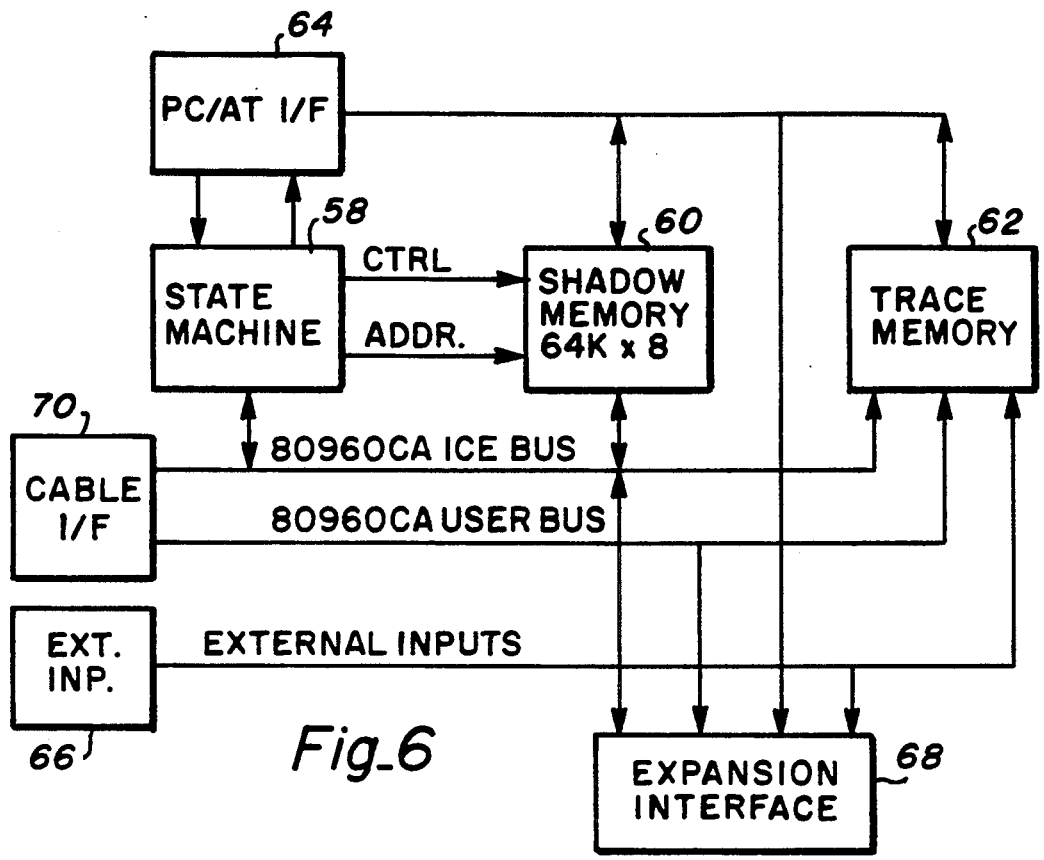
Fig_6
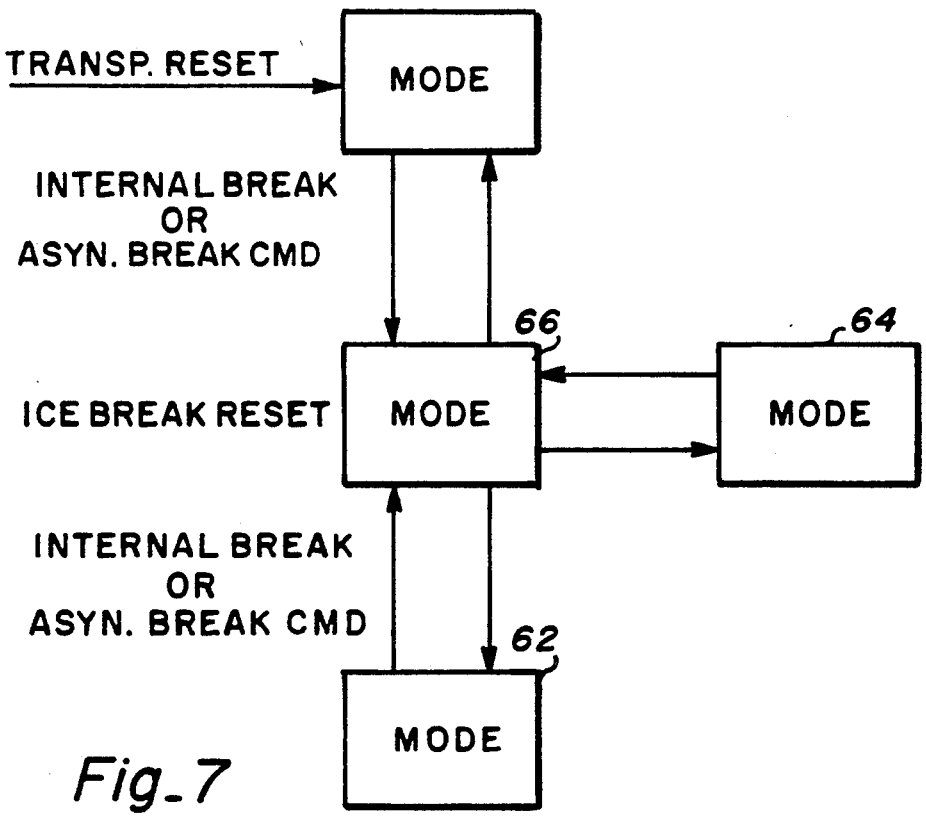
Fig_7

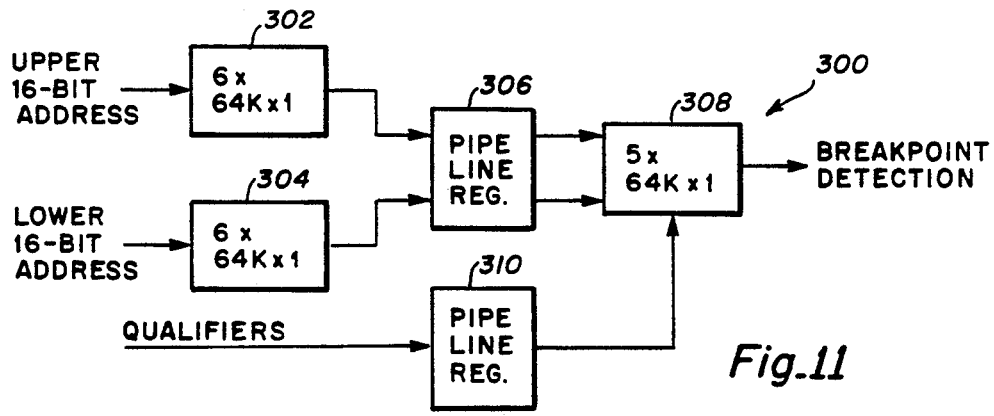
SDBUG TRACE SCREEN
Fig_10
Fig_11

HIGH SPEED MICROCOMPUTER IN-CIRCUIT EMULATOR

BACKGROUND THE INVENTION

1. Field the Invention

The invention relates generally to microcomputer systems and more particularly to instruments that enable the development and debugging of the hardware and software in target machines by the emulation and control of the target CPU within the target environment.

2. Description the Prior Art

In circuit emulation (ICE) of microcomputers for target system development is popular and well known in the microcomputer system industry. ICE development tools have been available for several years from Step Engineering (Sunnyvale, Calif.), Intel Corporation (Santa Clara, Calif.), Motorola Microsystems (Tempe, Ariz.), and others.

Microprocessor chips are complex devices requiring that both their hardware and software environments to be near perfect for proper operation. When a new microcomputer chip is first introduced, for example the i960 RISC processor by Intel or the 68040 CISC processor by Motorola, compatible hardware and software target environments do not exist and must be developed rapidly. This poses some difficulty because the timing is such that this coincides with a time when expertise in those particular environments is low. Since the chip is new, a very limited number of engineers have any direct experience with it. The job of designing a new system that uses the latest microprocessor is extremely difficult and often paces the ability of a manufacturer to compete effectively in its respective market. ICE system tools help get new designs off the ground by allowing incremental hardware and software development and a convenient cross-assembler and downloading mechanism for target object modules.

As the microprocessor art has advanced, clock speeds have become relatively faster and word widths wider. An early ICE from Intel, sold as the MDS ICE-85 in the late 1970s, had an eight-bit data width and a five-megahertz clock. In the 1990s, data widths of 32 bits are routine, and clock speeds around 50 MHz. Initially, target processors could be relocated in the ICE and attached to the target system via an umbilical of woven or twisted wires. When clock speeds got too high for this, the target processors were left in the target systems, and had adaptors that plugged between the target processor and the target system to intercept and/or sense key signals. These signals were then buffered by a buffer box located at the target end of a cable extending back to the main unit of the ICE. Most flat cables do not work well at high speeds and some attempts were made to use coaxial cables. But with over 100 signals to communicate, use of coax cables is not practical. A few systems use flexible printed circuits with buried ground planes to interconnect the main chassis of an ICE system umbilically to its target processor buffer box. These prior art systems suffer from poor mechanical and electrical transitions between the processor and the flex, the flex and the buffer box, and the flex between the main chassis and the buffer box.

Wider data and address widths have also caused a competition between data, address, and control signals and processor status for pinouts in the device package. System designers decoded these pins to track program execution in real-time. Internal cache memories have fundamentally obfuscated the visibility system designers once had into the internal operations of a microprocessor. For those reasons, microprocessor manufacturers have produced special "bond-out" chips that resemble the standard versions of their respective parts, but the bond-outs have special pins, and sometimes whole buses, that give a system developer some visibility into the internal workings of the processor (and inside the cache). The view, however, is not as clear as one would hope for, and special devices and programs are needed to decode and give meaning to the hints provided at the special bond-out interfaces.

SUMMARY THE PRESENT INVENTION

It is therefore an object of the present invention to provide an improved means to in-circuit emulate high speed microprocessors.

Briefly, a first embodiment of the present invention is an in-circuit emulator (ICE) that functions as a peripheral to an IBM PC/AT compatible personal computer (PC/AT). The ICE supports the Intel Corporation i960 CA RISC processor (i960 CA) operating to 25 MHz, alternatively the ICE supports operation to 33 MHz. The ICE has means to reconstruct program execution from the on-board cache memory of a i960 CA. An external ICE enclosure interfaces to a target processor via a thirty inch cable and buffer/interface pod. The interface connects to all the signal pins of the i960 CA processor and has high-speed buffers to minimize target loading. A control program directs a non-intrusive emulation and is able to operate at 25 MHz. A monitor program resides in the PC/AT host and supports more than 30 ICE commands. The monitor program is such that it allows a user to follow the target system's program flow, to capture related processor information, to make program modifications, and to be able to restart programs. An on-line i960 CA disassembler presents a display that allows the designer to examine memory, using instruction mnemonics rather than hexadecimal values, thus improving the designer's ability to read program memory. An 8K/32K×160-bit trace buffer records the state of each of the i960 CA's signals during each cycle of each instruction. This provides the designer with a detailed record of the target system's operation. Multiple breakpoints allow a system developer to control a program in ROM, as well as one resident in RAM. An external range hardware breakpoint and up to sixteen software breakpoints are provided and these allow a designer to display, set and reset breakpoint addresses. Alternative embodiments to the first embodiment have additional breakpoints beyond sixteen. Complex triggering and breakpoint capabilities are possible via a standard logic analyzer interface incorporated into the ICE. The ICE is compatible with "C" language tools developed by Intel, Microtec Research and other third-party vendors. An interface to both GNU and Microtec XRAY source-level debuggers can be included to enhance the usefulness.

An advantage of the present invention is that it provides accurate trace and disassembly of a target processor's program executions.

Another advantage of the present invention is that real-time trace data is reliably collected at target processor speeds that exceed 33 MHz.

Another advantage of the present invention is that the umbilical cable to the target system is a single continuous flexible circuit and is able to maintain good transmission line characteristics throughout.

These and other objects and advantages of the present invention will no doubt become obvious to those of ordinary skill in the art after having read the following detailed description of the embodiments which are illustrated in the various drawing figures.

IN THE DRAWINGS

FIG. 6 is a block diagram of the pod interface within the main system enclosure of the ICE of FIG. 1;

FIG. 7 is a flowchart of the interrelationships among various operational modes the ICE of FIG. 1;

FIG. 10 is a typical screen presented on the PC/AT to a user by the ICE of FIGS. 1 and 9 during a trace and debug session of a target system; and FIG. 11 is a block diagram of a two stage range reduction circuit that incorporates a first level of SRAMs that have their data outputs connected to the address inputs of the second level of SRAMs.

DETAILED DESCRIPTION THE PREFERRED EMBODIMENTS

I. First Embodiment of the Present Invention

Figure 1:
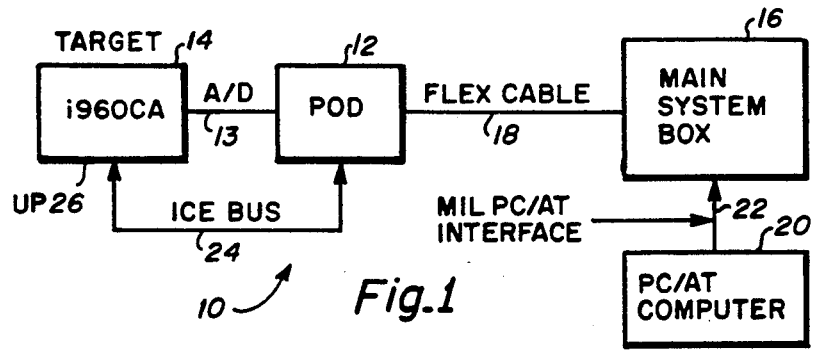
FIG. 1 is a block diagram of an in-circuit emulator (ICE), according to a first embodiment of the present invention.
Figure 2:
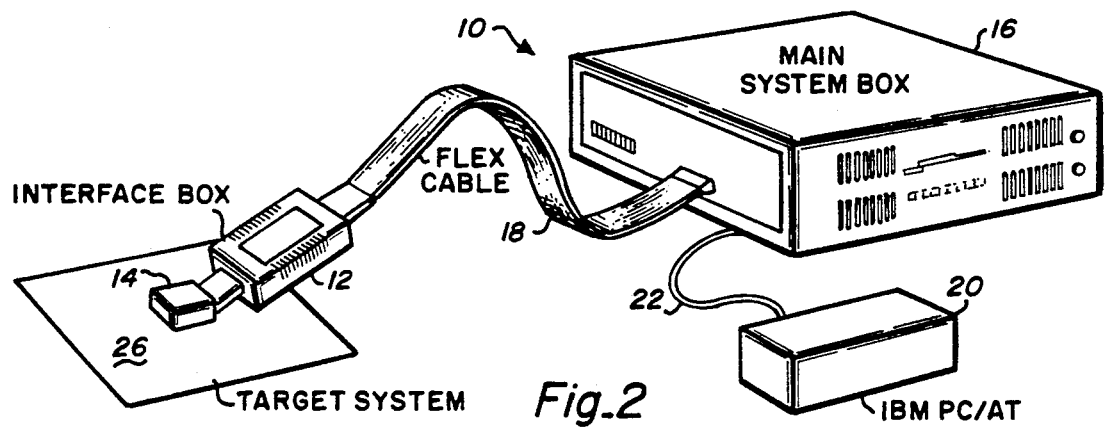
FIG. 2 is a perspective view of the ICE of FIG. 1.

In FIGS. 1 and 2, a first embodiment of the present invention is an in-circuit emulator (ICE) 10 comprised of two major components, a pod 12 connected by an interface microprocessor signal flex circuit cable 13 to a user target system 14 and to a main box 16 that houses the main electronics. The pod 12 is connected to the main box 16 and target 14 via a PCB flexible cable 18 and cable 13 which is the same continuous flex circuit cable shown in detail in FIGS. 4A and 4B.

Figure 3A:
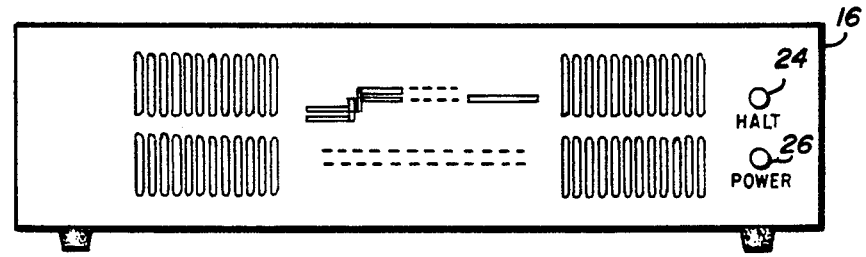
FIGS. 3A-3C are front, side, and rear views, respectively, of the ICE of FIG. 1.
Figure 3B:
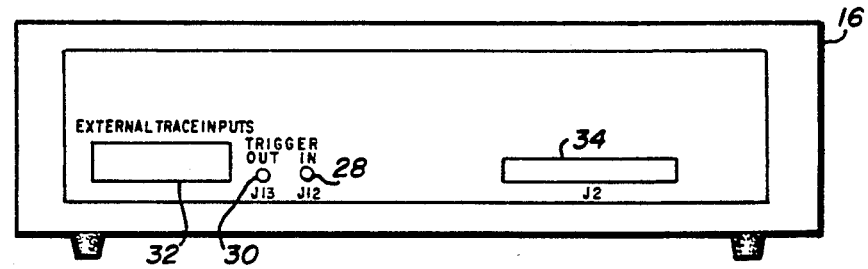
Figure 3C:
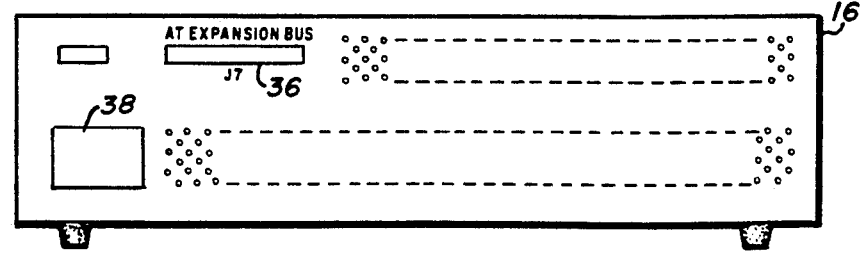

FIGS. 3A-3C show the locations on main box 16 of a halt indicator 24, a power indicator 26, a trigger input (J12) 28, a trigger output (J13) 30, an external trace interface 32, an ICE cable interface (J2) 34, a PC/AT Expansion Interface (J7) 36, and an AC power connector 38.

There is no embedded CPU in the ICE 10 system itself. Instead, the ICE 10 is directly controlled by an IBM PC/AT 20 or compatible "clone" personal computer. Other computer platforms can also be used with equal results, for example the IBM RS-6000. Both a target CPU and PC/AT CPU are used for ICE 10 functions. The ICE 10 connects to the PC/AT 20 or compatible via a PC/AT interface 22.

Figure 4A:
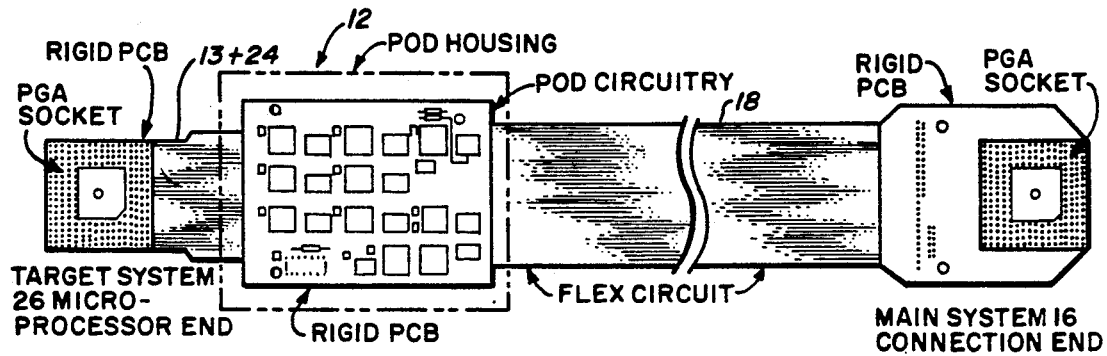
FIGS. 4A and 4B are socket side and pin side views, respectively, of the cable and pod the ICE of FIG. 1.
Figure 4B:
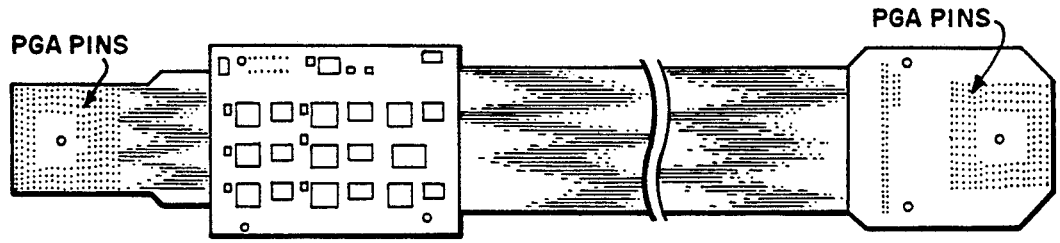

In FIG. 4A, the pod 12 assembly is shown in a special construction needed to buffer signals at high speeds, while simultaneously minimizing target system loading. At the clock speeds involved, data setup and hold times are exceedingly short and time windows for capturing data are difficult to meet. Propagation times through devices and the variability of those times within a single device and across several devices is a serious problem at the operational speeds of ICE 10. In loading the signal lines, the target system 14 microprocessor is as light as possible because the target system 14 design may be hypersensitive to such connections. Buffers are therefore required and each buffer introduces a device propagation delay and skews between signal lines will appear. Though these skews are hard enough to control when a single buffer chip is used, since there are typically 160 signals, or more, to buffer, at least twenty octal buffer chips will be needed. A large rigid printed circuit board is needed within pod 12 to hold such a number of chips and some alternative method of clocking trace registers is needed.

The microprocessor trace data and clocks of target system 14 cannot be used directly at high clock rates and so must be buffered. But, the typical buffered clock arrives too late to clock fast changing trace data into high speed trace registers and still meet the data hold times of commercially available devices.

Additionally, the fan-out loading effect on the clock trying to drive twenty or more register devices causes the clock to arrive even later in a cycle.

A function of pod 12 is to interface the rest of ICE 10 to the target system 14. Pod 12 buffers and registers all target system 14 signals and drives these signals up the cable to the main electronics. Pod 12 also has a separate 8-bit bidirectional ICE BUS 24 that allows ICE 10 to interpret and control a target microprocessor 26 (e.g., an Intel 80960CA, abbreviated i960 CA, "i959 CA" for the bond-out version) for debugging purposes.

Figure 5:
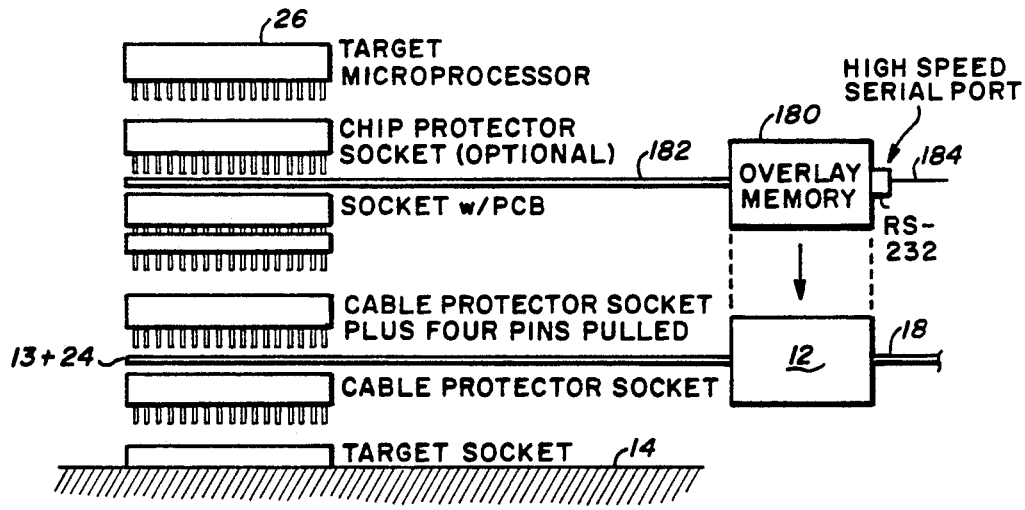
FIG. 5 is a side view of a typical PGA plug stack formed at the end the of cable of FIGS. 4A and 4B in preparation for connection to a user's target system.

In FIG. 5, cable 18 is sandwiched between target microprocessor 26, several protective spare PGA sockets, and target system 14 to connect signals 13 and ICE BUS 24 to pod 12.

A SYSTEM RESET signal driven by target system 14 is logically OR'ed with an ICE RESET signal from ICE 10. Target microprocessor 26 can therefore be reset either by the target system 14, or the ICE 10 hardware. ICE 10 can manipulate target microprocessor 26 into an ICE operational mode using this scheme. ICE 10 gates off any HOLD request signal into the target microprocessor 26 such that ICE 10 can disable the HOLD request, if necessary.

As shown in FIG. 6, the main box 16 of ICE 10 comprises the following major elements:

a BUS 24 control state machine 58;
a shadow memory 60 and associated circuits;
a trace memory 62 and associated circuits;
a PC/AT interface circuit 64;
an external discrete inputs circuit 66;
an expansion interface 68; and
a pod interface 70.

Pod Interfacing

Pod interface 70 has the following functions:
1) Pod interface 70 registers all the incoming signals from pod 12 with proper termination to achieve maximum data rate on the flex cable. It distributes these signals to other blocks of circuitry such as a trace buffer and a breakpoint detection circuit;
2) Pod interface 70 also contains a separate BUS 24 interface. The BUS 24 interface allows ICE 10 main electronics to communicate with target microprocessor 26 during the emulation process; and
3) Pod interface 70 also includes the pod 12 control circuit, comprising:
   a) Means to enable/disable any HOLD request into target microprocessor 26. This is necessary to support "multi-processor" type target architectures;
   b) Means to supply pod 12 circuitry with a RESET signal and "Mode Selection" control information during an ICE 10 RESET period; and
   c) Means to supply general control signals between the system box 16 and pod 12.

BUS 24 CONTROL STATE MACHINE

BUS 24 control state machine 58 and its associated circuitry allow ICE 10 to communicate with target microprocessor 26 via the BUS 24. The use of such a state machine alleviates any need to have an embedded CPU dedicated to supporting ICE 10 internal functions. State machine 58 has three different modes of operation: run mode 62, command mode 64, and mode 66.

During run mode 62, state machine 58 and associated circuitry perform the following functions:
1) Monitors the trace messages on the BUS 24. A break message from the BUS 24 indicates that target microprocessor 26 is entering the mode 66 due to internal hardware or software breakpoints or an asynchronous halt command.
2) Sends the asynchronous halt command to target microprocessor 26 in order to force it to the mode 66. The asynchronous halt command will be sent upon request from either the PC/AT 20 or from the external hardware breakpoint circuitry or the trigger input. ICE 10 includes external hardware breakpoints for discrete external inputs (interface 36).

During command mode 64, state machine 58 and associated circuitry are responsible for the following functions:
1) Assisting target microprocessor 26 in accessing the shadow memory 60 via LOAD and STORE commands; and
2) Monitoring the BUS 24 for a READY indication from target microprocessor 26. This condition indicates that the target microprocessor 26 has returned to mode 66.

During mode 66, state machine 58 and associated circuitry perform the following functions:
1) Assisting the PC/AT 20 processor in sending commands 71 to target microprocessor 26. Commands 71 are preassembled by PC/AT 20 into the shadow memory 60; and
2) Monitoring target microprocessor 26 responses to the commands 71. Some commands 71 require response from target microprocessor 26. The state machine 58 will perform loads and stores between shadow memory 60 and target microprocessor 26 as directed by PC/AT 20.

The state machine 58 (FIG. 6) and associated circuitry comprises the following sub-sections:
1) Address request counter 72;
2) BUS 24 byte transfer counter 74;
3) shadow memory address counter 76;
4) Control state machine 78;
5) Trigger control circuit 80; and
6) Position counter 82.

Address Request Counter

The address request counter 72, in state machine 58, generates an address request input into the state machine 58 during run mode 62.

BUS 24 Byte Transfer Counter

BUS 24 byte transfer counter 74, in state machine 58, keeps track of the number of bytes to be transferred on the BUS 24 during command/response transfers.

Shadow Memory Address Counter

Shadow memory address counter 76, in state machine 58, points to a shadow memory address location to be accessed. State machine 58 updates the counter to the next address after every transfer. This 16-bit counter is loaded either by PC/AT 20 or directly from BUS 24.

PC/AT 20 sets up the starting address of a command sequence by loading an initial value for this counter into a register. State machine 58 will, upon request by PC/AT 20, load this value into the address counter and then send the halt command by transferring the contents of the shadow memory 60 location pointed to by the address counter.

Control State Machine

A control state machine 58 is the heart of the BUS 24 interface. It has the task of monitoring several inputs and controlling several outputs to handle the BUS 24 interface task.

The inputs to state machine 58 are as follows:
1) reset input (1)[1]: hardware reset input from the PC/AT 20;
2) BUS 24 (8): monitoring BUS 24 activity.
3) READY (1): BUS 24 VALID indication from target microprocessor 26;
4) Byte Count TC (1): BUS 24 byte transfer counter 74 terminal count;
5) PC/AT 20 asynchronous halt request (1): The halt command will be sent to target microprocessor 26 forcing it to go to
6) PC/AT 20 asynchronous halt command (1): state machine 58 will send a halt command sequence upon receiving this command. The halt command should previously have been assembled by the PC/AT 20 into shadow memory 60;
7) PC/AT 20 asynchronous halt type (1): PC/AT 20 indicates the TYPE of halt command to be sent to target microprocessor 26; and
8) external hardware breakpoint request (1): state machine 58 forces target microprocessor 26 into mode 66 upon receiving this request from the external hardware breakpoint circuit.

[1] signifies how many signal lines.

The outputs from state machine 58 are as follows:
1) reset output (1) hardware reset output to target microprocessor 26;
2) MESSAGES (1): BUS 24 message to target microprocessor 26;
3) BUS 24 (8): driving the BUS 24 commands.
4) trace ON/OFF (1): enable or disable the trace buffer;
5) address counter reload (1): state machine 58 reloads the address request counter 72 upon receiving an address on the BUS 24 during run mode 62;
6) BUS 24 byte counter control (1): state machine 58 decrements the byte counter after every DATA byte is transferred between the BUS 24 and shadow memory 60;

8) shadow memory 60 control: state machine 58 must control the shadow memory 60 and related circuitry during all operations;
9) PC/AT 20 Status: PC/AT 20 needs various status signals from state machine 58; and
10) target microprocessor 26 ICE mode status (2) state machine 58 indicates to the external ICE 10 circuitry target microprocessor 26 ICE mode. These are: reset mode, run mode 62, and mode 66.

Trigger Control Circuit

Trigger control circuit 80 has the following functions:
1) Enable/Disable the trigger out from ICE 10;
2) Enable/Disable trace buffer data capture; and
3) Enable/Disable qualifier inputs for matchword detection.

Position Counter

This 16-bit counter allows the trigger point to be positioned within the trace buffer. This counter is reset and loaded by the PC/AT 20 software.

Shadow Memory

Shadow memory 60 allows the external ICE to interface to the BUS 24. There are many uses of the shadow memory 60. In mode 66, the shadow memory 60 is used as a temporary storage buffer between the external ICE and target microprocessor 26. In command mode, the shadow memory 60 is used to store user programs. In ICE 10 design, the shadow memory 60, along with the PC/AT 20, assists in sending mode 66 commands. The shadow memory 60 section comprises the following subsections:
1) 64K bytes of high speed SRAM (55 ns SRAM);
2) A data multiplexing circuit to allow either the PC/AT 20 or the BUS 24 data bus to be connected to the shadow memory 60 data bus;
3) An address multiplexing circuit to allow either the PC/AT 20 address bus or the BUS 24 address generator to be connected to the memory address bus. The BUS 24 address generator is essentially a 16-bit loadable counter. This counter can be loaded by either the PC/AT 20 data bus or directly from the BUS 24. It points to the current shadow memory 60 byte to be transferred between the shadow memory 60 and target microprocessor 26; and
4) A control multiplexing circuit that generates control signals to the memory. This multiplexing circuit must again select between the PC/AT 20 and the BUS 24, depending on whether PC/AT 20 or the BUS 24 is accessing the memory.

Trace Memory and Associated Circuitry

The trace memory 62 can be divided into the following subsections:
1) A 8K/32K × 160-bit wide high-speed SRAM (20 ns);
2) A data multiplexing circuit to allow either the PC/AT 20 data bus or target microprocessor 26 address, data, and control bus to be connected to the trace memory data bus;
3) An address multiplexing circuit to allow either the on-board trace address generator or the PC/AT 20 address to be connected to the trace memory 62 address bus. The PC/AT 20 can read the on-board trace address generator to determine the current position the trace buffer;
4) A control multiplexing circuit that generates control signals to the memory. This multiplexing circuit must select between the PC/AT 20 control bus and the trace control circuitry depending on whether PC/AT 20 or target microprocessor 26 is accessing the trace buffer; and
5) A trace memory 62 timing generator circuit to ensure proper timing for the trace memory 62 when being accessed by the either the PC/AT 20 or during the target system 14 CPU trace capture.

PC/AT Interface Circuit

PC/AT interface circuit 64 allows ICE 10 to be controlled from the PC/AT processor. Since there is no intelligence (CPU) in ICE 10, all software controlled functions are initiated by the PC/AT 20.

The PC/AT 20 interface circuit 34 can be divided into the following sections:
1) The PC/AT 20 bus buffer: This block of circuitry provides signal buffering for the address and control bus from the PC/AT 20 bus extender card. It also provides bidirectional drivers for the data bus;
2) A decoder circuit to decode a range of addresses on the I/O channel to be used by ICE 10. These decoded addresses shall be used as command/status register addresses. In addition, a page register is required for the ICE 10 memory mapping;
3) A set of command/status registers: The PC/AT 20 controls and monitors ICE 10 via these command/status registers; and
4) All ICE 10 memory is memory mapped into the 64K bytes of the PC/AT 20, starting typically at address D0000H, for example. Multiple pages of 64K bytes memory are required for all memory residing in the ICE 10. Each page register value determines a unique 64K bytes of ICE 10 memory that mapped into the PC/AT 20 64K bytes space.

External Discrete Circuit

The external discrete circuit 32 (FIG. 3B) is a user driven, 32-bit wide input to ICE 10. This input is synchronized with the target system 14 clock to store data in trace memory 62. The external circuit 32 allows the user to observe external events with respect to the target system 14 clock and the processor activity.

Expansion Interface

An expansion interface 68 allows future expansions of the ICE 10 system. ICE 10 hardware features are expandable by adding a second board (below). ICE 10 design therefore must provide many signals to the alternative board. The expansion interface 68 can be divided into four different subsections.
1) PC/AT 20 interface expansion;
2) external input expansion;
3) ICE 10 internal control expansion; and
4) Target system 14 interface expansion.

AT INTERFACE EXPANSION

PC/AT interface expansion carries buffered PC/AT 20 bus signals. The buffered PC/AT 20 bus comprises the AT address bus (16), data bus (16), control bus (6) and the paging register output (8). The PC/AT 20 interfaces to future ICE 10 hardware via this connector set.

External Input Expansion

The external discrete inputs are available for the external hardware breakpoint circuit circuitry via this interface. The external discrete inputs are registered in ICE 10 before being routed to the expansion connector.

ICE 10 Internal Control Expansion

This expansion interface is designed into ICE 10 hardware with the following consideration for board to board interconnection:
1) external circuit and hardware breakpoints;
2) trigger control and trace buffer;
3) alternative interfaces into the BUS 24 control state machine 58;
4) cycle tag and trace buffer;
5) hardware breakpoint and trace buffer; and
6) hardware breakpoint and state machine 58.

Target System Interface Expansion

This interface provides the (registered) target microprocessor 26 user bus to the ICE 10 expansion hardware. Advanced features such as code coverage, performance analysis, and histograms require the user target system 14 bus interface.

ICE 10 SYSTEM OVERVIEW

ICE 10 system is a PC/AT-based development system composed of hardware and software resources to form a development tool (ICE), and, for example, can be used for Intel RISC microprocessors. The following is an overview the system resources (hardware and software) and the interaction between them.

External Interface Signals

The external interface signals (connector 32, interface 66) between ICE 10 and other hardware components in the system comprise:
1) Target system 14 processor interface: the interface between pod 12 and the user target system 14;
2) pod 12 and the system box 16 interface: the interface between pod 12 and the ICE 10: the flex cable signals;
3) ICE 10 external Interfaces: external interfaces to and from the ICE 10 excluding pod 12 and the system box 16 interface which is described in a separate section. These external interfaces are:
   a) the PC/AT 20 bus interface: using the PC/AT 20 interface card, this interface comprises one 40-pin connector;
   b) discrete external inputs: this interface comprises two 40-pin connectors;
   c) trigger input and output: SMB right angle connectors are used for the trigger input and output signals;
   d) expansion interfaces: the expansion interfaces comprises the following:
      AT expansion interface 68: one 64-pin connector;
      external input expansion: one 64-pin connector;
      ICE 10 internal controls: one 64-pin connector;
      target system 14 expansion interface 68: four 64-pin connectors; and
      spare future expansion: one 64-pin connectors; and
4) Power connector: one 4-pin MOLEX right angle connector.

Target System Processor Interface

An ICE 10 interfaces to the user system via the target system 14 target microprocessor 26 socket. Target microprocessor 26 is packaged in a 168-pin PGA.

The following exemplary table lists signal assignments for target microprocessor 26 (e.g., Intel i960 CA) having a 168-pin PGA socket.

| SIGNAL | PIN | DIR | DESCRIPTION |
| --- | --- | --- | --- |
| Data(0) | E3 | I/O | Data bit 0 |
| Data(1) | C2 | I/O | Data bit 1 |
| Data(2) | D2 | I/O | Data bit 2 |
| Data(3) | C1 | I/O | Data bit 3 |
| Data(4) | E2 | I/O | Data bit 4 |
| Data(5) | D1 | I/O | Data bit 5 |
| Data(6) | F2 | I/O | Data bit 6 |
| Data(7) | E1 | I/O | Data bit 7 |
| Data(8) | F1 | I/O | Data bit 8 |
| Data(9) | G1 | I/O | Data bit 9 |
| Data(10) | H2 | I/O | Data bit 10 |
| Data(11) | H1 | I/O | Data bit 11 |
| Data(12) | J1 | I/O | Data bit 12 |
| Data(13) | K1 | I/O | Data bit 13 |
| Data(14) | L2 | I/O | Data bit 14 |
| Data(15) | L1 | I/O | Data bit 15 |
| Data(16) | M1 | I/O | Data bit 16 |
| Data(17) | N1 | I/O | Data bit 17 |
| Data(18) | N2 | I/O | Data bit 18 |
| Data(19) | P1 | I/O | Data bit 19 |
| Data(20) | P2 | I/O | Data bit 20 |
| Data(21) | Q1 | I/O | Data bit 21 |
| Data(22) | P3 | I/O | Data bit 22 |
| Data(23) | Q2 | I/O | Data bit 23 |
| Data(24) | R1 | I/O | Data bit 24 |
| Data(25) | S1 | I/O | Data bit 25 |
| Data(26) | Q3 | I/O | Data bit 26 |
| Data(27) | R2 | I/O | Data bit 27 |
| Data(28) | Q4 | I/O | Data bit 28 |
| Data(29) | S2 | I/O | Data bit 29 |
| Data(30) | Q5 | I/O | Data bit 30 |
| Data(31) | R3 | I/O | Data bit 31 |
| Address(2) | D16 | O | Address bit 2 |
| Address(3) | D17 | O | Address bit 3 |
| Address(4) | E16 | O | Address bit 4 |
| Address(5) | E17 | O | Address bit 5 |
| Address(6) | F17 | O | Address bit 6 |
| Address(7) | G16 | O | Address bit 7 |
| Address(8) | G17 | O | Address bit 8 |
| Address(9) | H17 | O | Address bit 9 |
| Address(10) | J17 | O | Address bit 10 |
| Address(11) | K17 | O | Address bit 11 |
| Address(12) | L17 | O | Address bit 12 |
| Address(13) | L16 | O | Address bit 13 |
| Address(14) | M17 | O | Address bit 14 |
| Address(15) | N17 | O | Address bit 15 |
| Address(16) | N16 | O | Address bit 16 |
| Address(17) | P17 | O | Address bit 17 |
| Address(18) | Q17 | O | Address bit 18 |
| Address(19) | P16 | O | Address bit 19 |
| Address(20) | P15 | O | Address bit 20 |
| Address(21) | P16 | O | Address bit 21 |
| Address(22) | R17 | O | Address bit 22 |
| Address(23) | R16 | O | Address bit 23 |
| Address(24) | Q15 | O | Address bit 24 |
| Address(25) | S17 | O | Address bit 25 |
| Address(26) | R15 | O | Address bit 26 |
| Address(27) | S16 | O | Address bit 27 |
| Address(28) | Q14 | O | Address bit 28 |
| Address(29) | R14 | O | Address bit 29 |
| Address(30) | Q13 | O | Address bit 30 |
| Address(31) | S15 | O | Address bit 31 |
| BE0* | R9 | I | Byte Enable 0 |
| BE1* | S7 | I | Byte Enable 1 |
| BE2* | S6 | I | Byte Enable 2 |
| BE3* | S5 | I | Byte Enable 3 |
| W/R* | S10 | I | WRITE/READ Control |
| ADS* | R6 | O | Address Strobe |
| READY* | S3 | I | READY to terminate a transf |
| BTERM* | R4 | I | Burst Terminate |
| WAIT* | S12 | O | WAIT by internal wait state |
| BLAST* | S8 | O | BURST LAST data transfer |
| DT/R* | S11 | O | Data Transmit/Receive |
| DEN* | S9 | O | Data Enable |
| LOCK* | S14 | O | BUS LOCK |
| HOLD | R5 | I | HOLD Request |
| HOLDA | S4 | O | HOLD Acknowledge |
| BREQ | R13 | O | BUS Request |
| D/C* | S13 | O | DATA or CODE |
| DMA* | R12 | O | DMA ACCESS |
| SUP* | Q12 | O | SUPERVISOR ACCESS |

-continued

| | | | |
|---|---|---|---|
| RESET* | A16 | I | PROCESSOR RESET |
| FAIL* | A2 | O | FAIL or READY |
| STEST | B2 | I | SELF TEST |
| ONCE* | C3 | I | ON CIRCUIT EMULATOR or ICEM |
| CLKIN | C13 | I | CLOCK INPUT |
| CLKMODE | C14 | I | CLOCK MODE |
| PCLK1 | B14 | O | Processor Output Clock 1 |
| PCLK2 | B13 | O | Processor Output Clock 2 |
| DREQ0* | B5 | I | DMA REQUEST 0 |
| DREQ1* | A6 | I | DMA REQUEST 1 |
| DREQ2* | B6 | I | DMA REQUEST 2 |
| DREQ3* | A7 | I | DMA REQUEST 3 |
| DACK0* | B8 | O | DMA Acknowledge 0 |
| DACK1* | A8 | O | DMA Acknowledge 1 |
| DACK2* | A9 | O | DMA Acknowledge 2 |
| DACK3* | A10 | O | DMA Acknowledge 3 |
| EOP/TC0* | A14 | I/O | End Of Process/Term. Cnt. |
| EOP/TC1* | A13 | I/O | End Of Process/Term. Cnt. |
| EOP/TC2* | A12 | I/O | End Of Process/Term. Cnt. |
| EOP/TC3* | A11 | I/O | End Of Process/Term. Cnt. |
| NMI* | D15 | I | Non Maskable Interrupt |
| XINT0* | B15 | I | Interrupt bit 0 |
| XINT1* | A15 | I | Interrupt bit 1 |
| XINT2* | A17 | I | Interrupt bit 2 |
| XINT3* | B16 | I | Interrupt bit 3 |
| XINT4* | C15 | I | Interrupt bit 4 |
| XINT5* | B17 | I | Interrupt bit 5 |
| XINT6* | C16 | I | Interrupt bit 6 |
| XINT7* | C17 | I | Interrupt bit 7 |
| GND C7, C8, C9, C10 | | | GND Reference |
| C11, C12, F15, G3 | | | GND Reference |
| G15, H3, H15, J3 | | | GND Reference |
| J15, K3, K15, L3 | | | GND Reference |
| L15, M3, M15, Q7 | | | GND Reference |
| Q5, Q9, Q10, Q11 | | | GND Reference |
| VCC B7, B9, B10, B11 | | | +5 V Power Supply |
| B12, C6, E15, F3 | | | +5 V Power Supply |
| F16, G2, H16, J2 | | | +5 V Power Supply |
| J16, K2, K16, M2 | | | +5 V Power Supply |
| M16, N3, N15, Q6 | | | +5 V Power Supply |
| R7, R8, R10, R11 | | | +5 V Power Supply |

Note: Input and output in this table are with respect to target microprocessor 26.

Target Microprocessor BUS 24 Interface

BUS 24 is available on target microprocessors comprising "bond-out" chips. A user uses this bus to build in-circuit emulator (ICE) products. Suitable bond-out chips are available from various microprocessor manufacturers.

POD 12 and ICE 10 Interface pod 12 interfaces to the ICE 10 main unit via a 209-pin PGA socket connector. The 209-pin PGA socket has the same dimension as the 168-pin socket except that it has one more row of pins. ICE 10 uses the additional row of pins to carry signals between the main electronics and pod 12 that are not apparent to the user.

Figure 8A:
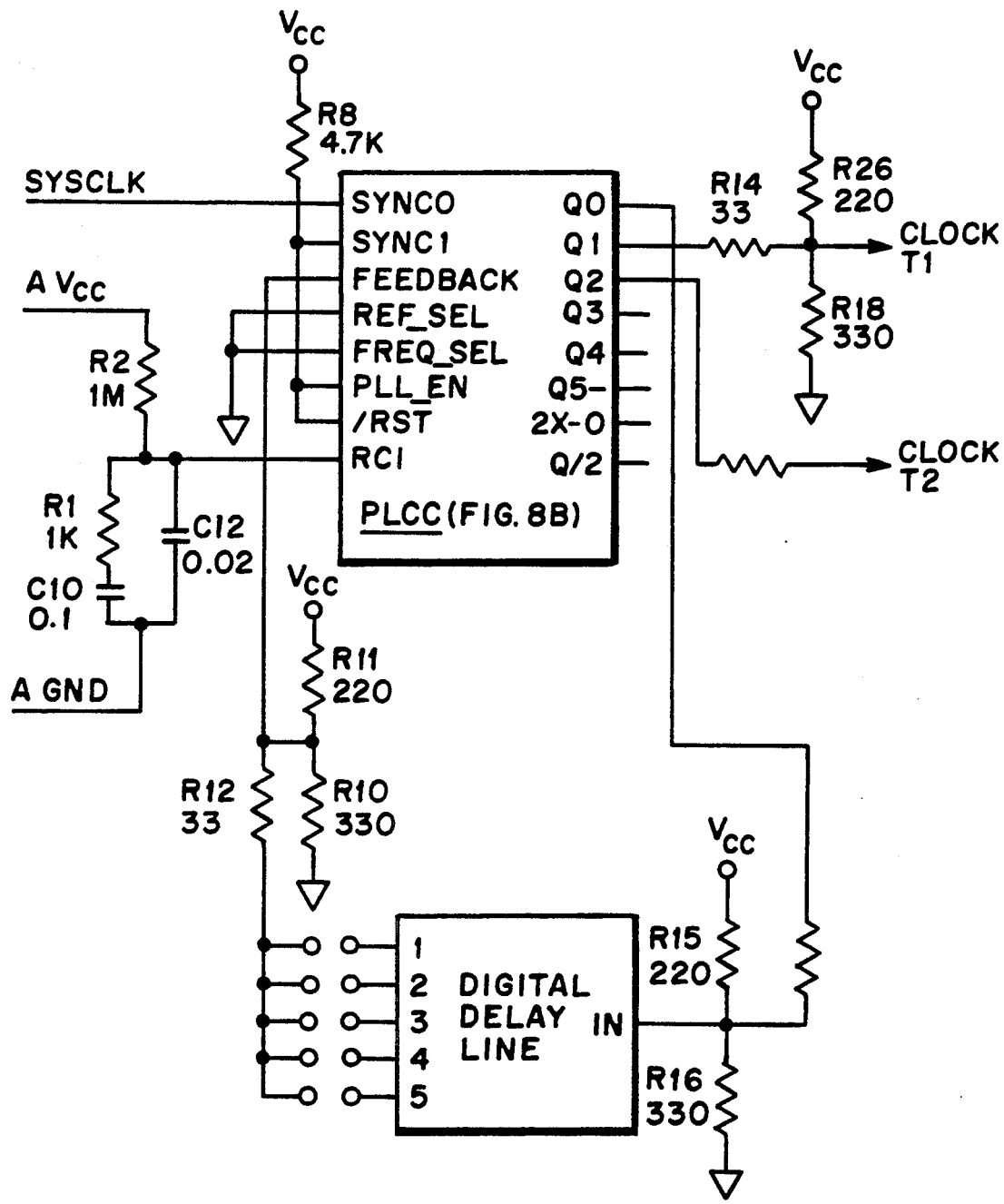
FIG. 8A is a schematic of a digital phase locked loop (DPLL) used in the pod of the ICE of FIG. 1.
Figure 8B:
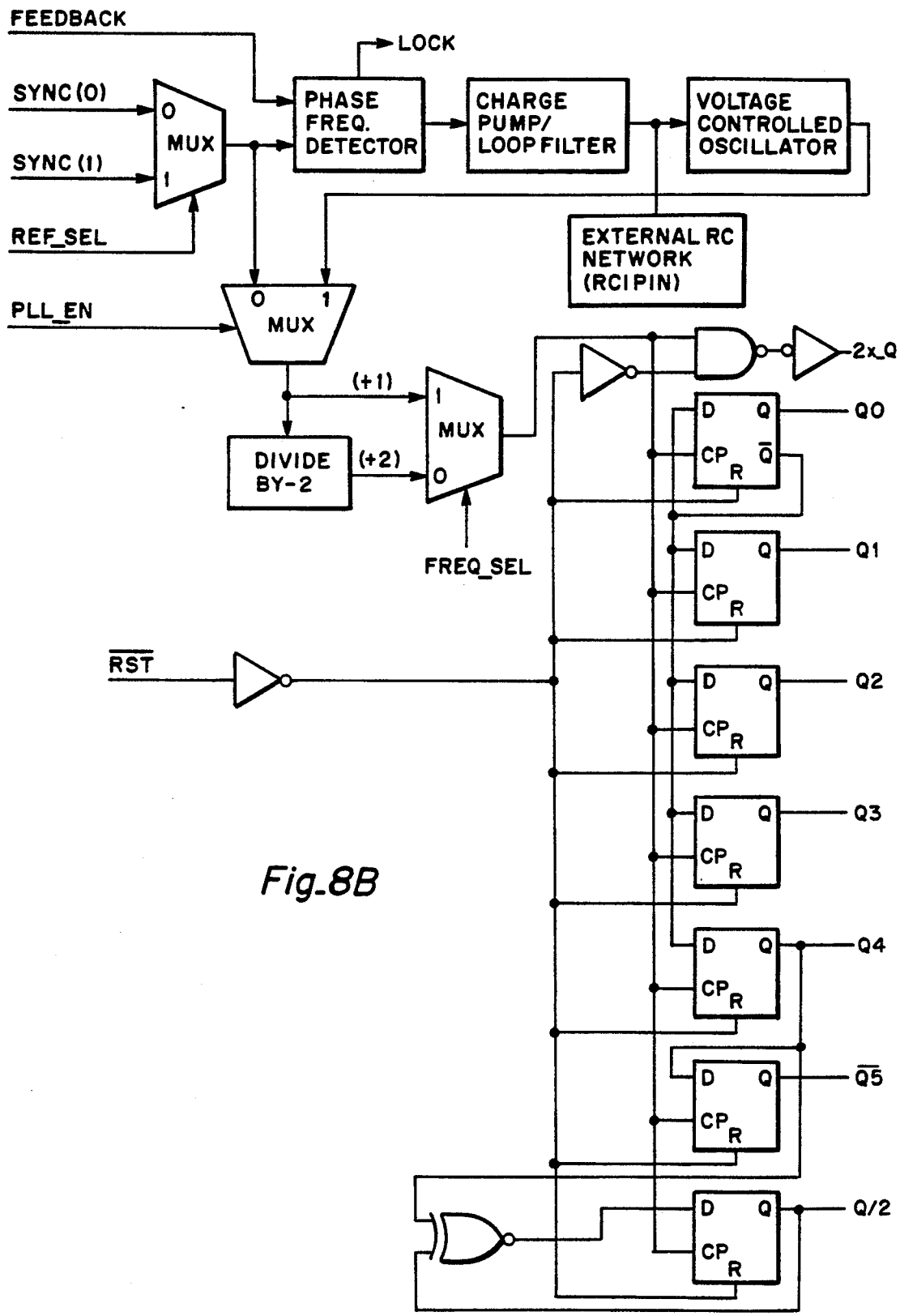
FIG. 8B is a block diagram of the DPLL chip of FIG. 8A.

FIG. 8A shows a means of generating a trace clock that slaves from the target system 14 clock over a range of frequencies and allows the trace clock to lead the system clock, effectively getting a negative delay. A Motorola MC88915 is used for the PLL function. The trace clock then will allow the trace registers enough setup time to latch the trace data while buffering the target system clock from these loads.

The pin assignment for target microprocessor 26 (168 PGA) is mapped into the 209 PGA socket interface for consistency. The pin assignment for the signals between pod 12 and ICE 10 main electronics for an Intel i960 CA example is listed below for reference. Other types of microprocessors will have different pinouts, of course.

| SIGNAL | PIN | DIR | DESCRIPTION |
|---|---|---|---|
| Data(0) | E3 | I | Data bit 0 |
| Data(1) | C2 | I | Data bit 1 |
| Data(2) | D2 | I | Data bit 2 |
| Data(3) | C1 | I | Data bit 3 |
| Data(4) | E2 | I | Data bit 4 |
| Data(5) | D1 | I | Data bit 5 |
| Data(6) | F2 | I | Data bit 6 |
| Data(7) | E1 | I | Data bit 7 |
| Data(8) | F1 | I | Data bit 8 |
| Data(9) | G1 | I | Data bit 9 |
| Data(10) | H2 | I | Data bit 10 |
| Data(11) | H1 | I | Data bit 11 |
| Data(12) | J1 | I | Data bit 12 |
| Data(13) | K1 | I | Data bit 13 |
| Data(14) | L2 | I | Data bit 14 |
| Data(15) | L1 | I | Data bit 15 |
| Data(16) | M1 | I | Data bit 16 |
| Data(17) | N1 | I | Data bit 17 |
| Data(18) | N2 | I | Data bit 18 |
| Data(19) | P1 | I | Data bit 19 |
| Data(20) | P2 | I | Data bit 20 |
| Data(21) | Q1 | I | Data bit 21 |
| Data(22) | P3 | I | Data bit 22 |
| Data(23) | Q2 | I | Data bit 23 |
| Data(24) | R1 | I | Data bit 24 |
| Data(25) | S1 | I | Data bit 25 |
| Data(26) | Q3 | I | Data bit 26 |
| Data(27) | R2 | I | Data bit 27 |
| Data(28) | Q4 | I | Data bit 28 |
| Data(29) | S2 | I | Data bit 29 |
| Data(30) | Q5 | I | Data bit 30 |
| Data(31) | R3 | I | Data bit 31 |
| Address(2) | D16 | I | Address bit 2 |
| Address(3) | D17 | I | Address bit 3 |
| Address(4) | E16 | I | Address bit 4 |
| Address(5) | E17 | I | Address bit 5 |
| Address(6) | F17 | I | Address bit 6 |
| Address(7) | G16 | I | Address bit 7 |
| Address(8) | G17 | I | Address bit 8 |
| Address(9) | H17 | I | Address bit 9 |
| Address(10) | J17 | I | Address bit 10 |
| Address(11) | K17 | I | Address bit 11 |
| Address(12) | L17 | I | Address bit 12 |
| Address(13) | L16 | I | Address bit 13 |
| Address(14) | M17 | I | Address bit 14 |
| Address(15) | N17 | I | Address bit 15 |
| Address(16) | N16 | I | Address bit 16 |
| Address(17) | P17 | I | Address bit 17 |
| Address(18) | Q17 | I | Address bit 18 |
| Address(19) | P16 | I | Address bit 19 |
| Address(20) | P15 | I | Address bit 20 |
| Address(21) | P16 | I | Address bit 21 |
| Address(22) | R17 | I | Address bit 22 |
| Address(23) | R16 | I | Address bit 23 |
| Address(24) | Q15 | I | Address bit 24 |
| Address(25) | S17 | I | Address bit 25 |
| Address(26) | R15 | I | Address bit 26 |
| Address(27) | S16 | I | Address bit 27 |
| Address(28) | Q14 | I | Address bit 28 |
| Address(29) | R14 | I | Address bit 29 |
| Address(30) | Q13 | I | Address bit 30 |
| Address(31) | S15 | I | Address bit 31 |
| BE0* | R9 | I | Byte Enable 0 |
| BE1* | S7 | I | Byte Enable 1 |
| BE2* | S6 | I | Byte Enable 2 |
| BE3* | S5 | I | Byte Enable 3 |
| W/R* | S10 | I | WRITE/READ Control |
| ADS* | R6 | I | Address Strobe |
| READY* | S3 | I | READY to terminate a transfer |
| BTERM* | R4 | I | Burst Terminate |
| WAIT* | S12 | I | WAIT by internal wait state |
| BLAST* | S8 | I | BURST LAST data transfer |
| DT/R* | S11 | I | Data Transmit/Receive |
| DEN* | S9 | I | Data Enable |
| LOCK* | S14 | I | BUS LOCK |
| HOLD | R5 | I | HOLD Request |
| HOLDA | S4 | I | HOLD Acknowledge |
| BREQ | R13 (K14) | I | BUS Request |
| D/C* | S13 | I | DATA or CODE |
| DMA* | R12 | I | DMA ACCESS |

-continued

| SIGNAL | PIN | DIR | DESCRIPTION |
|---|---|---|---|
| SUP* | Q12 | I | SUPERVISOR ACCESS |
| RESET* | A16 | I | PROCESSOR RESET |
| FAIL* (IVLD*) | A2 | I | FAIL or READY |
| STEST | P5 | I | SELF TEST. Should be B2 |
| ONCE* (IMSG*) | C3 | I | ON CIRCUIT EMULATOR or ICEM |
| CLKIN | C13 | I | CLOCK INPUT |
| CLKMODE | C14 | I | CLOCK MODE |
| PCLK2 | F14 (B13) | I | Processor Clock 2 from (B13) |
| DREQ0* | B5 | I | DMA REQUEST 0 |
| DREQ1* | A6 | I | DMA REQUEST 1 |
| DREQ2* | B6 | I | DMA REQUEST 2 |
| DREQ3* | A7 | I | DMA REQUEST 3 |
| DACK0* | B8 | I | DMA Acknowledge 0 |
| DACK1* | A8 | I | DMA Acknowledge 1 |
| DACK2* | A9 | I | DMA Acknowledge 2 |
| DACK3* | A10 | I | DMA Acknowledge 3 |
| EOP/TC0* | A14 | I | End Of Process/Term. Cnt. |
| EOP/TC1* | A13 | I | End Of Process/Term. Cnt. |
| EOP/TC2* | A12 | I | End Of Process/Term. Cnt. |
| EOP/TC3* | A11 | I | End Of Process/Term. Cnt. |
| NMI* | D15 | I | Non Maskable Interrupt |
| XINT0* | B15 | I | Interrupt bit 0 |
| XINT1* | A15 | I | Interrupt bit 1 |
| XINT2* | A17 | I | Interrupt bit 2 |
| XINT3* | B16 | I | Interrupt bit 3 |
| XINT4* | C15 | I | Interrupt bit 4 |
| XINT5* | B17 | I | Interrupt bit 5 |
| XINT6* | C16 | I | Interrupt bit 6 |
| XINT7* | C17 | I | Interrupt bit 7 |
| GND | C7, C8, C9, C10 | | GND Reference |
| | C11, C12, F15, G3 | | GND Reference |
| | G15, H3, H15, J3 | | GND Reference |
| | J15, K3, K15, L3 | | GND Reference |
| | L15, M3, M15, Q7 | | GND Reference |
| | Q5, Q9, Q10, Q11 | | GND Reference |
| VCC | B7, B9, B10, B11 | | +5V Power Supply |
| | B12, C6, E15, F3 | | +5V Power Supply |
| | F16, G2, H16, J2 | | +5V Power Supply |
| | J16, K2, K16, M2 | | +5V Power Supply |
| | M16, N3, N15, Q6 | | +5V Power Supply |
| | R7, R8, R10, R11 | | +5V Power Supply |
| ICEBUS0 | D4 | I/O | BUS 24 Bit 0 |
| ICEBUS1 | D5 | I/O | BUS 24 Bit 1 |
| ICEBUS2 | D6 | I/O | BUS 24 Bit 2 |
| ICEBUS3 | D7 | I/O | BUS 24 Bit 3 |
| ICEBUS4 | D8 | I/O | BUS 24 Bit 4 |
| ICEBUS5 | D9 | I/O | BUS 24 Bit 5 |
| ICEBUS6 | D10 | I/O | BUS 24 Bit 6 |
| ICEBUS7 | D11 | I/O | BUS 24 Bit 7 |
| ICEDIR | D12 | O | BUS 24 DIR Control |
| ICEEN | D13 | O | BUS 24 Enable Control |
| ICEMSG* | F4 | O | BUS 24 Message From ICE 10 |
| HRESET* | D14 | O | RESET to ICE 10 |
| HNLRESET* | P4 | I | NLRESET from ICE 10 |
| TGFAIL* | P12 | I | TGFAIL |
| READY* | E4 | I | BUS 24 Valid from target μP |
| P10HOLD | P10 | I | Processor HOLD |
| P10RST* | P11 | I | Processor RESET* |
| HOLDEN | E14 | O | Processor HOLD Enable |
| EXFAIL* | G14 | O | CP drives FAIL* signal |
| BACKOFF | B1 | ~ | NOT Documented by Intel |
| SCNMOD* | D3 | ~ | NOT Documented by Intel |
| SPAREIN | L4 | I | SPARE IN, Future expansion |
| SPAREIN | L14 | I | SPARE IN, Future expansion |
| SPAREIN | M14 | I | SPARE IN, Future expansion |
| SPAREOUT | N4 | O | SPARE OUT, Future expansion |
| SPAREOUT | N14 | O | SPARE OUT, Future expansion |
| SPAREOUT | M4 | O | SPARE OUT, Future expansion |

Note: Input and output in this table are with respect to ICE 10.

The Discrete External Interface

A 32-bit discrete external circuit interfaces to ICE 10 via two 40-pin, dual-row connectors.

The first exemplary connector pin assignments are as follows:

| SIGNAL | PIN | DIR | DESCRIPTION |
|---|---|---|---|
| BE00 | 1 | I | External Input 00 |
| BE01 | 3 | I | External Input 01 |
| BE02 | 5 | I | External Input 02 |
| BE03 | 7 | I | External Input 03 |
| BE04 | 9 | I | External Input 04 |
| BE05 | 11 | I | External Input 05 |
| BE06 | 13 | I | External Input 06 |
| BE07 | 15 | I | External Input 07 |
| BE08 | 19 | I | External Input 08 |
| BE09 | 21 | I | External Input 09 |
| BE10 | 23 | I | External Input 10 |
| BE11 | 25 | I | External Input 11 |
| BE12 | 27 | I | External Input 12 |
| BE13 | 29 | I | External Input 13 |
| BE14 | 31 | I | External Input 14 |
| BE15 | 33 | I | External Input 15 |
| NC | 17, 35 | | NO CONNECT |
| JUMPER | 37 | | to either GND or Vcc |
| Vcc | 2, 39 | | +5 V Power Supply |
| GND | All Even pins except pin 2 | | |

The second exemplary connector pin assignments are as follows:

| SIGNAL | PIN | DIR | DESCRIPTION |
|---|---|---|---|
| BE16 | 1 | I | External Input 16 |
| BE17 | 3 | I | External Input 17 |
| BE18 | 5 | I | External Input 18 |
| BE19 | 7 | I | External Input 19 |
| BE20 | 9 | I | External Input 20 |
| BE21 | 11 | I | External Input 21 |
| BE22 | 13 | I | External Input 22 |
| BE23 | 15 | I | External Input 23 |
| BE24 | 19 | I | External Input 24 |
| BE25 | 21 | I | External Input 25 |
| BE26 | 23 | I | External Input 26 |
| BE27 | 25 | I | External Input 27 |
| BE28 | 27 | I | External Input 28 |
| BE29 | 29 | I | External Input 29 |
| BE30 | 31 | I | External Input 30 |
| BE31 | 33 | I | External Input 31 |
| NC | 17, 35 | | NO CONNECT |
| JUMPER | 37 | | to either GND or Vcc |
| Vcc | 2, 39 | | +5V Power Supply |
| GND | All Even pins except pin 2 | | |

The PC/AT 20 Bus Interface

A PC/AT 20 bus interface comprises one 40-pin connector. Its pin assignment, in this example, is as follows:

| SIGNAL | PIN | DIR | DESCRIPTION |
|---|---|---|---|
| AD00 | 31 | I/O | ADDRESS & DATA 00 |
| AD01 | 30 | I/O | ADDRESS & DATA 01 |
| AD02 | 29 | I/O | ADDRESS & DATA 02 |
| AD03 | 28 | I/O | ADDRESS & DATA 03 |
| AD04 | 27 | I/O | ADDRESS & DATA 04 |
| AD05 | 26 | I/O | ADDRESS & DATA 05 |
| AD06 | 25 | I/O | ADDRESS & DATA 06 |
| AD07 | 24 | I/O | ADDRESS & DATA 07 |
| A08 | 2 | I | Address bit 08 |
| A09 | 3 | I | Address bit 09 |

-continued

| SIGNAL | PIN | DIR | DESCRIPTION |
|---|---|---|---|
| A10 | 4 | I | Address bit 10 |
| A11 | 5 | I | Address bit 11 |
| A12 | 6 | I | Address bit 12 |
| A13 | 7 | I | Address bit 13 |
| A14 | 8 | I | Address bit 14 |
| A15 | 9 | I | Address bit 15 |
| A16 | 10 | I | Address bit 16 |
| A17 | 11 | I | Address bit 17 |
| A18 | 12 | I | Address bit 18 |
| A19 | 13 | I | Address bit 19 |
| INTR* | 14 | O | Interrupt to PC/AT 20 |
| MILIOW* | 16 | I | I/O WRITE |
| MILMEMR* | 18 | I | MEMORY READ |
| MILMEMW* | 20 | I | MEMORY WRITE |
| MILIOR* | 22 | I | I/O READ |
| MILAEN | 33 | I | AEN |
| ALE | 35 | I | Address Latch Enable |
| GND | 1, 15, 17, 19, 21, 23, 32, 34, 40 | | |
| Vcc | 36, 37, 38, 39. | | |

The PC/AT 20 interface card Vcc should not be connected to ICE 10 Vcc.

Expansion Interface

An Expansion interface 68 comprises the following interconnections:
1) PC/AT 20 interface expansion;
2) external input expansion;
3) ICE 10 internal control expansion; and
4) target system 14 interface expansion.

PC/AT 20 Interface Expansion Interconnection

An interconnection allows the PC/AT 20 bus to access the second board. One 64-pin connector is used for this interface. An exemplary pin assignments are as follows:

| SIGNAL | PIN | DIR | DESCRIPTION |
|---|---|---|---|
| GND | 1, 2 | | |
| PD00 | 3 | I/O | DATA BUS 00 |
| PD01 | 4 | I/O | DATA BUS 01 |
| PD02 | 5 | I/O | DATA BUS 02 |
| PD03 | 6 | I/O | DATA BUS 03 |
| GND | 7, 8 | | |
| PD04 | 9 | I/O | DATA BUS 04 |
| PD05 | 10 | I/O | DATA BUS 05 |
| PD06 | 11 | I/O | DATA BUS 06 |
| PD07 | 12 | I/O | DATA BUS 07 |
| GND | 13, 14 | | |
| PR0 | 15 | O | Page register bit 0 |
| PR1 | 16 | O | Page register bit 1 |
| PR2 | 17 | O | Page register bit 2 |
| PR3 | 18 | O | Page register bit 3 |
| GND | 19, 20 | | |
| PR4 | 21 | O | Page register bit 4 |
| PR5 | 22 | O | Page register bit 5 |
| PR6 | 23 | O | Page register bit 6 |
| PR7 | 24 | O | Page register bit 7 |
| GND | 25, 26 | | |
| MEMR* | 27 | O | Memory READ |
| GND | 28 | | |
| MEMW* | 29 | O | Memory WRITE |
| GND | 28 | | |
| EXPSEL* | 31 | O | ICE 10 SELECT |
| GND | 28 | | |
| EINTR | 33 | I | ICE 10 II INTERRUPT |
| GND | 34 | | |
| CPA1510* | 35 | O | Decode A15-A10 = 0 |
| GND | 36 | | |
| PA00 | 37 | O | Address BUS 00 |
| PA01 | 38 | O | Address BUS 01 |
| PA02 | 39 | O | Address BUS 02 |
| PA03 | 40 | O | Address BUS 03 |
| GND | 41, 42 | | |

-continued

| SIGNAL | PIN | DIR | DESCRIPTION |
|---|---|---|---|
| PA04 | 43 | O | Address BUS 04 |
| PA05 | 44 | O | Address BUS 05 |
| PA06 | 45 | O | Address BUS 06 |
| PA07 | 46 | O | Address BUS 07 |
| GND | 47, 48 | | |
| PA08 | 49 | O | Address BUS 08 |
| PA09 | 50 | O | Address BUS 09 |
| PA10 | 51 | O | Address BUS 10 |
| PA11 | 52 | O | Address BUS 11 |
| GND | 53, 54 | | |
| PA12 | 55 | O | Address BUS 12 |
| PA13 | 56 | O | Address BUS 13 |
| PA14 | 57 | O | Address BUS 14 |
| PA15 | 58 | O | Address BUS 15 |
| GND | 59, 60 | | |
| PA16 | 55 | O | Address BUS 16 |
| PA17 | 56 | O | Address BUS 17 |
| PA18 | 57 | O | Address BUS 18 |
| PA19 | 58 | O | Address BUS 19 |

Note: Pin assignment for this interconnection can be changed depending on the type of board to board interconnection chosen.

The External Expansion Interconnection

An interconnection allows the ICE 10 hardware to interface to the discrete external inputs. Exemplary assignments are as follows:

| SIGNAL | PIN | DIR | DESCRIPTION |
|---|---|---|---|
| BEX00 | 1 | O | External Input 00 |
| BEX01 | 3 | O | External Input 01 |
| BEX02 | 5 | O | External Input 02 |
| BEX03 | 7 | O | External Input 03 |
| BEX04 | 9 | O | External Input 04 |
| BEX05 | 11 | O | External Input 05 |
| BEX06 | 13 | O | External Input 06 |
| BEX07 | 15 | O | External Input 07 |
| BEX08 | 17 | O | External Input 08 |
| BEX09 | 19 | O | External Input 09 |
| BEX0A | 21 | O | External Input 10 |
| BEX0B | 23 | O | External Input 11 |
| BEX0C | 25 | O | External Input 12 |
| BEX0D | 27 | O | External Input 13 |
| BEX0E | 29 | O | External Input 14 |
| BEX0F | 31 | O | External Input 15 |
| BEX10 | 33 | O | External Input 16 |
| BEX11 | 35 | O | External Input 17 |
| BEX12 | 37 | O | External Input 18 |
| BEX13 | 39 | O | External Input 19 |
| BEX14 | 41 | O | External Input 20 |
| BEX15 | 43 | O | External Input 21 |
| BEX16 | 45 | O | External Input 22 |
| BEX17 | 47 | O | External Input 23 |
| BEX18 | 49 | O | External Input 24 |
| BEX19 | 51 | O | External Input 25 |
| BEX1A | 53 | O | External Input 26 |
| BEX1B | 55 | O | External Input 27 |
| BEX1C | 57 | O | External Input 28 |
| BEX1D | 59 | O | External Input 29 |
| BEX1E | 61 | O | External Input 30 |
| BEX1F | 63 | O | External Input 31 |
| GND | All Even pins are GROUND. | | |

ICE 10 Internal Control Expansion Interconnection

An interconnection allows ICE 10 hardware to communicate with future add-on hardware for internal control purpose. A 64-pin connector is assigned for this interconnection. Its exemplary pin assignments are as follows:

| SIGNAL | PIN | DIR | DESCRIPTION |
|---|---|---|---|
| RICEDIR | 1 | I | Expansion IB Direction |
| RICEN* | 3 | I | Expansion IB Enable |
| RICE7 | 5 | I/O | Expansion RAW IB 7 |
| RICE6 | 7 | I/O | Expansion RAW IB 6 |
| RICE5 | 9 | I/O | Expansion RAW IB 5 |
| RICE4 | 11 | I/O | Expansion RAW IB 4 |
| RICE3 | 13 | I/O | Expansion RAW IB 3 |
| RICE2 | 15 | I/O | Expansion RAW IB 2 |
| RICE1 | 17 | I/O | Expansion RAW IB 1 |
| RICE0 | 19 | I/O | Expansion RAW IB 0 |
| STCTL* | 21 | I | Store Control Enable |
| FHWBP* | 23 | I | Future HW BP |
| SPARE | 25–63 | | All odd pins between 25–63. |
| GND | ALL EVEN PINS | | |

The Target System 14 Interface Expansion Interconnection

An interconnection allows the second board to monitor the target system 14 signals to perform advanced ICE features. Four 60-pin connectors are assigned for this purpose.

First Connector for Target System 14 Expansion

A first exemplary connector pin assignment for the target system 14 interface expansion interconnection is as follows:

| SIGNAL | PIN | DIR | DESCRIPTION |
|---|---|---|---|
| Data(0) | 1 | O | Data bit 0 |
| Data(1) | 3 | O | Data bit 1 |
| Data(2) | 5 | O | Data bit 2 |
| Data(3) | 7 | O | Data bit 3 |
| Data(4) | 9 | O | Data bit 4 |
| Data(5) | 11 | O | Data bit 5 |
| Data(6) | 13 | O | Data bit 6 |
| Data(7) | 15 | O | Data bit 7 |
| Data(8) | 17 | O | Data bit 8 |
| Data(9) | 19 | O | Data bit 9 |
| Data(10) | 21 | O | Data bit 10 |
| Data(11) | 23 | O | Data bit 11 |
| Data(12) | 25 | O | Data bit 12 |
| Data(13) | 27 | O | Data bit 13 |
| Data(14) | 29 | O | Data bit 14 |
| Data(15) | 31 | O | Data bit 15 |
| Data(16) | 33 | O | Data bit 16 |
| Data(17) | 35 | O | Data bit 17 |
| Data(18) | 37 | O | Data bit 18 |
| Data(19) | 39 | O | Data bit 19 |
| Data(20) | 41 | O | Data bit 20 |
| Data(21) | 43 | O | Data bit 21 |
| Data(22) | 45 | O | Data bit 22 |
| Data(23) | 47 | O | Data bit 23 |
| Data(24) | 49 | O | Data bit 24 |
| Data(25) | 51 | O | Data bit 25 |
| Data(26) | 53 | O | Data bit 26 |
| Data(27) | 55 | O | Data bit 27 |
| Data(28) | 57 | O | Data bit 28 |
| Data(29) | 59 | O | Data bit 29 |
| Data(30) | 61 | O | Data bit 30 |
| Data(31) | 63 | O | Data bit 31 |
| GND | ALL EVEN PINS | | |

Second Connector for Target System 14 Expansion

A second exemplary connector pin assignment for the target system 14 interface expansion interconnection is as follows:

| SIGNAL | PIN | DIR | DESCRIPTION |
|---|---|---|---|
| Address(2) | 5 | O | Address bit 2 |
| Address(3) | 7 | O | Address bit 3 |
| Address(4) | 9 | O | Address bit 4 |
| Address(5) | 11 | O | Address bit 5 |
| Address(6) | 13 | O | Address bit 6 |
| Address(7) | 15 | O | Address bit 7 |
| Address(8) | 17 | O | Address bit 8 |
| Address(9) | 19 | O | Address bit 9 |
| Address(10) | 21 | O | Address bit 10 |
| Address(11) | 23 | O | Address bit 11 |
| Address(12) | 25 | O | Address bit 12 |
| Address(13) | 27 | O | Address bit 13 |
| Address(14) | 29 | O | Address bit 14 |
| Address(15) | 31 | O | Address bit 15 |
| Address(16) | 33 | O | Address bit 16 |
| Address(17) | 35 | O | Address bit 17 |
| Address(18) | 37 | O | Address bit 18 |
| Address(19) | 39 | O | Address bit 19 |
| Address(20) | 41 | O | Address bit 20 |
| Address(21) | 43 | O | Address bit 21 |
| Address(22) | 45 | O | Address bit 22 |
| Address(23) | 47 | O | Address bit 23 |
| Address(24) | 49 | O | Address bit 24 |
| Address(25) | 51 | O | Address bit 25 |
| Address(26) | 53 | O | Address bit 26 |
| Address(27) | 55 | O | Address bit 27 |
| Address(28) | 57 | O | Address bit 28 |
| Address(29) | 59 | O | Address bit 29 |
| Address(30) | 61 | O | Address bit 30 |
| Address(31) | 63 | O | Address bit 31 |
| GND | ALL EVEN PINS | | |

Third Connector for Target System Expansion

A third exemplary connector pin assignment for the target system 14 interface expansion interconnection is as follows:

| SIGNAL | PIN | DIR | DESCRIPTION |
|---|---|---|---|
| BTHOLD | 1 | O | HOLD Request |
| BTW/R* | 3 | O | WRITE/READ Control |
| BTDEN* | 5 | O | Data Enable |
| BTBLAST* | 7 | O | BURST LAST data transfer |
| BTADS* | 9 | O | Address Strobe |
| BTRDY* | 11 | O | READY to terminate a transfer |
| BTHOLDA | 13 | O | HOLD Acknowledge |
| BTBRDY* | 15 | O | 960CA BREADY |
| BTDACK0* | 17 | O | DMA Acknowledge 0 |
| BTDACK1* | 19 | O | DMA Acknowledge 1 |
| BTDACK2* | 21 | O | DMA Acknowledge 2 |
| BTDACK3* | 23 | O | DMA Acknowledge 3 |
| BTDREQ0* | 25 | O | DMA REQUEST 0 |
| BTDREQ1* | 27 | O | DMA REQUEST 1 |
| BTDREQ2* | 29 | O | DMA REQUEST 2 |
| BTDREQ3* | 31 | O | DMA REQUEST 3 |
| EOP/TC0* | 33 | O | End Of Process/Term. Cnt. |
| EOP/TC1* | 35 | O | End Of Process/Term. Cnt. |
| EOP/TC2* | 37 | O | End Of Process/Term. Cnt. |
| EOP/TC3* | 39 | O | End Of Process/Term. Cnt. |
| BTBE0* | 41 | O | Byte Enable 0 |
| BTBE1* | 43 | O | Byte Enable 1 |
| BTBE2* | 45 | O | Byte Enable 2 |
| BTBE3* | 47 | O | Byte Enable 3 |
| BTINT0* | 49 | O | Interrupt bit 0 |
| BTINT1* | 51 | O | Interrupt bit 1 |
| BTINT2* | 53 | O | Interrupt bit 2 |
| BTINT3* | 55 | O | Interrupt bit 3 |
| BTINT4* | 57 | O | Interrupt bit 4 |
| BTINT5* | 59 | O | Interrupt bit 5 |
| BTINT6* | 61 | O | Interrupt bit 6 |
| BTINT7* | 63 | O | Interrupt bit 7 |
| GND | ALL EVEN PINS | | |

Fourth Connector for Target System Expansion

A fourth exemplary connector pin assignment for the target system 14 interface expansion interconnection is as follows:

| SIGNAL | PIN | DIR | DESCRIPTION |
|---|---|---|---|
| ICEBUS0 | 1 | O | BUS 24 Bit 0 |
| ICEBUS1 | 3 | O | BUS 24 Bit 1 |
| ICEBUS2 | 5 | O | BUS 24 Bit 2 |
| ICEBUS3 | 7 | O | BUS 24 Bit 3 |
| ICEBUS4 | 9 | O | BUS 24 Bit 4 |
| ICEBUS5 | 11 | O | BUS 24 Bit 5 |
| ICEBUS6 | 13 | O | BUS 24 Bit 6 |
| ICEBUS7 | 15 | O | BUS 24 Bit 7 |
| BMSGVLD* | 17 | O | ICE Message Valid |
| BAMARK* | 19 | O | Address Valid |
| ICEMSG* | 21 | O | ICE Message (or ONCE*) |
| READY* | 23 | O | ICE Valid (or FAIL*) |
| ICEADS* | 25 | O | ICE Address Strobe (Overlay ?) |
| SPARE | 27 | | |
| SPARE | 29 | | |
| BTBREQ | 31 | O | BUS Request |
| BTP10RST* | 33 | O | Processor Reset Pin |
| BTRESET* | 35 | O | Target system 14 Reset |
| BTP10HOLD | 37 | O | Processor HOLD Pin |
| BTFAIL* | 39 | O | FAIL |
| BTBACKOFF | 41 | O | Processor BACKOFF Pin |
| BTCLKMODE | 43 | O | CLOCK MODE |
| BTSCNMOD* | 45 | O | SCAN MODE |
| BTNMI* | 47 | O | Non Maskable Interrupt |
| BTLOCK* | 49 | O | BUS LOCK |
| BTD/C* | 51 | O | DATA or CODE |
| BTSUP* | 53 | O | SUPERVISOR ACCESS |
| BTDMA* | 55 | O | DMA ACCESS |
| BTWAIT* | 57 | O | WAIT by internal wait state |
| BTDT/R* | 59 | O | Data Transmit/Receive |
| SPARE | 61 | | |
| TCLKxx | 63 | O | Processor Target system 14 Clock |
| GND | ALL EVEN PINS | | |

Note:
1) Input and output in this table are with respect to ICE 10.

Power Connections

The power supply connection is made via a 4-pin right angle MOLEX connector. Exemplary pin assignments are as follows:

| SIGNAL | PIN | DESCRIPTION |
|---|---|---|
| Vcc | 1, 4 | +5V Power Supply |
| GND | 2, 3 | GND Reference |

Overall, ICE 10 is preferably non-intrusive to the processor/target system 14 interface, with the only exception being the RESET line. Microprocessor 26 can be reset via ICE 10.

ICE 10 Software

System administration of ICE 10 is provided by a monitor program (a low level control interface 21) that loads on the PC/AT 20. The low level control interface 21 initializes all hardware devices, manages internal memories, organizes commands to be sent to the target system 14, and provides an easy to use command language for a user interface.

Execution Control

An execution control process loaded on the PC/AT 20 lets the target system 14 designer start, stop, and single-step to verify program circuit execution via the parallel interface to main unit 12. The execution control sets both software and hardware breakpoints for halting target system 14 execution, and allows resumed execution after hitting a breakpoint. Programs can be stepped one instruction at a time (single-stepping), or a group of instructions at a time. ICE 10 provides both hardware and software breakpoints with up to sixteen software breakpoints and nine hardware breakpoints that can be user-defined.

Software breakpoints are implemented by inserting an fmark instruction in the source code at the desired breakpoint location. When clearing, the breakpoint location is replaced with original data. There are four different types of hardware breakpoints: address, data, range, and special. ICE 10 provides two address breakpoints, two data breakpoints, one range breakpoint, and four 10 special breakpoints that can be set to break on branch, call, return, and supervisor instructions. Another control command, TP, allows the trace position count to be set in the range of zero to 65,535, thereby allowing execution to continue "n" number of cycles after a break condition has been recognized.

Trace Buffer

A trace buffer facility captures the most recent 8K events in a circular memory. Each event, representing a snapshot of bus activity during a single clock cycle, is arbitrarily numbered relative to the current event and is stored in real-time in a ring buffer while the target system 14 microprocessor continues executing the target system 14 program. Circuitry using a phase-locked loop (PLL) to recreate a system clock timed to be conducive to the hold times of the ring buffer registers is required for real-time operation as is described in herein. By using all the control information supplied by the target system 14 microprocessor and special emulator software, ICE 10 is able to provide a full reconstruction of the execution stream for target system 14 microprocessor programs. In particular, ICE 10 reconstructs programs executing from the on-board cache memory in the target system 14 microprocessor.

Bus trace data is displayed in three formats:
1. a reconstructed instruction trace (TR);
2. processor bus and controls trace (TD); and
3. user-defined external bits (TE).

Due to on-chip cache memory in some target microprocessors 26, code executed inside does not appear on the pins. This makes capturing and displaying a code trace via conventional means impossible. To solve this dilemma, a special bond-out interface is added to a RISC type microprocessor that provides a deterministic address stream. Address stream information must, at a minimum, show the instruction pointer any time the processor advances to a new non-sequential address. With a discontinuous address trace, it is possible to reconstruct the original path of execution. By starting at the earliest valid address in a trace buffer, a reconstruction process reads the instruction from target memory. This instruction is then disassembled and displayed, along with its corresponding address. At the same time, the number of words required are determined and that number is added to the instruction pointer. This new pointer then indicates that next instruction to be disassembled and the process is repeated. In the event a call, return, branch or interrupt occurs, a special flag or command must be issued over BUS 24, indicating that a discontinuous change to the address pointer has occurred and volunteering the value of the new destination address. The new instruction points to the new region of code to be executed. This new pointer is now used to read and display the next executed instruction and the process proceeds from there.

Trace screens (FIG. 10) can be scrolled forward or backward. Hooks are provided in the cross-compiler output file so as to allow ICE 10 to relate the disassembled trace data back to each respective line of source code that produced the machine code. Specifically, branch data supplied on a special bus of a bond-out chip substituted for the target system 14 microprocessor, for example, together with the target system 14 microprocessor's system interface signals, provides visibility behind any on-board cache to reconstruct actual program flow (and not the cache queue sequence). The raw data collected in the trace buffer is disassembled, any symbolic labels are attached, and the trace is presented on the screen of the PC/AT 20 to a user in assembler mnemonic format in one port of a split window display. As the user scrolls back and forth through the assembler mnemonic format listing the trace, another port in the split window presents a segment of the original high level source code, for example "C" code, and highlights the particular source code line that produced the particular disassembled machine code step under study. The advantage is the displayed representation of the target system 14 machine trace is more comprehensible and productivity is improved.

In-line Assembler/Disassembler

A built-in assembler/disassembler contained in ICE 10 software applications allows target system 14 memory to be examined and changes made by using instruction mnemonics rather than by insisting on the use of hexadecimal values. Preferably, the mnemonics used are the same as those publicly distributed by the manufacturer of the particular target system 14 microprocessor. This greatly minimizes the effort required by a user to alter the contents of the instruction memory. The lexical conventions and statement syntax are identical to a target system 14 microprocessor's instruction set, so there is no need for a user to learn alternative formats.

Hardware Debug Support

ICE 10 has means to address the so-called micro-debug stage of development. This stage is when a non-functioning target system 14 is being brought to life and various board-level options are being implemented and validated. These micro-debug control features allow the designer to test the target system 14 hardware memory, to find opens and shorts, and to verify proper microprocessor/register communication. With these features the designer begins to debug the target system 14, step-by-step, using the resources of ICE 10 when target system 14 resources are not yet functional. The micro-debug control features are:
  memory test (Z3);
  register test (Z4);
  read loop diagnostic (Z0);
  write loop diagnostic (Z1I);
  write/read loop Diagnostic (Z2);
  circuit analyzer interface (trigger I/O); and
  32 user-defined external signals.

Trigger In/Out

ICE 10 provides a trigger in/out capability with two synchronization signals such that oscilloscopes, multiple ICE 10 units, or circuit analyzers can trigger relative to one another. Assuming a trigger is asynchronous to a target system 14 clock, the time between the trigger-in and trigger-out is one target system 14 clock cycle.

User-Defined External Signals

ICE 10 has 32 user-defined external bits that are captured into the trace buffer and tied into a hardware breakpoint. Any external signals are correlated to program execution and monitored through a trace facility, giving a cycle-by-cycle view of external status.

Low Level Control Interface 21

The low level control interface 21 allows several options to be performed from the command line. By invoking the low level control interface 21 at the PC/AT 20 keyboard, initialization of the target system 14 processor occurs. Initialization routines and data may be sourced from the target system 14 memory or from the PC/AT 20 memory. Refer to Intel i960 CA Users Manual Chapters 2 and 14 for further information regarding initialization requirements. In cases where the target system 14 memory system is not yet fully operational, an initial boot record (IBR) and an initial memory image (IMI) may be supplied by ICE 10. The IBR and IMI can be particularly troublesome for a user to generate, especially when encountering a microprocessor like the Intel i960 CA for the first time. The IBR and IMI will typically be stored in a target system PROM and has to be correctly implemented before any other user code will be entered. ICE 10 allows a model IMI/IBR to be substituted in during reset to get the target processor 26 bootstrapped up and executing program instructions. (IMI/IBR supplies basic parameters to, for example, an i960 CA that setup various registers, parameters, operational modes, and key memory addresses.)

In the default mode, the low level control interface 21 searches for a particular file, e.g., ICE 10.env. If the file is found, the reset and initialization are performed according to entry RESET TYPE (default is target system 14). If ICE 10.env has an entry RESET TYPE=ICE, ICE 10 will read the contents of the file for initialization. If the RESET TYPE=TARGET SYSTEM 14, the remaining entries will be ignored and the reset will be performed by the target system 14. A HA[LT] command is used to begin the debugging session.

The following parameters are preferably included in the low level interface means:
  -e: The "e" parameter allows a user to specify an environment file name of choice, e.g., "init. 960". Once a filename has been specified with the "e" parameter, it will be the file used for all subsequent resets until another file is specified;
  -i: Invoking low level control interface 21 with the "i" parameter causes ICE 10 to perform the initialization. A user must create a file which will describe the target system 14 hardware specifics for the initialization process;
  -t: Invoking low level control interface 21 with a "t" parameter, the default, causes normal target system 14 memory initialization. A HA[LT] command begins a debugging session;

-rn: This option tells low level control interface 21 that an Ethernet connection should be attempted according to the config.tel file; and -s: Invoking low level control interface 21 with the "s" parameter allows the user to specify a submit file which can execute a series of ICE 10 commands including RESET, HALT, DOWNLOAD, etc. This is very useful for automating the power-up sequence and for particular user preferred setups and configurations. A submit file can also be called from the command line or through the environment file.

External Trace Signals

ICE 10 allows the user to trace thirty-two (32) synchronous external signals by connecting them to an interface 32 (FIG. 2B).

Trigger In/Out

By providing a trigger signal, ICE 10 can trigger or be triggered by a circuit analyzer, and to trigger other units for tracing in a multi-processor system. The trigger signal is preferably TTL compatible, always enabled, and active high. When trigger in occurs, it takes one target system 14 clock cycle for the trigger out to become true.

A trigger in/out cable is connected to a SMB (small gold) connector to ICE 10 and the other end with a BNC connector to a circuit analyzer.

A hardware or software breakpoint is used to cause the trigger-out facility to halt the circuit analyzer or other ICE 10 units. By using the external trigger or the spare bits, for example, on the circuit analyzer, a trigger-in facility is used to halt ICE 10. The procedure necessary to implement a trigger-in facility depends on the type of circuit analyzer being used.

Source Level Debugger

Summary

A source level debugger 22 for the target system 14 microprocessor allows a user to do high-level and assembly level debugging with ICE 10. By providing complete control over the flow of execution, the user can isolate errors in the program easily. Program execution is controlled by setting breakpoints and single-stepping in either high-level or assembly level modes.

Free Software Foundation distributes GDB, which is a stand alone debugger that will run under the UNIX operating system. GDB can be used as a starting point in implementing source level debugger 22. The source code for GDB is converted to a format compatible with a Microsoft "C" compiler running under DOS. Certain standard functions used in the program are altered such that they call their equivalents in Microsoft "C" To obtain a communications interface with WINDOWS 3.0, the altered source code is linked to be a dynamic linked library (DLL). The GDB DLL retains its command line interface and does not allow WINDOWS applications to directly link to its modules. Thus the debugger retains its essential quality of being a standalone executable module, but it also is one which has provisions for communicating with other WINDOWS applications via ASCII strings in a manner parallel to its original operation.

The source level debugger 22 has five basic functions:

1. start of the program, specifying anything that might affect its behavior;
2. make the program stop on specified conditions;
3. examine what has happened when the program has stopped, such that a user can debug the code;
4. change things in the program, so a user can correct the effects of one bug and go on to learn about another without having to re-compile first; and
5. interface to and execute ICE 10 emulator commands.

The source level debugger 22 software loads on the PC/AT 20 or host system and preferably presents a user with a friendly, high-level interface to the target system 14. This computer-implemented process also communicates through a parallel interface to target system 14 microprocessor.

Invoking the Source Level Debugger

The source level debugger 22 is preferably invoked with DOS command line or a UNIX shell command. Once started, it reads commands from a terminal until a user tells it to exit. The source level debugger 22 usurps a dedicated PC software interrupt and is used to query a terminate and stay resident (TSR) program. The debugger 22 has a run-time library version of low level control interface 21, and has monitor level information. This interrupt defaults to "47", and it may be changed by specifying an alternative interrupt value when invoking source level debugger 22.

When source level debugger 22 starts up, it automatically executes "init" files on the host system. The source level debugger 22 reads and executes the init file (if any) in the home directory and then the init file (if any) in the current working directory. If an init file exists in both directories, then they are both executed. The init files are not executed if the -nx option has been given. Command files may also be called with the source command.

Input Conventions

Source level debugger 22 commands are input on a single line. There is preferably no limit on how long a command can be. Each line starts with a command name, and is followed by arguments that depend on the command type. A few commands do not require argument values.

The source level debugger 22 command names may alternatively be abbreviated if the abbreviation is not ambiguous. But sometimes even ambiguous abbreviations can be tolerated. For example, s is specially defined as equivalent to step, even though there are other commands whose names start with s. Possible command abbreviations should be stated in the user instructions for individual commands.

A blank line as input to the source level debugger 22 is used as a command to repeat the previous command. Certain commands do not allow such repeating. These are commands for which an unintentional repetition might cause trouble and for which a user is unlikely to want repetition. Certain others (e.g., list and x) permutate when being repeated.

Lines of input starting with "#" are comments, and do nothing more than document a file. This is useful mainly in command files. The source level debugger 22 prompts for commands with a cursor prompt.

set-prompt<string>: directs source level debugger 22 to use <string> as its prompt henceforth;

system <command>: directs source level debugger 22 to execute a command. If <command> is not given, a push to DOS will occur and the DOS prompt will appear on the command line. Type "exit" to return to the source level debugger 22; and exmon <command>: directs source level debugger 22 to send a command to ICE 10 monitor and displays the result.

To exit the source level debugger 22, use the quit command (abbreviated q). Entering a Ctrl-C will terminate any currently executing source level debugger 22 command and return control to the command line prompt.

Specifying Files

The source level debugger 22 needs to input the filename of the program to be debugged. Various commands are associated with specifying source level debugger 22 files, as follows:

Specifying Files With Arguments—The usual way to specify the executable file name is with an argument given when a user starts the source level debugger 22. The first argument is the file for execution and symbols; and Specifying Files with Commands—A user specifies the files for the source level debugger 22 to work with by inputting arguments when a user invokes the source level debugger 22. But occasionally, it is necessary to change files during a source level debugger 22 session. A user may alternatively run the source level debugger 22 and neglect to specify the files to use. In these situations, the source level debugger 22 commands to specify alternative files are useful.

The following commands are acceptable as input:

exec-file <filename>: Specifies that the program to be run is <filename>. If a user does not specify a directory and the file is not found in the source level debugger's working directory, the source level debugger 22 will use the environment variable PATH as a list of directories to search.

symbol-file <filename>: Reads symbol table information from file <filename>. PATH is searched when necessary. Most of the time a user will use both the exec-file and symbol-file commands on the same file. Symbol-file with no argument clears out the source level debugger's symbol table.

add-file <filename> <address>: When performing incremental linking, the symbol table of an incrementally linked file may be included in the link step, but the source level debugger 22 needs to be told where that the symbol table is in the address space. By issuing this command, it is possible to symbolically debug programs which make use of incremental loading in a completely natural fashion. GNU/960 may not support this option, so the implementer will need to check this point; and info files: Prints the names the executable file currently in use by The source level debugger 22, and the file from which symbols were loaded.

While all file specifying commands allow both absolute and relative file names as arguments, the source level debugger 22 preferably always converts the file name to an absolute one and records the path name.

The symbol-file command causes the source level debugger 22 to discard the contents of its convenience variables, the value history, and all breakpoints and auto-display expressions. This is because they may contain pointers to the internal data recording symbols and data types, which are part the old symbol table data being discarded inside source level debugger 22.

Using the Source Level Debugger

When a user invokes the source level debugger 22, information can be passed concerning the files and type of operation. The following describes the various options a user has while typing on the source level debugger 22 command line.

Mode Options

-i: specifies the PC/AT 20 software interrupt;

-nx: do-not-execute-commands from within the initialization file gdbinit. Normally, the commands in these files are executed after all the command options and arguments have been processed;

-q: "quiet," inhibits the usual introductory messages; and

-batch: run in batch mode. Batch mode will exit with code "1" after processing all the command files specified with -x (and gdbinit, if not inhibited, see -nx). It will also exit if, due to an error, the source level debugger 22 would otherwise attempt to read a command from the terminal.

File-Specifying Options

All the options and command line arguments given are processed in sequential order. The order makes a difference when, for example, the -x command is used.

-s <file>: Read symbol table from file <file>.

-e <file>: Use file <file> as the executable file (program).

-se <file>: Read symbol table from file <file> and use it as the executable file.

-x <file>: Execute The source level debugger 22 commands from file <file>.

-d <directory>: Add <directory> to the path to search for source files.

Breakpoints

A breakpoint makes the program stop whenever a certain point in the program is reached. A user sets breakpoints explicitly with the source level debugger 22 commands, specifying the place where the program should stop by line number, function name or exact address in the program. A user can add various other conditions to control whether or not the program will stop.

Each breakpoint is assigned a number when it is created. These numbers are successive integers starting with "1". In many of the commands, the breakpoint number is used to communicate which breakpoint a user wants to change. Each breakpoint may be enabled or disabled. If disabled, the breakpoint will not effect the program. Breakpoints may be deleted by specifying their number or may be cleared from a section of code.

info break <bnums>: The command info break prints a list of all breakpoints showing their numbers, where in the program they are, and any special features associated with each. Disabled breakpoints are included in the list, but marked as disabled. Info break with a breakpoint number as argument lists only that breakpoint. The convenience variable "$" and the default examining-address for the x command are set to the address of the last breakpoint listed.

Setting Breakpoints

The source level debugger 22 allows a user to set any number of breakpoints (which can be hardware or software breakpoints) all at the same place in the program, or at different places. The command set follows:

- break: Sets a breakpoint at the next instruction to be executed in the selected stack frame. The program will stop immediately if the break is invoked inside the innermost stack frame. If the break is invoked in any other stack frame, the program will halt as soon as control returns to that frame. This command is abbreviated b;
- break <function>: Sets a breakpoint at entry to function <function>;
- break <linenum>: Sets a breakpoint at line <linenum> in the current source file. The breakpoint will stop the program before it executes the specified line;
- break <filename>:<linenum>: Set a breakpoint at line <linenum> in source file <filename>;
- break <filename>:<function>: Set a breakpoint at entry to function <function> found in file <filename>. Specifying a filename as well as a function name is superfluous except when multiple files contain similarly named functions;
- break *<address>: Set a breakpoint at address <address>. A user can use this to set breakpoints at absolute addresses where line numbers are not known;
- break . . . if <cond>: Set a breakpoint with condition <cond>; evaluate the expression <cond> each time the breakpoint is reached, and stop only if the value is nonzero. ". . ." represents one of the possible arguments described above (or no argument) specifying where to break; and
- tbreak <args>: Set a breakpoint enabled only for one stop. <Args> are the same as in the asynchronous halt command, and the breakpoint is set in the same way however, the breakpoint is automatically disabled the first time it is hit.

Clearing Breakpoints

It is often necessary to eliminate a breakpoint when a user no longer wants the program to halt. This is called "clearing" or "deleting" the breakpoint. Breakpoints that have been cleared or deleted no longer exist.

With a "clear" command, a user can clear breakpoints according to where they are in the program. With a "delete" command a user can clear individual breakpoints by specifying their breakpoint numbers. It is not necessary to clear or delete a breakpoint to proceed past it. Once a breakpoint has occurred, the source level debugger 22 will automatically proceed normally; it will not halt at the same breakpoint.

- clear: clears any breakpoints at the next instruction to be executed in the selected stack frame. When the innermost frame is selected, this is a good way to clear a breakpoint that halted the program;
- clear <function>: clears any breakpoints set at entry to the function <function>;
- clear <filename>: <function>: clears any breakpoints set at entry to the function <function> with the source file <filename>;
- clear <linenum>: clears any breakpoints set at or within the code the specified line <linenum>;
- clear <filename>: <linenum>: clears any breakpoints set at the specified line <linenum> in the source file <filename>; and
- delete <bnums . . . >: deletes the breakpoints the numbers specified as <bnums>.

Disabling Breakpoints

Rather than permanently clearing a breakpoint, a user might prefer to just temporarily disable it. This disables the breakpoint as if it had been cleared, but stores the information on the breakpoint such that a user may easily retrieve and re-enable it later.

A user disables and enables breakpoints with the enable and disable commands, by specifying one or more breakpoint numbers as arguments. Command info break is used to print a list of breakpoints when a user does not know which breakpoint numbers are available.

A breakpoint can be in any one of four different states:

- Enabled. The breakpoint will stop the program. A breakpoint made with the asynchronous halt command starts out in this state;
- Disabled. The breakpoint has no effect on the program;
- Enabled once. The breakpoint will stop the program, but when it does so it will become disabled. A breakpoint made with the tasynchronous halt command starts out in this state; and
- Enabled-for-deletion. The breakpoint will stop the program, but immediately after it does so the breakpoint is deleted.

The commands associated with breakpoint use are as follows:

- disable <bnums . . . >: Disable the specified breakpoints. A disabled breakpoint has no effect, but is not forgotten;
- enable <bnums . . . >: Enable the specified breakpoints;
- enable once <bnums . . . >: Enable the specified breakpoints temporarily. Each breakpoint is disabled after finding a first match; and
- enable delete <bnums . . . >: Enable the specified breakpoints to match once and then delete automatically.

Break Conditions

The simplest kind of breakpoint interrupts every time a target system 14 program's execution address matches a specified location. A user can also specify a conditional for a breakpoint. A conditional is a Boolean expression as used in standard programming language. A breakpoint with a conditional first looks for a match address and then looks to see if the target system 14 data and/or address satisfies the conditional, the program stops only if both are true (found matches).

Break conditions are specified when a breakpoint is set, by using it in the arguments to the asynchronous halt command. They can also be changed at any time with the condition command.

- condition <bnum> <expression>: specify <expression> as the break condition for breakpoint number <bnum>. From now on, this breakpoint will stop the program only if the value of <expression> is true (nonzero, in C). <expression> is not evaluated at the time the condition command is given; and
- condition <bnum>: remove the condition from breakpoint number <bnum>. It then becomes an ordinary unconditional breakpoint.

Ignore is a special kind of conditional. It disables a breakpoint for n number of times. The "ignore <count>" command is entered by a user. When a target system 14 program reaches a breakpoint with a positive ignore count, the count is decremented by one and tracing continues. But when the count reaches zero, the breakpoint takes effect and interrupts tracing.

ignore<bnum><count>: sets the ignore count of breakpoint number <bnum> to <count>. The next <count> times the breakpoint is reached, it will not stop. To make the breakpoint stop the next time it is reached, specify a count of zero; and cont <count>: continues execution of the program, setting the ignore count the breakpoint that the program stopped at to <count> minus one. Continuing through the breakpoint does not itself count as one of <count>. Thus, the program will not stop at this breakpoint until the hit has repeated <count> number of times. This command is allowed only when the program stopped due to a breakpoint. At other times, the argument cont is ignored.

If a breakpoint has a positive ignore count and a condition, the condition need not be checked. Once the ignore count reaches zero, the condition is tested. A user could duplicate the effect of the ignore count with a condition such as "$foo-0" using a debugger convenience variable that is decremented each time.

Commands Executed on Breaking

A user can give any breakpoint a series of commands to execute when the program stops due to that breakpoint. For example, a user might want to print the values of certain expressions, or enable other breakpoints.

commands<bnum>: Specifies commands for breakpoint number <bnum>. The commands themselves appear on the following lines. A line containing haying the word end will terminate all commands.

It is possible for breakpoint commands to be able to restart the target's program with the cont, step, or any other command that resumes target system 14 execution. However, any breakpoints specified after the program resumes are ignored.

If the first command specified is silent, a message about stopping at a breakpoint is not printed. This may be desirable for breakpoints that are to print a specific message and then continue. If the remaining commands print nothing, a user will see no sign that the breakpoint was reached at all. The silent command is used only in conjunction with the commands command.

The commands echo and output allow a user to print precisely controlled output are useful in silent breakpoints. For example, a user could use breakpoint commands to print the value of x at the entry to foo whenever it is positive. Assuming that the newly created breakpoint is number 4; break will print the number that is assigned.

break foo if x>0
commands 4
silent
echo x is040
output x
echo n
cont
end

One use for the breakpoint commands is in correcting a known bug such that a user can test for more bugs. First, a breakpoint is inserted just after an erroneous line of code, a condition is given to detect the case in which something erroneous has been done, and a list of the commands is made to assign correct values to any variables that need them. Finally, the cont command ends such that the program does not stop, and starts with the silent command such that no output is produced. For example:

break —3
commands 5
silent
set x=y+4
cont
end

Continuing cont: Continue running the program at the place where it stopped.

If a target system 14 program stops at a breakpoint, it will resume execution beginning at the breakpoint address. The "cont" command allows a target system 14 program to pass through the involved breakpoint. An ignore-count for the breakpoint may be added to the cont command.

Stepping

Stepping allows a target system 14 program to execute one line of code or one machine instruction per step. Breakpoints are active during stepping and a target system 14 program will stop for them even if it has not jumped as far ahead as the stepping command prescribes.

step: proceeds with execution of a target system 14 program until control reaches a different line, then stop and return to the debugger. This command is abbreviated s;

step <count> : proceeds as in step, but does so <count> times;

next similar to step, but any function calls appearing within the line of code are executed without stopping. Execution stops when control reaches a different line of code at the stack level which was executing when the next command was given. This command is abbreviated n;

next <count>: proceeds as in next, but does so <count> times;

finish: continues running until just after the selected stack frame returns or a breakpoint occurs;

stepi: proceeds one machine instruction, then stop and return to the debugger. It is often useful to do display/i $ip when stepping by machine instructions. This will cause the next instruction to be executed to be displayed automatically at each stop. This command is abbreviated si;

stepi <count>: proceeds as in stepi, but does so <count> times;

nexti: proceed one machine instruction; if it is a subroutine call, proceed until the subroutine returns. This command is abbreviated ni; and nexti <count>: proceeds as in nexti, but does so <count> times.

Examining Stack Frame

After stopping with a breakpoint or a halt, a user needs to know the target machine's path of execution, such as calls, returns, etc. Each time a target system 14 program performs a function call, the information about where in a target system 14 program the call was made from is saved in a block of data called a stack frame. The stack frame also contains the arguments for the program calls and any local variables for the function called. All stack frames are allocated to a region of memory called a procedure stack. When a target system 14 program halts, the source level debugger 22 allows a user to examine the stack to inspect the register sets and pointers.

There are preferably included commands to select a single frame of interest. Many of the source level debugger 22 commands refer implicitly to a selected frame. In particular, whenever a user commands the source level debugger 22 to supply the value of a variable in a target system 14 program, the value is determined from the selected frame. When the target system 14 program stops, the source level debugger 22 automatically selects the innermost frame and the currently executing frame and outputs a brief description.

Frames

The procedure stack is divided into contiguous pieces called frames. Each frame is the data associated with one call to one function. The frame contains the arguments given to the function, the function s local variables, and the address at which the function is executing.

When a target system 14 program is started, the stack has only one function mainframe. This is called the initial frame or the outermost frame. Each time a function is called, a alternative frame is made. Each time a function returns, the frame for that function invocation is eliminated. If a function is recursive, there many frames for the same function. The frame for the function in in which execution is actually occurring is called the innermost frame. This is the most recently created of all the stack frames that still exist.

Inside a target system 14 program, stack frames are identified by their addresses. This address is kept in a register called the frame pointer.

The source level debugger 22 assigns numbers to all stack frames, starting with zero for the innermost frame, one for the frame that called it, and so on upward.

Backtrace

A backtrace is a summary of program execution. If more than one call occurs, multiple frame information will be shown on one line per frame starting with the currently executing frame (frame zero), followed by its caller (frame one), and on up the stack.
- backtrace: prints a backtrace of the entire stack: one line per frame for all frames in the stack. This command is abbreviated bt; and
- backtrace <n>: Same as backtrace, but stops after <n> frames. This command is abbreviated bt <n>.

Each line in a backtrace shows the frame number, a target system 14 program counter, the function and its arguments, and the source file name and line number (if known).

Selecting a Frame

Most commands for examining the stack and other data in a target system 14 program work on the selected stack frame.
- frame <n>: Selects frame number <n>. Remember that frame zero is the innermost currently executing frame, frame one is the inner most, and so on. The highest-numbered frame is main's frame;
- frame <addr>: Selects the frame at address <addr>. This may be used when the chaining of stack frames has been damaged by a bug, making it impossible for the source level debugger 22 to assign numbers properly to all frames. This can also be useful when a target system 14 program has multiple stacks and options between them;
- up<n>: Selects a frame <n> number of frames up from the selected frame. For positive numbers <n>, this advances toward the outermost frame (e.g., higher frame numbers). <N> defaults to one; and
- down <n>: Selects a frame <n> number of frames down from the selected frame. For positive numbers <n>, this advances toward the innermost frame (e.g., lower frame numbers). <N> defaults to one.

All of these commands end by printing information from the selected frame, e.g., the frame number, the function name, the arguments, the source file and line number, and the source line text. For example:
3 main (argc=3, argv=??,env=??) at main.c,line 67
67 read,inputfile (argv[i]);

After such a printout, the list command with no arguments will print ten lines centered on the point of execution in the frame.

Information on a Frame

There are several other commands to print information about the selected stack frame.
- frame: prints a brief description the selected stack frame. It is abbreviated f. With an argument, this command is used to select a stack frame; with no argument, it does not change which frame is selected, but still prints the information.
- info frame: prints a verbose description of three frames centered on the selected stack frame, the frame addresses, the address of the frame's arguments, the program counter, and the registers.
- info frame <addr>: prints a description the frame at address <addr>, without selecting that frame. The selected frame remains unchanged by this command.
- info args: prints the arguments the selected frame, each on a separate line.
- info locals: prints the local variables the selected frame, each on a separate line. These are all variables declared within a target system 14 program executed from this frame.

Examining Source Files

When target system 14 program stops, the source level debugger 22 prints the line where it halted. Likewise, when a user selects a stack frame, the source level debugger 22 prints the line where execution is halted. A user can also print parts of source files using explicit commands.

Printing Source Lines

The list command (abbreviated "l") prints lines from a source file. There are several ways to specify what part of the file a user wants to print.

Repeating a list command with RETURN discards the argument, so it is equivalent to typing in list. An exception is made for an argument of-, that argument is preserved in repetition such that each repetition moves up in the file.
- list: prints ten lines. If the last lines printed were with a list command, ten more sequential lines are printed; however, if the last line printed was a single line from some other command, list will print ten lines centered around that line;

list <linenum1> <linenum2>: prints ten lines centered around line number <linenum1> in the current source file. When the list command has two linenums, it display the specified range. If <linenum1> equals <linenum2>, only the specified line will be printed;

list <function>: prints ten lines centered around the beginning of function <function>;

list <filename>:<linenum>: specifies line linenum> in the source file <filename>;

list <filename>:<function>: prints ten lines centered around the beginning the function <function> in the file <filename>. The is needed with a function name only for ambiguity resolution of identically named functions in different source files.

list -: prints ten lines just before the lines last printed;

list <first >,<last>: prints lines from <first> to <last>. Both arguments are linespecs.

list,<last>: Prints ten lines ending with <last>;

list <first>,: prints ten lines starting with <first>;

list+ <offset>: prints ten lines just after the lines last printed. Specifies the offset down from the first line;

list<offset>: <offset>as a second parameter prints ten lines just before the lines last printed. <offset> as a second parameter specifies the offset up from the last line;

list * <address>: specifies the line containing a target system 14 program address <address>. <Address> may be any expression; and info line <linenum>: prints the starting and ending addresses the compiled code for source line <linenum>.

Searching Source Files

There are two commands for searching through the current source file for a regular expression:

forward-search <regexp>: Checks each line, searching forward, for a match of regexp. Lines with matches found are listed. A user can abbreviate the command with fo.

reverse-search <regexp>: Checks each line, searching backward, for a match of regexp. Lines with matches found are listed. A user can abbreviate this command with rev.

Specifying Source Directories

The source level debugger 22 records a list of directories to search for source files, and is called a source path. Each time the source level debugger 22 wants a source file, it tries all the directories in the path, in the order they exist in the path, until a file with the desired name is found.

When a user starts the source level debugger 22, the source path contains only the current working directory. To add other directories, the directory command is used, as follows:

directory: resets the source path to the current working directory the source level debugger 22. This requires confirmation. Directory with no argument can cause source files previously found by The source level debugger 22 to be found in a different directory. This command also clears out the tables the source level debugger 22 maintains about the source files it has already found;

directory <dirname>: adds directory <dirname> to the end the source path; and info directories: prints the source path and reports the directories it has stored.

Because the directory command adds to the end of the source path, it does not affect any file that the source level debugger 22 has already found. If the source path contains unwanted directories the procedure below is used to rearrange the directory path.

1. Choose the directory a user want at the beginning the source path.
2. Use the cd command to make that the current working directory.
3. Use directory with no argument to reset the source path to that directory.
4. Use directory with suitable arguments to add additional directories to the path.

Examining Data

The usual way of examining data in a target system 14 program is with the print command. It evaluates and prints the value of any valid "C" expression. Refer to the x command for examining raw data.

print<exp>: Where <exp> is any valid expression, and the value of <exp> is printed in a format appropriate to its data type. This command is abbreviated p.

Expressions

Many different source level debugger 22 commands will accept an expression and compute values. Any kind of constant, variable or operator defined by "C" is a legal expression in the source level debugger 22. This includes conditional expressions, function calls, casts and string constants.

In addition to supporting operators normally found in "C", the source level debugger 22 also supports some "C++" constructs. For example, one can call member functions (the source level debugger 22 automatically uses this when necessary), then examine and manipulate pointers to members, and set pointers to member functions (virtual or otherwise).

Source level debugger 22 supports three kinds of operators in addition to those of "C":

@ : "@" is a binary operator for treating parts of memory as arrays.

:: : "::" Allows a user to specify a variable in terms the file or function it is defined in. It also supports the "C++" convention of qualifying a variable reference according to a type name (or the global scope). For example, this makes it easy to examining static class variables.

<type> <addr>: Refers to an object of type <type> stored at address <addr> in memory. <Addr> may be any expression whose value is an integer or pointer (but parentheses are required around non-unary operators, just as in a case). This construct is allowed regardless of what kind of data actually resides at <addr>.

Program Variables

Variables in expressions are understood in the selected stack frame. Variables must either be global, static, or visible, according to the "C" scope rules. This means that in the following function:

foo (a);
int a;
{

```
bar (a);
{
int b=test ();
bar (b);
}
}
```

The variable "a" is visible whenever a target system 14 program is executing within the function foo, but the variable "b" is visible only while a target system 14 program is executing inside the block in which b is declared.

Artificial Arrays

An array, a section of an array, or an array having a dynamically determined size for which only a pointer exists in a target system 14 program may be displayed. An "artificial array" is constructed with binary operator @. The left operand of @ should be the first element the desired array. The right side operand should be the length the array. The result is an array value whose elements are all the type specified by the left side argument. For example, if a program says "int *array=(int*) malloc (len *sizeof (int))";

a user can print the contents of array with,

"p *array@len".

The left operand of @ must reside in memory. Array values made with @ in this way act like other arrays, in terms of subscripting, and are coerced to pointers when used in expressions.

Formats

The source level debugger 22 prints all values according to their data types. However, a user might want to print numbers in hex, a pointer in decimal, or view data in memory at a certain address as a character string or an instruction. The arguments the print command start with a slash and a format letter. The format letters supported are listed below.

- x: regard the bits the value as an integer, and prints the integer in hexadecimal.
- d: prints as integer in signed decimal.
- u: prints as integer in unsigned decimal.
- o: prints as integer in octal.
- a: prints as an address, both absolute in hex and relative to a symbol.
- c: regard as an integer and prints it as a character constant.
- f: regard the bits the value as a floating point number and prints using floating point syntax.

For example, to print the instruction pointer in hex the user would type:

p/x $ip. Note that no space is required before the slash.

To reprint the last value in the value history with a different format, a user can use the prints command with a format type and no expression. For example, p/x reprints the last value in hex.

Examining Memory

The x command is used to examine memory without reference to a program's data types. X examines data in memory at a specified address, and prints it in the specified format.

Command x can be followed by a slash and an output format specification, and by an address. The address need not have a pointer value.

The output format specifies both how big a unit of memory to examine and how to print the contents of that unit.

The default examine address for the x command is changed to the starting address of the line, such that x/i is sufficient to begin examining machine code. Also, this address is saved as the value the convenience variable $_.

These letters specify just the size of unit to examine:
- b: Examine individual bytes;
- h: Examine halfwords (two bytes each);
- w: Examine words (four bytes each); and
- g: Examine giant words (8 bytes).

These letters specify the format in which to print the contents:
- x: Prints integers in unsigned hexadecimal;
- d: Prints integers in signed decimal;
- u: Prints integers in unsigned decimal;
- o: Prints integers in unsigned octal;
- a: Prints an address, both absolute in hex and relative to a symbol;
- c: Prints character constants;
- f: Prints floating point. This works only with unit sizes w and g;
- s: Prints a null-terminated string of characters. The specified unit size is ignored Instead, the unit is however many bytes it takes to reach a null character (inclusive); and
- i: Prints a machine instruction. The specified unit size is ignored. The number of bytes in an instruction varies depending on the type of machine, the opcode and the addressing modes are used.

If either the manner of printing or the size of unit fails to be specified, the default is the previous usage.

A user may also omit the address to examine. Then the address used is the last address specified. The prints command sometimes sets the default address for the x command. When the value printed resides in memory, the default is set to examine the same location. Info line also sets the default for x to the address of the start of the machine code for the specified line. Info breakpoints sets the default to the address of the last breakpoint tested.

When a user enters RETURN to repeat an x command, it will not repeat exactly. For instance; the address specified previously (if any) is ignored, such that the repeated command examines successive locations in memory.

A user can examine several consecutive units of memory with one command by entering a repeat-count after a slash (before the format letters, if any). The repeat count itself is a decimal integer. It has the same effect as repeating the x command that many times except that the output may be more compact with several units per line. For example:

x/10i $ip prints ten instructions, starting with the instruction to be executed next in the selected frame. After doing this, a user could print the next ten instructions by entering:

x/10 in which the format and address are allowed to default.

The addresses and contents printed by the x command are not put in the value history. Instead, the source level debugger 22 makes these values available for subsequent use in expressions as values the convenience variables $ and $ After an x command, the last address examined is available for use. In expressions in the convenience variable $_. The contents of that address, as examined, are available in the convenience variable $_.

If the x command has a repeat count, the address and contents saved are from the last memory unit printed; this is not the same as the last address printed if several units were printed on the last line of output.

Automatic Display

To print the value of an expression frequently, it is added to the automatic display list such that the source level debugger 22 will print its value each time a target system 14 program stops. Each expression added to the list is given an identifying number. The automatic display looks like the following:

2: fcn=38
3: bar(5)=(struct hack *) 0x3804 showing item numbers, expressions and their current values. The commands for display are as follows:

- display: displays the current values the expressions in the list;
- display<exp>: adds the expression <exp> to the list;
- display/<fmt> <exp>: for <fmt> specifying only a display format and not a size or count, adds the expression <exp> to the auto-display list in the specified format <fmt>;
- display/<fmt> <addr>: for <fmt> i, s, unit-size or a number of units, adds the expression <addr> as a memory address. Examining means in effect doing x/fmt <addr>;
- undisplay <n>: removes item number <n> from the list of expressions to display; and
- info display: prints the list of expressions to display automatically with its item number, but without showing the values.

Value History

Every value printed by the print command is saved for the entire session in a value history such that a user can refer to it in other expressions.

The values printed are given history numbers. These are successive integers starting with one. A print out reports to a user the history number assigned to a value by outputting $n=before the value (n is the history number). To refer to any previous value, a $ followed by the value's history number is used. A sole $ refers to the most recent value in the history, and a $$ refers to the value before that. For example suppose a user has just printed a pointer to a structure and wants to look at the contents of the structure. The user can type in:

p*$.

If the user has a chain of structures where a component "next" points to the next structure, the user inputs:

p *$.next.

It might be useful to repeat this command many times by typing RETURN. The history records values, not expressions. If the value of x is four and a user types:

prints x.
setx=5 then the value recorded in the value history by the print command remains four even though the value for x has changed.

- info history: Prints the last ten values in the value history, with their item numbers. This is like p $$9 repeated ten times, except that info history does not change the history; and
- info history <n>: Prints ten history values centered on history item number <n>.

Convenience Variables

The source level debugger 22 has convenience variables that a user can use within the source level debugger 22. These variables exist entirely within the source level debugger 22. They are not part of a target system 14 program, and setting a convenience variable has no effect on further execution of a target system 14 program. Convenience variables have names that start with $. Any name starting with a $ is used for a convenience variable, unless it is one of the predefined set of register names. A user can save a value in a convenience variable with an assignment expression, just as the user would set a variable in a target system 14 program.

Example:
set $foo="object_ptr.

would save in $foo the value contained in the object pointed to by object_ptr.

Using a convenience variable for the first time creates it, but its value is void until a user assigns a alternative value. A user can alter the value with another assignment at any time. Convenience variables have no fixed types. A user can assign a convenience variable any type of value, even if it already has a value of a different type. The convenience variable as an expression has whatever type its current value has.

- info convenience: prints a list of convenience variables and their values. This command is abbreviated icon.

One of the ways to use a convenience variable is as a counter to be incremented or a pointer to be advanced. For example:

set $i=0
prints bar[$i++]-> contents.

The command is repeated by typing RETURN. Some convenience variables are created automatically by the source level debugger 22 and given values intended to be useful.

- $_: The variable $ is automatically set by the x command to the last address examined. Other commands such as info line and info breakpoint have a default address for x to examine.
- $_: The variable $_ is automatically set by the x command to the value found in the last address examined.

Registers

Machine register contents are referred to in expressions as variables with names starting with $. The names of registers are different for each machine. Info registers is used to display register names. The names $ip and $sp are used on all machines for a target system 14 program counter register and the stack pointer. Often $fp is used for a register that contains a pointer to the current stack frame.

The source level debugger 22 preferably always considers the contents of an ordinary register as an integer when the register is examined in this way. Programs store floating point values in registers also, but there is no source level debugger 22 command to examine a specified register in floating point format. However, if the variable in a target system 14 program which is stored in the register is a floating point variable, a user can display the floating point value by examining the variable.

Some target system 14 machines have special floating point registers. The source level debugger 22 considers these registers" values as being floating point type when a user examines them explicitly. Some registers have distinct "raw" and "virtual" data formats. This means that the data format in which the register contents are saved by the operating system is not the same one that a target system 14 program sees. The info registers command prints the data in both formats.

Register values are relative to the selected stack frame. A user gets a value that the register would contain if all stack frames farther in were exited and their saved registers restored. In order to see the real contents of all registers, a user must select the innermost frame (with frame zero).

- info registers: prints the names and relative values of all registers; and
- info registers <regname>: prints the relative value of register <regname>.

Examples

A user prints a target system 14 program counter in hex with:

p/x $ip or prints the instruction to be executed next with, x/i $ip or adds four to the stack-pointer with, set $sp+ =4.

This last example shows how to remove one word from the stack. This assumes that the innermost stack frame is selected. Setting $sp is not allowed when other stack frames are selected.

Examining the Symbol Table

The commands described here allow a user to get information about the symbols (names of variables, functions and types) defined in a target system 14 program. This information is found by the source level debugger 22 in a symbol table loaded by the symbol-file command. It is inherent in the text of a target system 14 program and does not change as a target system 14 program executes.

- whatis <exp>: prints the data type of expression <exp>. <Exp> is not actually evaluated, and any operations, such as assignments or function calls, inside it do not take place;
- whatis: prints the data type of $, the last value in the value history;
- info address <symbol>: describe where the data for <symbol> is stored. For register variables, this prints the register. For other automatic variables, this prints the stack-frame offset at which the variable is stored. Refer to the prints symbol command;
- ptype <typename>: prints a description of data type <typename>. <Typename> may be the name of a type, or for "C" code it may have the form struct struct-tag, union union-tag or enum enum-tag;
- info sources: prints the names of all source files in a target system 14 program for which there is debugging information;
- info functions: prints the names and data types of all defined functions;
- info functions <regexp>: prints the names and data types of all defined functions whose names contain a match for regular expression <regexp>. Thus, info fun step finds all functions whose names include step; info fun ^ step finds those whose names start with step;
- info variables: prints the names and data types of all variables that are declared outside of functions;
- info variables <regexp>: prints the names and data types of all variables, declared outside of functions, whose names contain a match for regular expression <regexp>;
- info types: prints all data types that are defined in a target system 14 program;
- info types <regexp>: prints all data types that are defined in a target system 14 program whose names contain a match for regular expression <regexp>; and
- printsyms <filename>: Write a complete dump the debugger's symbol data into the file <filename>.

Altering execution

There are several ways to alter the execution of a target system 14 program with the source level debugger 22 commands, as follows:

Assignment to Variables

To alter the value of a variable, evaluate an assignment expression. For example, prints x=4 stores the value four into variable x, and then prints the value the assignment expression. Users not interested in seeing the value the assignment, enter the set command instead the print command. Set is really the same as prints except that the expression's value is not printed and is not put in the value history. The source level debugger 22 allows more implicit conversions in assignments than "C" does. A user can freely store an integer value into a pointer variable or vice versa, and any structure can be converted to any other structure that is the same length or shorter. In "C", all the other assignment operators such as += and ++ are supported.

To store into arbitrary places in memory, the {...} construct is used to generate a value of specified type at a specified address. For example, set {int}0x83040=4.

Continuing at a Different Address

- jump <linenum>: resumes execution at line number <linenum>. Execution will stop immediately if there is a breakpoint there.

The jump command does not change the current stack frame, the stack pointer, the contents of any memory location or any register other than a target system 14 program counter. If line <linenum> is in a different function from the one currently executing, the results may be fatal if the two functions expect different patterns of arguments or local variables. For this reason, the jump command requests confirmation if the specified line is not in the function currently executing.

- jump *<address>: Resume execution at the instruction at address <address>.

A similar effect is obtained by storing a alternative value into the register $ip.

set $ip=0x485 specifies the address at which execution will resume. Execution will not resume until a user use the cont command or a stepping command.

Canned Sequences of Commands

The source level debugger 22 has two ways to store sequences of commands for execution as a unit, user-defined commands and command files.

User-Defined Commands define <commandname>: defines a command named <commandname>. If there is already a command by that name, a user are asked to confirm that a user want to redefine it. The definition the command is made up of other the source level debugger 22 command lines, which are given following the define command. The end of these commands is marked by a line containing end; and document <commandname>: gives documentation to the user-defined command <commandname>. The command <commandname> must already be defined. This command reads lines of documentation just as define reads the lines the command definition. After the document command is finished, help on command <commandname> will prints the documentation a user has specified. A user may use the document command again to change the documentation of a command. Redefining the command with define does not change the documentation.

User-defined commands do not use arguments. An error in any command stops execution of the user-defined command. If commands that would prompt for confirmation are used interactively they will proceed without prompting. Many of the source level debugger 22 commands that normally prints messages omit them when used inside user-defined commands.

Command Files

A command file for the source level debugger 22 is a file of lines that are the source level debugger 22 commands. Comments, lines starting with #, may also be included. An empty line in a command file does nothing, it does not constitute a repeat command such as RETURN. A user can request execution of a command file from inside an init file with the source command.

source <filename>: Execute the command file <filename>.

The lines in a command file are executed sequentially. They are not printed as they are executed. An error in any command terminates execution of the command file.

Commands for Controlled Output

During the execution of a command file or a user-defined command, the only output that appears is what is explicitly printed by the commands the definition.

echo <text>: Prints <text>. Nonprinting characters are included in <text> using "C" escape sequences, such as\n to print a newline. No newline is printed unless a user specifies one.

A backslash at the end of text is ignored. This is useful for outputting a string ending in spaces, since trailing spaces are trimmed from all arguments. A backslash at the beginning of a line preserves leading spaces in the same way, because \ as an escape sequence stands for a space. Thus, to print "and foo=", enter:

echo \ and foo=\.

output <expression>: prints the value of expression> no newlines and no $nn =. The value is not entered in the value history.

output/<fmt> <expression>: prints the value of <expression> in format <fmt>. See the section on Formats for more information.

printf<string>,<expressions...>: prints the values the <expressions> under the control of <string>

The expressions are separated by commas and may be either numbers or pointers. Their values are printed as specified by <string>, exactly as if a target system 14 program were to execute print1 (sug, expressions . . . ); For example, a user can prints two values in hex as shown. printf "foo, bar-foo =0x%x,0x%xn",foo, bar-foo. The only backslash-escape sequences that a user can use in the string are the simple ones that consist of backslash followed by a letter.

COFF FILE FORMAT

The output from a link editor and assembler running on the PC/AT 20 is in a so-called COFF format (Common Object File Format). A common object file comprises a file header (if the file is a link editor output), a table of section headers, relocation information, (optional) line numbers, a symbol table and a string table. The structure is given in Table I below.

TABLE I

| File header. |
|---|
| UNIX system header. |
| Section 1 header. |
| ... |
| Section n header. |
| Section 1 data. |
| ... |
| Section n data. |
| Section 1 relocation. |
| ... |
| Section n relocation. |
| Section 1 line numbers. |
| Symbol table. |
| String table. |

The last three parts of an object file (line numbers, symbol table, and string table) may be missing if a target system 14 program was linked with the -s option or if they were removed by stripping. The relocation information will be absent after linking unless the -r option is used. The string table exists only if the symbol table contains symbols longer than eight characters. The sizes of each section are in bytes.

File Header

The source code format of the file header is:

```
struct filehdr
{
    unsigned short    f_magic;      /*magic number*/
    unsigned short    f_nscns;      /*number of sections*/
    long              f_timdat;     /*time and date stamp*/
    long              f_symptr;     /*file ptr to symtab*/
    long              f_nsyms;      /*symtab entries*/
    unsigned short    f_opthdr;     /*size of (opt hdr)*/
    unsigned short    f_flags;      /*flags*/
};
```

System Header

The source code format of the system header is:

```
typedef struct aouthdr
{
    short magic;        /*magic number*/
    short vstamp;       /*version stamp*/
    long tsize;         /*text size in bytes, (padded)*/
    long disze;         /*initialized data (.data)*/
```

-continued
```
    long bsize;         /*uninitialized data (.bss)*/
    long entry;         /*entry point*/
    long text_start;    /*base of text used for this file*/
    long data_start;    /*base of data used for this file*/
}AOUTHDR; .
```

Section Header
The source code format of the section header is:

```
struct scnhdr
{
    char          s_name[SYMNMLEN];  /*section name*/
    long          s_addr;            /*physical address*/
    long          s_vaddr;           /*virtual address*/
    long          s_size;            /*section size*/
    long          sscnptr;           /*file ptr to raw data*/
    long          s_relptr;          /*file ptr to relocation*/
    long          slnnoptr;          /*file ptr to line
                                       numbers*/
    unsigned      s_nreloc;          /*reloc entries*/
    short
    unsigned      s_nlnno;           /*line number entries*/
    short
    long          s_flags;           /*flags*/
}; .
```

Relocation
Object files have one relocation entry for each relocatable reference in the text or data. If relocation information is present it will be in the following format:

```
struct reloc
{
    long    r_vaddr;    /*(virtual) addr of ref.*/
    long    rsymndx;    /*index into symbol table*/
    ushort  r_type;     /*relocation type*/
}; .
```

The start of the relocation information is s_relptr from the section header. If there is no relocation information, s_relptr is zero.

Line Number
The cc command generates an entry in the object file for each "C" source line on which a breakpoint is possible. User's can refer to line numbers when using the source level debugger 22. The structure of these line number entries appears below.

```
    struct lineno
    {
        union
        {
            long l_symndx;
            long l_paddr;
                l_addr:
        }
        unsigned short l_lnno;
    };
```

Numbering starts with One at the top of the source file and increments independent of transition between functions. The initial line number entry for a function has l_lnno equal to zero, and the symbol table index the function's entry is in l_symndx. Otherwise, l_lnno is non-zero, and lfiaddr the physical address of the code for the referenced line. Thus the overall structure is the following:

| l addr | l lnno |
|---|---|
| function symtab index | 0 |
| physical address | line |
| physical address | line |
| function symtab index | 0 |
| physical address | line |
| physical address | line |

Symbol Table
The format of each symbol in the symbol table is described by the synmet structure, shown below. This structure is compatible with UNIX System V COFF, but has an added _n_dbx structure needed by the source level debugger 22.

```
#define SYMNMLEN 8
#define FILNMLEN 14
#define DIMNUM 4
struct syment
{
    union                    /*all ways to get a symbol name*/
    {
        char     _n_name(SYMNMLEN];  /*name of symbol
        struct
        {
            long   n_zeroes;    /*= = OL if in string table*/
            long   _n_offest;   /*location in string table*/
        )_n_n;
        char     *_n_nptr(2];   /*allows overlaying*/
        struct
    }
        char     _n_leadingzero;   /*nullchar*/
        char     _n_dbx_type;      /*stab type*/
        short    _n_dbx_desc;/*value of desc field*/
        long     _n_stab_ptr;      /*table pointer*/
    }_n_dbx;
    }_n;
    long     n_value;          /*value of symbol*/
    short                      /*section number*/
n_scnum;
    unsigned    n_type;        /*type and derived type*/
short
    char        n_class;       /*storage class*/
    char        n_numaux;      /*number of aux entries*]
};
#define n name      n._n_name
#define n zeroes    n._n_n._n_zeroes
#define n offset    n._n_n._n_offest
#define nnptr       n._n_nnptr[1]
```

Storage class member (n_class) is set to one of the constants defined in <storeclass.h>. Some symbols require more information than a single entry; they are followed by auxiliary entries that are the same as a symbol entry. The format is as follows:

```
union auxent{
    struct{
        long xtagndx;
        union{
            struct{
                unsigned short x_lnno;
                unsigned short x_size;
            }x_misc;
            union{
                struct{
                    long x_lnnoptr;
                    long x_endndx;
                }x_fcn;
                struct{
                    unsigned short
```

-continued

```
            x_dimen{DIMNUM];
        }x_ary;
    }x_fcnary;
        unsigned short x_tvndx;
}xsym;
stryct{
        long        x_scnlen;
        unsigned short x_nreloc;
        unsigned short x_nlinno;
}x_scn;
strvct{
        long        x_tvfill;
        unsigned short x_tvlen;
        unsigned short x_tvran{2];
    }x_tv;
};.
```

Indexes of symbol table entries begin at zero. The start of the symbol table is f_symptr (from the header) bytes from the beginning the file. If the symbol table is stripped, f_symptr is 0. The string table (if one exists) begins at f_symptr+(f_nsyms*SYMESZ) bytes from the beginning the file.

II. SECOND EMBODIMENT OF THE PRESENT INVENTION

In a second embodiment of the present invention, an ICE 100 adds a hardware board and software to the ICE 10. ICE 100 system comprises the following major sections:

1) Target system bus extension interface 130;
2) BUS 24 matchword detection circuit 132;
3) BUS 24 Trace memory 134 and associated circuit;
4) ADDRESS BUS multiple range matchword detection 136;
5) DATA BUS multiple range matchword detection 138;
6) User bus matchwords generation 140;
7) Multi-level trigger and store control 142;
8) Time tag 144, trace 146 and associated circuits; and
9) PC/AT interface circuit 148.

The software applications comprise an advanced basic monitor 152 and an advanced source level debugger 154. User interfaces are very important features for the ICE 100 design consideration. A user preferably has the following three options:

1) monitor 152: the basic ICE 100 monitor,
2) source level debugger 154: an enhanced ICE 100 source level debugger, or
3) XRAY: Microtec Research source level debugger.

Both monitor 152 and source level debugger 154 for the ICE 100 are preferably developed under Microsoft WINDOWS 3.0 (or later), since the WINDOWS based system has become an industry standard for the DOS graphical user interface. The ICE 100 comprises an enhanced Source level debugger 22' with the following capabilities:
  source level display and single step;
  display of symbolic variables;
  symbolic breakpoint setting;
  trace buffer display;
  variable trace history;
  simulated I/O;
  function call display history;
  register Cache operation;
  pass through mode;
  performance Analysis; and a capability to operate under a Microsoft WINDOWS 3.0, or equivalent, environment as a dynamic linked library.

The ICE 100 can interface to the Microtec Research XRAY source level debugger with the following capabilities:
  source level display and single step;
  display of symbolic variables;
  symbolic breakpoint setting; and
  interleave of assembly and source level trace.

Pass Through Mode

The ICE 100 has several performance analysis capabilities, including:

1) code coverage: ICE 100 registers all function (Call) hits (for a given range of addresses). Careful consideration is given to features which register all
2) histogram: ICE 100 provide the graphical histogram of the user program execution at the function level. A true execution address histogram is included for target system 14 microprocessors with internal cache, such as the Intel i960 CA. The analyze user code and to optimize user system performance. Two different types of histograms are available, address histogram and time histogram:
   a) address histogram—allows a user to determine the frequency of function calls. The user can optimize user system by improving these sections of code;
   b) time histogram—allows a user to determine the elapsed time (in time units) for all user executed functions. This is useful for applications where real time execution is important;
3) ICE 100 can determine the percentage of cache hits and misses for a given program. An "average time in the cache" for a given program is then derived from the above result. Careful investigation of the 960CA chip architecture is required for best results;
4) for a given user program, ICE 100 is able to time between any two points of execution using marked events;
5) ICE 100 is able to determine the interrupt latency for a user interrupt driven program; and
6) for a given user program, ICE 100 is able to determine the percentage of super scalar activity, e.g., multiple instructions per cycle.

ICEs 10 and 100 alternatively include a standard Ethernet interface. TCP/IP protocol is used to link ICE 100 to a host computer (e.g., Sun Workstation). This allows the user to remotely download and debug user target system 14 from a host computer (e.g., Sun Workstation). ICE 100 support several circuit analyzer functions which include the following capabilities:

1) multi-level Trigger: Up to 16 levels of triggering are available from ICE 100;
2) ICE 100 provides at least one Position counter 82 for the circuit analyzer function. A Position counter 82 for each level of triggering is optional;
3) ICE 100 provides at least one pass counter for the circuit analyzer function. A pass counter for each level of triggering is optional;
4) external range matchwords: There are four types of range matchwords (32 bits wide) in ICE 100. They are assigned to the 960CA address bus, the 960CA data bus, the 960CA BUS 24, and the discrete external circuit. Each of these matchwords can be used to selectively filter the trace buffer using a Store Control mechanism. It should be noted that both instruction and data inside the cache can not be detected by the range breakpoints mechanism. The user must disable cache to take advantage of the address and data range matchwords. Note: Some code might still be cached in the small cache which is leftover on the i960 CA possibly causing the range matchword to miss some events. Note: The address bus, data bus, and BUS 24 range matchword detection circuitry are RAM-based multiple range matchwords. The discrete external circuit range matchword retain the single range matchword as in ICE 100 hardware;

5) timeout trigger: ICE 100 contains the store control mechanism which improves the efficiency of the trace buffer. The store control mechanism detects different conditions to start and stop of the trace buffer data capturing. The store control mechanism supports:

1) matchword range breakpoint detection for:
   user address bus;
   user data bus; and
   discrete external circuit.
   the user bus(ses) can be qualified by Fetch, Read, Write, interrupt or DMA cycles as required. The user can also filter out waitstates on the trace buffer. The circuit analyzer functions also use the matchword range detection as inputs to its triggering mechanism. The Intel i960 CA address and data busses are inactive and contain unpredictable information when the Intel i960 CA operates from the internal cache;
2) selective tracing on BUS 24 trace buffer:
   branch;
   call;
   return; and
   mark events; and
3) trace reconstruction requires BUS 24 trace buffer to capture all data on BUS 24. e.g., Selective tracing does not allow trace reconstruction. Each entry captured in the trace buffer is stamped with a 40-bit wide time tag. The time tag allows the user to relatively measure the target system 14 activity in real time. The accuracy of the measurement is dependent on the accuracy of the system clock. This allows the user to synchronize multiple Intel i960 CA subsystems in user target system 14 design during the debugging process.

Multi-processor support features are implemented with the following options:
1) trigger IN and trigger OUT mechanism; and
2) master and slave time tagging synchronization.

The interface between the PC/AT 20 and ICE 100 is similar to that of ICE 10. A PC/AT 20 interface card, which allows ICE 100 to be mapped in the extended memory area, is used to eliminate an address conflict problem within the PC/AT's first megabyte of memory.

Ethernet (TCP/IP) is supported by selected PC/AT 20 compatible Ethernet cards on the market. All signals should be registered (instead of latched) at pod 12. Alternatively, ICE 100 can be controlled by a Micro Channel based systems such as a PS2 or an IBM RS6000 workstation. For low cost and high density reason, overlay memory may be implemented using DRAM if possible. ICE 100 software is developed under Microsoft WINDOWS 3.0. All ICE 100 software can alternatively be ported to the AIX (RS6000) environment. A suitable compiler is ported to the PC/AT 20 running under WINDOWS 3.0.

The following constraints and limitations apply to ICE 100:
1) ICE 100 is controlled by a 386 PC/AT 20 only with minimum of 4 Mb of memory. It is desirable that the Compaq model 3 portable computer (286) can be used for device demonstration purposes;
2) ICE 100 features, when running under the Microtec Research XRAY debugger, are limited by what the XRAY debugger is able to support; and
3) ICE 100 operates up to 33 Mhz using cable 18 design with selected components. Higher speed operation (e.g., 40 Mhz) requires an alternative cable design.

Overlay Memory

An overlay memory 180 (FIG. 5) is used to partially or totally replace user memory in target system 14. An overlay flex cable 182 (FIG. 5) connects into the PGA socket stack and couples overlay memory 180 into the target system 14 without complicating or compromising the traffic over buses 13 and 24 to pod 12. Overlay memory 180 can attach mechanically to pod 12 to reduce the number of loose pieces dangling. The user can thereby develop and debug target system 14 software in the overlay memory, even if target system 14 memory hardware is not yet working. Overlay memory 180 is in communication with ICE 100 over a high speed serial communication line 184. In this example, ICE 100 supports overlay memory ranging from 256K bytes to 4M bytes. The overlay memory is preferably mappable into and out of the target system 14 in 64K byte segments. The overlay memory should not exceed five wait states at 40 Mhz.

Monitor 122 provides basic monitoring and controlling of the ICE 100 hardware with a set of low level user interfaces. It is primarily targeted for hardware engineers and assembly language programmers.

The following pull-down menus are presented across the top of a PC/AT's screen:
FILE COMMAND BREAKPOINT EXAMINE TRACE PERF-
. ANA.

Each item in a pull-down menu can be selected with either the mouse or the keyboard. A submenu pop-up, if applicable, is provided for particular commands to allow different options for those commands. All optional selections are made following WINDOWS format. All function keys are assigned to a set of predefined sequences of commands to minimize user key strokes (using the WINDOWS format). Also see the MACRO command for user defined function key features, below. After the FILE is selected the following window is displayed below the FILE item in the main pull-down menu.
DOWNLOAD;
SUBMIT;
CREATE SUBMIT;
SAVE SUBMIT;
SAVE TRACE; and
LOAD SYMBOLS.

The DOWNLOAD command allows a user to download an object file from disk into the target system 14 memory. A user must enter the (path) file name and extension to be downloaded.

The SUBMIT command activates a script file containing several ICE 100 commands. The submit file name parameter is required for this command.

The CREATE SUBMIT command creates (opens) a (SUBMIT) script file. This file stores all subsequent ICE 100 commands until the SAVE SUBMIT command is encountered. A user may be prompted for the (alternative) SUBMIT filename.

The SAVE SUBMIT command closes the currently created SUBMIT script file.

The SAVE TRACE command allows a user to save the contents of a particular trace buffer into a DOS file. A DOS file name parameter is required for this command.

The LOAD SYMBOLS command allows a user to load the symbol table for a target system 14 program currently being debugged. A SYMBOLS file name parameter is required for this command.

After the COMMAND is selected the following window pops-up below the COMMAND item in the main pull-down menu:
GO;
STEP;
HALT;
FILL MEMORY;
ASSEMBLE;
DISASSEMBLE;
DIAGNOSTIC;
STATUS;
RESET; and
MACRO.

The GO command starts a target system 14 program execution. There are two options for this command:
ADDRESS; and
CONTINUE ADDRESS executes the GO command starting at this ADDRESS; and CONTINUE executes the GO command from the current IP.

A command initiates single step through a target system 14 program. There are two options for this command:
ADDRESS; and
CONTINUE.

ADDRESS executes an command starting at this ADDRESS; and

CONTINUE executes an command from the current IP.

The HALT command forces the Intel i960 CA to stop execution.

The FILL MEMORY command allows a user to fill the target system 14 memory. The following options are available for this command:
BYTE;
SHORT;
WORD;
DOUBLE;
TRIPLE; and
QUAD.

ASSEMBLE allows a user to invoke ICE 100 on line assembler to create simple assembly language programs.

DISASSEMBLE allows a user to disassemble the target system 14 memory content. A user can optionally specify the number of assembly lines to be disassembled, otherwise, a default value (one full screen) are used.

DIAGNOSTIC allows a user to activate one of several diagnostic (Read/Write) loops to troubleshoot the target system 14 hardware. The following options are available for this command:
READLOOP;
WRITELOOP; and
WRITE/READ LOOP.

READLOOP establishes a read loop at a specific address location. The data size can be BYTE, SHORT, or WORD.

WRITELOOP establishes a write loop at a specific address location. The data size can be BYTE, SHORT, or WORD.

WRITE/READ LOOP establishes a write then read loop at a specific address location. The data size can be BYTE, SHORT, or WORD.

The STATUS command reports the system status. Two options are available for the STATUS command:
ICE 100; and
PROCESSOR.

ICE 100 reports ICE 100 system status to a user. It is equivalent to the SC command in ICE 10 monitor 122 command.

PROCESSOR displays the processor's current setting similar to the DP command in ICE 100.

RESET resets the target system 14. Two options are available for the RESET command:
TARGET SYSTEM; and
ICE.

TARGET SYSTEM resets the Intel i960 CA processor using the target system 14 initialization information.

ICE resets the Intel i960 CA processor using the environment file initialization information.

MACRO allows a user to define a sequence of key strokes for a particular command.

The following window pops-up below the BREAKPOINT item in the main pull-down menu if the BREAKPOINT option is selected:
SET INTERNAL;
CLEAR INTERNAL;
SET EXTERNAL;
CLEAR EXTERNAL;
SET SOFTWARE;
CLEAR SOFTWARE;
TRIGGER IN;
TRIGGER OUT; and
MULTI LEVEL.

SET INTERNAL allows a user to SET breakpoints that are internal to the Intel i960 CA. Two options are available for this command:
INSTRUCTION; and
DATA.

INSTRUCTION allows a user to set up to two instruction address breakpoints using the two internal instruction breakpoints provided on the Intel i960 CA chip.

DATA allows a user to set up to two data breakpoints can be set using the two internal data breakpoints provided on the Intel i960 CA chip.

CLEAR INTERNAL allows a user to CLEAR breakpoint that is internal to the Intel i960 CA. Two options are available for:
INSTRUCTION; and
DATA.

INSTRUCTION clears one or both instruction breakpoints internal to the Intel i960 CA chip.

DATA clears one or both data breakpoints internal to the Intel i960 CA chip.

SET EXTERNAL allows a user to SET the external breakpoint in ICE 100. Three options are available for:
ADDRESS;
DATA; and
EXTERNAL.

ADDRESS sets breakpoint to detect a particular value (or a range) on a user address bus.

DATA allows breakpoints to be set to detect a particular value (or a range) on a user data bus.

EXTERNAL allows breakpoints to be set to detect a particular value (or a range) on a user defined external bus.

The CLEAR EXTERNAL command allows a user to CLEAR the external breakpoint in ICE 100. Three options are available for this command:

ADDRESS;
DATA; and
EXTERNAL.

ADDRESS clears the range breakpoint on the target system 14 address bus.

DATA clears the range breakpoint on the target system 14 data bus.

EXTERNAL clears the range breakpoint on a user defined external bus.

SET SOFTWARE allows a user to SET ICE 100 software breakpoint.

CLEAR SOFTWARE allows a user to CLEAR the ICE 100 software breakpoint(s). A list of software breakpoint currently being set are available to a user. Two options exist for this command:

ADDRESS; and
ALL

ADDRESS, allows a user to remove the software breakpoint at this address.

ALL, allows a user to remove ALL software breakpoints in the system.

The TRIGGER IN command allows a user to enable or disable the trigger in mechanism. There are two options for this command:

ENABLE; and
DISABLE.

ENABLE enables the trigger in mechanism.
DISABLE disables the trigger in mechanism.

TRIGGER OUT allows a user to enable or disable the trigger out mechanism. There are two options for this command:

ENABLE; and
DISABLE.

ENABLE enables the trigger out mechanism.
DISABLE disables the trigger out mechanism.

The MULTI LEVEL command allows a user to enter the multi level trigger function. There are menus to assist a user in setting up each level. Multi levels can be set up prior to a triggering level. The following window pops-up below the EXAMINE item in the main pull-down menu if the EXAMINE option is selected. A user can optionally alter the content of the target system 14 memory or register following the EXAMINE command:

MEMORY; and
REGISTER

The EXAMINE MEMORY command allows a user to access the target system 14 memory. The following options are available for this command:

BYTE;
SHORT;
WORD;
DOUBLE;
TRIPLE; and
QUAD.

The EXAMINE REGISTER command allows a user to display the Intel i960 CA registers. The following options are available for this command. The following window pops-up below the TRACE item in the main pull-down menu if the TRACE option is selected:

RECONSTRUCTION;
USER BUS;
EXTERNAL;
POSITION;
PASSIVE;
BRANCH;
CALL;
RETURN;
EVENT; and
MULTI LEVEL.

TRACE RECONSTRUCTION allows a user to reconstruct a target system 14 program trace.

TRACE USER BUS allows a user to display the content of a user bus trace buffer.

TRACE EXTERNAL allows a user to display the content of the external trace buffer.

TRACE POSITION allows a user to set the position counter 82 value.

TRACE PASSIVE allows a user to activate the passive trace feature. Two options are available:

ENABLE; and
DISABLE.

TRACE BRANCH enables a user to trace all BRANCH instructions in user program execution.

TRACE CALL enables a user to trace all CALL instructions in user program execution.

TRACE RETURN enables a user to trace all RETURN instructions in user program execution.

TRACE EVENTS enables a user to trace all BREAK EVENTS internal to the Intel i960 CA. The software also activates this for real-time measurement.

TRACE MULTI LEVEL allows a user to enter the multi level store control function. There are menus to allows a user to set up store control at each level. Multiple levels should be set up prior to a multi-level store control trace.

The following window pops-up below the PERFORMANCE ANALYSIS if the PERFORMANCE ANALYSIS option is selected:

ADDRESS HISTOGRAM;
TIME HISTOGRAM;
CODE COVERAGE (UAM);
TIME MEASUREMENT; and
CACHE.

ADDRESS HISTOGRAM creates a bar chart of up to 16 procedure addresses. It indicates the number of times each procedure was activated. This allows a user to determine how often a section of code (procedure) has been executing.

TIME HISTOGRAM enables a user to measure user system performance in real time. It determines how much time each specified procedure has spent and creates a bar chart to reflect the result.

CODE COVERAGE records all procedures that executed for a particular program run. This is useful in determining which section of code has not executed. It also helps a user to determine which section of code should be carefully analyzed by the histogram feature.

TIME MEASUREMENT allows a user to perform real time measurements of the software under various conditions. The following options are provided:

BETWEEN TWO ADDRESSES; and
INTERRUPT LATENCY.

On startup, a user sees three windows (see, FIG. 10):
1) a source window that contains current function, disassembly, or source and disassembly intermixed;
2) a command window (below the source window) shows a source level debugger prompt. A user is able to enter any source level debugger 22' command here;
3) a status window provides a small window at the top for source level debugger 124 information. There are additional displays which can also be brought up:
   a) register window to display 80960 registers;
   b) memory window to display raw target system 14 memory;
   c) calls window to display call sequence to get to current location;
   d) trace window to display execution trace;
   e) I/O window for simulated IO; and
   f) help windows a series of subwindows selected by other menus. One window per command.

The function keys are assigned commonly used commands-like CodeView. These are:
F1 main help window;
F2 show registers;
F3 switch from source to disassembly in source window;
F4 show user output (for simulated IO);
F5 go;
F6 switch cursor between source and command window
F7 go to cursor line;
F8 step;
F9 set breakpoint at line in source; and
F10 next (step over).

There is a menu bar for commands accessible through the pull-down menu system. The menu bar has:
FILE    VIEW    RUN    CALLS    TRACE    HELP Selecting these items pulls down the following menus:
FILE for the following file-oriented commands:
source Read file into source window;
exec loads executable file;
symb loads symbol file; and
exit Ends source level debugger 124 session;
VIEW for the following information viewing commands:
source opens an alternative source window;
memory opens an alternative memory window
register opens or closes the register window;
size changes size of current window; and
close closes the current window;
RUN for the following user-program run commands:
go execute from current location; and
restart execute from start of program;
CALLS no menu—just opens a window to display call sequence;
TRACE for the following execution trace display commands:
reconstr. display trace reconstruction;
signals display trace of 80960 signals;
external display trace of external signals; and
source link trace entry to source displays source corresponding to given trace entry; and
HELP pulls down menu of help categories.

A mouse is able to be used to select menu items or the current window for viewing and directing commands. A user is also able to move the cursor to any spot in the window. For instance, if the source window is the current window, and if a user clicks on a line in the source window, a cursor is put there. A subsequent F9 sets a breakpoint there. Refer to chapter 3 and 4 of Microtec XRAY960 User's Guide for detailed information about the XRAY960 user interface.

The multi-level trigger/store control circuit is a programmable state machine that controls level transitions, storing at each level and triggering. Store control and position count after the trigger are also provided. Event comparators called "matchwords" are formed from the address, data, and BUS 24, and provide the stimulus to cause level changes, triggering and storing.

A user may be presented with a template for LSA setup. A selected parameter field may be highlighted while the available choices appear in the pop-up window.
BMW: BUS MATCHWORD;
EMW: EXTERNAL MATCHWORD;
FMW: FUNCTION MATCHWORD; and
MW: MATCHWORD: Can be BMW, EMW or FMW.

BUS_MATCHWORD refers to the matchword
1) preferably always (matchword inputs are "does not cared");
2) never (null);
3) TRIG_IN+EMW+BMWxx (any OR'ed condition of TRIG_IN, EMW and one of 31 BMWs) a BMWxx can be:
   a) a range of addresses. It can also is a single address;
   b) a range of addresses qualified by a logical combination of Code Data, Read Write, DMa or Interrupts;
   c) a range of data values. It can also is a single data value; and
   d) a range of data values qualified by a logical combination of Code Data, Read Write, DMA or Interrupts. A EMW can be either a single 32-bit value or a range of 32-bit value. The total of address and data range matchwords can not exceed 31.

FUNC_MATCHWORD refers to a matchword equation for the function (Ice) bus.
1) preferably always (matchword inputs are "does not cared");
2) Never (null); and
3) One of 31 FUNCTION predefined matchwords. a FUNCTION matchword can be:
   a) all CALLS;
   b) a list of up to 16 CALL addresses;
   c) all CALLS EXCEPT a list of up to 16 CALL addresses;
   d) all RETURNS;
   e) a list of up to 16 RETURN addresses.
   f) all RETURNS EXCEPT a list of up to 16 RETURN addresses;
   g) all BRANCHES;
   h) a list of up to 16 BRANCH addresses.
   i) all BRANCHES EXCEPT a list of up to 16 BRANCH addresses;
   j) Instruction EVENT 1;
   k) Instruction EVENT 2;
   l) Data EVENT 1;
   m) Data EVENT 2;
   n) Mark EVENTS; and
   o) all messages. It should be noted that each specified address, either inclusive or exclusive, use up one of the 31 total matchwords.

1-65,535 (FFFF hex) are allowed count values. A default value of "1" is programmed in state machine 58.
1) LEV1-LEV15; and
2) TRIG (level 16).

1-65,535 (FFFF hex) are allowed count values. The value (FFFF-position count) is loaded into the position count registers.

Microsoft WINDOWS®

Microsoft WINDOWS 3.0 provides a screen-oriented user interface. Graphics screens are interfaced with instead of just text. Windows are overlapping, with a user specifying the final positions and sizes. The description of DBX tool can be used to define a standard model for a screen oriented source level debugger. DBX tool has five subwindows. The largest is the source window, which displays the source code that is being debugged.

The mouse is used to select breakpoints and variable names to be displayed. A cursor can also be put in a window. A main window is a command window, that allows a user to enter commands and to see results exactly as if commands were being entered to DBX. The command window also displays variables selected in the source window. A third window is the display window, which is used for display of user program output. This is used in conjunction with simulated IO. A buttons window allows a user to select frequently used commands with the mouse. A status window on top of the source window is a small information window. A user is presented with a menu bar that reports categories of commands. Selecting one of the categories pulls down an associated list of commands, or subcategories that can be pulled down for more commands. The pull-down menus display all the commands in an well-organized and easy-to-access manner.

Microsoft WINDOWS® provides multi-tasking. A pass-through mode in monitor 122 is done by bringing up a separate window that communicates to the monitor 122 run-time library on its own, rather then as part of source level debugger 124. Separate windows can be provided for sophisticated trace buffer analysis. Use of Microsoft WINDOWS® removes the well-known 640K DOS barrier.

ICE 100 HAREDWARE

Figure 9:
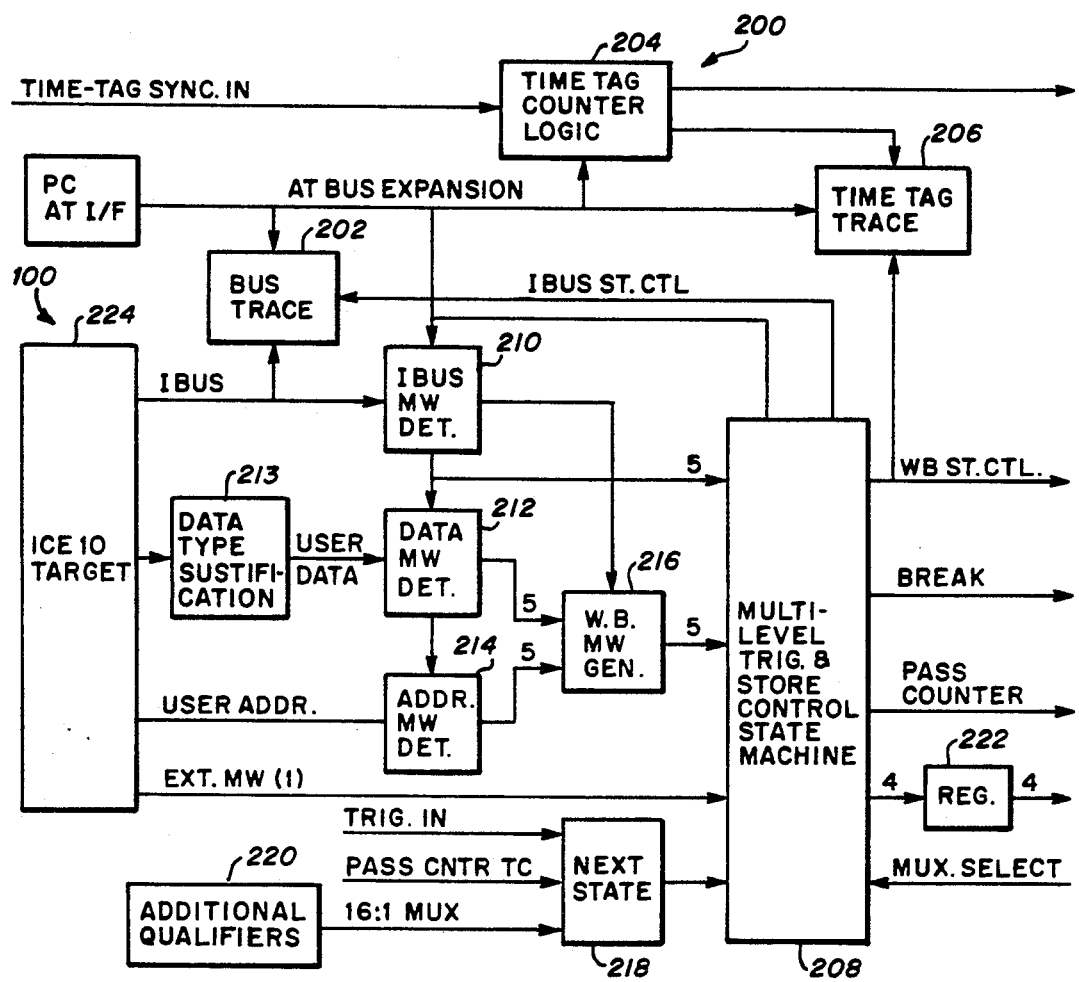
FIG. 9 is a block diagram of a second embodiment of the present invention which is an add-on system ICE that expands the emulation capabilities of the ICE of FIG. 1.

ICE 100 can used in the same enclosure as provided for ICE 10. A second board 200 (FIG. 9) is added to ICE 10 to create an ICE 100 system.

ICE 100 has a separate BUS 24 related trace buffer 202. See FIG. 9. The trace buffer 202 is, in this example, 20-bits wide and 64K deep. Trace buffer 202 is controlled independently of the main trace buffer 62. In addition, board 200 comprises:

- a 48-bit time-tag counter 204 and time-tag trace buffer 206 provided for real-time measurement. Storage controls for time-tag trace buffer 206 are similar to those for bus trace buffer 202;
- a RAM-based state machine 208 controls level transitions, storing and triggering at each level. Up to sixteen levels are provided for flexibility;
- a RAM-based matchword detection circuit 210 for BUS 24;
- a RAM-based multiple range matchword detection circuit 212 for a user data bus;
- a data type justification circuit 213;
- a RAM-based multiple range matchword detection circuit 214 for a user address bus;
- a wide-bus matchword generator 216;
- a next state circuit 218;
- additional qualifier circuit 220;
- a register 222;
- a 16-bit pass counter for a multi-level triggering circuit (within state machine 208); and
- a 16-bit position counter 82 for the multi-level triggering circuit (within state machine 208).

A target system 14 bus extension interface circuit 224 registers all the incoming signals from ICE 10 using proper terminations to maximize the data transfer rate. BUS 24 matchword detection circuit 210 is essentially a RAM-based comparator that can be programmed by PC/AT 20, and is used to hardware detect sequences of patterns on BUS 24. Single byte BREAK EVENTS for both internal instruction and data breakpoints can also be detected. BUS 24 matchword detection circuit 210 can monitor several inputs and generate a five-bit BUS 24 matchword detection code. These codes are routed to the multi-level triggering mechanism 208.

The inputs to BUS 24 matchword detection circuit 210 are as follows:
1) reset input (1)[1], a hardware reset input from the PC/AT 20;
2) BUS 24 (8), monitors BUS 24 activity;
3) READY (1), a BUS 24 VALID from target microprocessor 26;
4) PC/AT 20 bus interface, PC/AT 20 programs and verifies state machine 208.

[1] number of signal lines.

Output from BUS 24 matchword detection circuit 210 consists of a 5-bit encoding of different BUS 24 matchwords. BUS 24 matchwords can be setup for any of the following:
1) all CALLS;
2) a list of up to 16 CALL addresses;
3) all CALLS EXCEPT a list of up to 16 CALL addresses;
4) all RETURNS;
5) a list of up to 16 RETURN addresses;
6) all RETURNS EXCEPT a list of up to 16 RETURN addresses;
7) all BRANCHES;
8) a list of up to 16 BRANCH addresses;
9) all BRANCHES EXCEPT a list of up to 16 BRANCH addresses;
10) instruction EVENT 1;
11) instruction EVENT 2;
12) data EVENT 1;
13) data EVENT 2;
14) mark EVENTS;
15) all messages; and
16) DMA EVENTS.

BUS 24 trace buffer 202 is controlled by the multi-level trigger and store control mechanism 208. Besides serving as input for trace reconstruction, BUS 24 trace data can also be used for performance analysis such as FUNCTION level code coverage and histograms. BUS 24 trace memory 202 can be divided into the following subsections:
1) A 64K×20-bit wide high-speed SRAM (e.g., 15 ns). The 20-bit wide BUS 24 trace buffer 202 is allocated as follows:
   a) 8-bits for BUS 24;
   b) 4-bits for BUS 24 control and status; and
   c) 10-bits for the time-tag;
2) A data multiplexing circuit to allow either the PC/AT 20 data bus or target microprocessor 26 BUS 24 to be connected to the trace memory 62 data bus;
3) An address multiplexing circuit to allow either the on-board trace address generator or the PC/AT 20 address to be connected to the trace memory 62 address bus. The PC/AT 20 can read the on-board trace address generator to determine the current position the trace buffer 202;

4) A control multiplexing circuit that generates control signals to the memory. This multiplexing circuit must select between the PC/AT 20 control bus and the trace control circuitry depending on whether the PC/AT 20 or target microprocessor 26 is accessing the trace buffer 202;

5) A trace memory timing generator circuit to provide proper timing for the trace memory when being accessed by the either the PC/AT 20 or during target system 14 CPU trace capture; and 6) A byte-wide time-tag is stored in BUS 24 trace buffer 202 enabling software to coordinate real-time activity. This method requires storing five consecutive BUS 24 messages for every store control cycle, in order to capture the full 48-bit time-tag counter. A branch, a call, a return or an address are five bytes long on BUS 24. Break event is one byte long, time-tag on BUS 24 is five-bytes long.

The address bus multiple range matchword detection circuit 214 is essentially a 32-bit range comparator. See below for a detailed description the 32-bit range comparator implemented with high-speed SRAM.

The inputs to the address Bus matchword detection circuit 210 are as follows:
1) address bus (30), e.g., Intel i960 CA user address bus; and
2) two lower address bits created by encoding the BE (4) signals.

The output from the address bus matchword detection circuit 214 is a 5-bit encoding of usable address bus matchwords. An address bus matchword can be:
1) a single address value;
2) a range of address values;
3) a multiple range of address values; and
4) a range of addresses qualified by a logical combination of code, data, read, write, DMA and interrupts.

The data bus multiple range matchword detection circuit 212 is essentially a 32-bit range comparator. The inputs to the data bus matchword detection circuit 212 are as follows:
1) data bus (32), i960 CA user data bus; and
2) BE0-3[1] (4), byte enable user bus.
[1] example for i960 CA control signals.

The output from the data bus matchword detection circuit 212 is a 5-bit encoding of usable Data Bus matchwords. A Data Bus matchword can be:
1) a single data value;
2) a range of data values; and
3) a multiple range of data values.

Address and data matchwords are careful combined to allow at least 31 possible matchwords from a user bus. This logical combination is software programmable. Any number of address or data matchword can is a user bus matchword as long as the total of a user bus matchwords do not exceed 31.

The inputs to a user bus (wide bus) matchword detection circuit 210 are as follows:
1) address bus range matchword (5), outputs from the address matchword detection circuit 210;
2) data bus range matchword (5), outputs from the data matchword detection circuit 210;
3) address Valid (1), indicates if the current address is valid;
4) current bus cycle qualifiers,
   a) C/D (1), Code or Data from the Intel i960 CA;
   b) W/R (1), Write or Read from the Intel i960 CA;
   c) DMA* (1), DMA Access. Indicate the bus cycle was initiated by the DMA controller; and
   d) WAIT (1) and READY (1), WAIT* and READY*.

A user bus matchword generation circuit is implemented with high-speed RAM circuit. Five bits output from the RAM defines 31 user bus matchwords with appropriate qualifiers. The software can program the RAM to combine address and data matchwords into user matchwords.

There are three sub-sections for the multi-level trigger and store control circuitry 208:
1) multi-level trigger and store control state machine;
2) pass Counter;
3) position counter; and
4) trace and Trigger control circuit.

The multi-level trigger and store control state machine 208 has 256K×1 high-speed (15 ns) SRAMs. Four input address bits define the current state and four output data bits define the next state. The next state bits are fed into a register. The output of the register is fed back to become the current state bits when the next target system 14 clock occurs.

The inputs to the multi-level state machine 208 are as follows:
1) four state bits input (LEV3-LEV0);
2) one terminal count (TC) from the pass counter;
3) one matchword from the discrete external circuit;
4) one user-supplied external trigger input;
5) five bits encoded for 31 BUS 24 matchwords;
6) five bits encoded for 31 user bus matchwords; and
7) one bit multiplexed input for DACK0-3 and interrupts (9).

The outputs from the multi-level state machine 208 are as follows:
1) four state bit outputs (LEV3-LEV0);
2) one store control for BUS 24 trace buffer 202;
3) one store control for a user bus trace buffer 202;
4) one BREAK to stop of the Intel i960 CA;
5) one pass counter enable/load;
6) one trigger out; and
7) four bits to select the MUX for DACK0-3 and interrupts (9).

Four state bits provide sixteen possible states. Each state represents a trace level. Level zero is the starting state. Level 15 is the trigger state.

BUS 24 trace buffer 202 store control circuit can be programmed, at any level, to support one of the following:
stores all cycles;
store on all CALLS;
store on all RETURNS;
store on all BRANCHES;
store on all EVENTS Store on a particular EVENT;
store on a list of CALL ADDRESSES;
store all CALLS except a list of CALL ADDRESSES;
store on a list of RETURN ADDRESSES;
store all RETURNS except a list of RETURN ADDRESSES;
store on a list of BRANCH ADDRESSES; and
Store all BRANCHES except a list of BRANCH ADDRESSES.

The user bus trace buffer (on ICE 10) and time-tag trace buffer 202 can be programmed, at any level, to do one of the following:
store all clock cycles, and not store on wait states;
store only on instruction FETCH cycles;

store only on all data READ cycles;
store only on all data WRITE cycles;
store only on interrupt cycles;
store only on DMA cycles;
store only on a range of address with qualifiers;
store only on a multiple range of address with qualifiers; and
store only on a range of data with qualifiers; and
store only on a multiple range of data with qualifiers.

The BREAK output of state machine 208 can be used to stop (HALT) the Intel i960 CA at the trigger (last) level. Stopping the Intel i960 CA at the trigger level is an option, and it is programmed by software. Such an option allows the passive trace capability in ICE 100 system.

The pass counter control bit controls the loading and the counting the pass counter. It is programmed to load the pass counter upon entering an alternative level and to enable the counting if the correct (matchword) condition exists.

The Trigger Out bit generates a trigger output signal based on the input and the current state of state machine 208. The trigger out signal can be activated if one or more the following conditions exist:
1) user-supplied trigger input is active;
2) external matchword detected;
3) BUS 24 matchword detected;
4) user bus matchword detected; and
5) Intel i960 CA internal break detected.

Four-bit MUX selector allows state machine 208 to select one of sixteen possible inputs. These inputs are, four DMA channels acknowledge signals, and nine interrupt pins. The other eight interrupt pins, in expanded mode, act together as an 8-bit vector interrupt.

The pass counter is a 16-bit loadable counter. It is loaded from a 16-bit wide RAM. The multi-level trigger/store control state bits (4) selects the RAM value to be loaded into the counter. The software preprograms the RAM prior to activate the multi-level trigger/store control state machine 208. This setup allows the pass counter to be loaded with a different value at each level.

The position counter 82 is a 16-bit software loadable counter running at the target system 14 clock frequency (up to 40 Mhz). When the trigger level is entered, state machine 208 activates the position counter 82. The position counter 82 TC stop of the trace and terminate the trigger level at the proper time. The position counter 82 is loaded by software prior to activating the multi-level trigger/store control state machine 208.

The position counter 82 is only applicable to the trigger (last) level. The trace and trigger control circuit 80 generates control signal for various trace buffers in addition to BREAK (HALT) and trigger out. The input to the trace and trigger control circuit 80 comprises the following signals:
1) BUS 24 STORE (1)[1] from the multi-level trigger/Store control state machine 208. This signal indicates that BUS 24 is stored for this cycle;
2) WIDE BUS STORE (1) from the multi-level trigger/Store control state machine 208. This signal indicates that the wide bus is stored for this cycle;
3) HALT (1) from the multi-level trigger/Store control state machine 208. This signal indicates that the 960 is halted by an asynchronous asynchronous halt request Command;
4) trigger OUT (1) from the multi-level trigger/Store control state machine 208. This signal indicates that the trigger out condition is reached;
5) control processor (PC/AT 20) inputs (x) to enable/-disable various conditions; and
6) position counter 82 TC (1): This signal is the position counter 82 terminal count. It is used to allows various trigger and store control events to happen.

[1] indicates the number of signal lines.

The output to the trace and trigger control circuit 80 comprises the following signals:
1) BUS 24 TRACE BUFFER 202 CONTROL (1), this signal controls the storing of BUS 24 trace buffer 202;
2) TIME-TAG TRACE BUFFER 202 CONTROL (1), this signal controls the storing the Time-tag trace buffer 202;
3) WIDE BUS TRACE BUFFER 202 CONTROL (1), this signal controls the storing the wide bus TAG trace buffer 202;
4) BREAK (1), this signal causes ICE 10 hardware to send an asynchronous Asynchronous halt request to the target microprocessor 26; and
5) TRIGGER OUT (1), this is the final user trigger out signal.

The time-tag counter is a 48-bit wide, synchronous counter running at the target system 14 processor clock rate (40 Mhz). The output of the counter is stored in the time-tag trace memory. No pipeline into the trace buffer 202 is necessary since software can account for any pipeline delay.

This counter is reset and reloaded by the PC/AT 20. The time-tag trace buffer 202 is controlled by the multi-level trigger and store control mechanism 208. The time-tag trace data can be used to correlate real time events e.g., measurement of execution time between two points in a user program.

The time-tag trace memory can be divided into the following subsections:
1) a 8K×40 bit wide high-speed SRAM (15 ns);
2) a data multiplexing circuit to allow either the PC/AT 20 data bus or the time-tag counter output to be connected to the trace memory data bus;
3) an address multiplexing circuit to allow either the on-board trace address generator or the PC/AT 20 address to be connected to the trace memory address bus. The PC/AT 20 can read the on-board trace address generator to determine the current position the trace buffer 202;
4) a control multiplexing circuit that generates control signals to the memory. This multiplexing circuit must select between the PC/AT 20 control bus and the trace control circuitry depending on whether the PC/AT 20 or the time-tag counter is accessing the trace buffer 202; and
5) a trace memory timing generator circuit to provide proper timing for the trace memory when being accessed by the either the PC/AT 20 or during the target system 14 CPU trace capture.

External access to the time-tag counter circuit, using TIME-TAG SYNC. IN and TIME-TAG SYNC. OUT, allows time-tag synchronization between different ICE 100 systems to support multi-processor (Intel i960 CA) applications.

ICE 100 PC/AT 20 interface circuit can be divided into the following sections:
1) the PC/AT 20 bus buffer, this block of circuitry provides signal buffering for the address and control bus from ICE 10 PC/AT 20 extension bus. It also provides bidirectional drivers for the data bus;
2) a decoder circuit to decode a range of memory mapped I/O addresses to is used by ICE 100. These decoded addresses be used as command/status register addresses;
3) a set of command/status registers, the PC/AT 20 controls and monitors ICE 100 via these command/status registers; and
4) all ICE 100 memory is memory mapped into the 64K bytes the PC/AT 20 starting at address XD0000H. X can have any value between OH to FH. Multiple pages of 64K bytes memory are required for all memory residing in ICE 100. Each page register value determines a unique 64K bytes of ICE 100 memory. External interfaces to and from ICE 100 hardware are:
1) expansion interfaces: The expansion Interfaces provide interconnection between ICE 100 hardware and the ICE 10 hardware.
2) trigger input and output: These interfaces allow a user trigger input and output to interact with ICE 100 system.
3) power connector: This connector supplies power to ICE 100 hardware.

32-BIT MULTIPLE-RANGE COMPARATOR USING HIGH SPEED SRAM

FIG. 11 shows a two stage encoding technique that uses high speed SRAMs to provide 32-bit hardware address breakpoint detection. The prior art uses one stage of memory to provide ones and zeros for addresses that match or do not match a breakpoint. For example, the prior art uses $2^{15} \times 1$-bit memories to monitor 16 lines. The 16 lines are used to address the single stage memory, and addresses in memory corresponding to breakpoints are programmed with a one bit. Then if that address reappears on the 16 lines during a trace, a one will pulse at the data output of the memory. Using single stage memories this way for 32-bit address and/or data lines is impractical. The present invention solves this problem as described below.

Single Range Address Detection Method

1) A 32-bit address range is sub-divided into three separate sub-ranges at the 16-bit boundary, as illustrated below:
   1234 5678–5678 9ABC:
   1234 5678–1234 FFFF
   1235 5677–5678 FFFF
   5678 0000 5678 9ABC
2) The upper 16-bit ranges are sorted as follows:
   1234(*), 1235, 5677, 5678(#).
   (*): beginning of range for the upper 16-bit boundary; and
   (#): end of range for the upper 16-bit boundary.
3) The subranges for the upper 16-bits are grouped as follows:
   1234–1234, 125–5677, 5678–5678.
4) The lower 16-bit ranges are sorted as follows:
   0000, 5678(&), 9ABC, FFFF.
   (&): beginning of range for the lower 16-bit boundary.
5) The subranges for the lower 16-bits are grouped as follows:
   0000–5677, 5678–9ABC, 9ABD–FFFF.
6) A non-zero data value (code) is assigned for the set of upper ranges. That data value is written to each of the RAM addresses (RAM 302 for upper 16-bits, and 304 for lower) in the range to which it is assigned. Any address not in a range is written with zero. The lower ranges are handled in a similar manner. For example:

| UPPER RANGES | | LOWER RANGES | |
|---|---|---|---|
| Address | Code | Address | Code |
| 1234–1234 | 01 | 0000–5677 | 01 |
| 1235–5677 | 02 | 5678–9ABC | 02 |
| 5678–5678 | 03 | 9ABD–FFFF | 03 | where, the address is in hexadecimal, and the code is in octal.
7) The output of a second stage RAM 308 indicates the valid breakpoint detection. The address inputs of RAM 308 are the data outputs of RAMs 302 and 304, which are encoded in step 6, above.

| SECOND STAGE RAM 308 PROGRAMMING | |
|---|---|
| Address (octal) | Data (5-bit) |
| 01 02–01 03 | 1 |
| 02 01–02 03 | 1 |
| 03 01–03 02 | 1 |

Multiple Range Address Detection

1) Each 32-bit address range can be sub-divided into three separate sub-ranges at the 16-bit boundary, as follows:
   1234 5678–4587 8765:
     1234 5678 1234 FFFF
     1235 0000–4586 FFFF
     4587 0000–4587 8765
   4321 1234–5678 9ABC:
     4321 1234–4321 FFFF
     4322 0000 5677 FFFF
     5678 0000 5678 9ABC
   2435 5768–5342 7856:
     2435 5768–2435 FFFF
     2436 0000–5341 FFFF
     5342 0000–5342 7856
2) The upper 16-bit range is sorted, as follows:
   1234(*), 1235, 2435(*), 2436, 4321(*), 4322, 4586, 4587(#), 5341, 5342(#), 5677, 5678(#)
   where,
   (*) is the beginning of the range for the upper 16-bit boundary; and
   (#) is the end of the range for the upper 16-bit boundary.
3) The subranges for the upper 16-bits are grouped as follows:
   1234–1234, 1235–2434, 2435–2435, 2436–4320, 4321–4321, 4322–4586, 4587–5487, 4588–5341, 5342–5342, 5343–5677, 5678–5678.
4) The lower 16-bit ranges are sorted as follows:
   0000, 1234(&), 5678(&), 5768(&), 7856, 8765, 9ABC, FFFF.
   (&) the beginning of range for the lower 16-bit boundary.
5) The subranges for the lower 16-bit are grouped as follows:
   0000–1233, 1234–5677, 5678–5767, 5768–7856, 7857–8765, 8766–9ABC, 9ABD–FFFF.
6) For the set of upper ranges, a non-zero data value is assigned to each range. That data value is written to each of the addresses in the range to which it is assigned. Any address not in a range should be written with zero. The lower ranges are handled similarly.

The following tables illustrate the code assignment for the above example.

| UPPER RANGES | | LOWER RANGES | |
|---|---|---|---|
| Address (hex) | Code (oct) | Address (hex) | Code (oct) |
| 1234–1234 | 01 | 0000–1233 | 01 |
| 1235–2434 | 02 | 1234–5677 | 02 |
| 2435–2435 | 03 | 5678–5767 | 03 |
| 2436–4320 | 04 | 5768–7856 | 04 |
| 4321–4321 | 05 | 7857–8765 | 05 |
| 4322–4586 | 06 | 8766–9ABC | 06 |
| 4587–4587 | 07 | 9ABD–FFFF | 07 |
| 4588–5341 | 10 | | |
| 5342–5342 | 11 | | |
| 5343–5677 | 12 | | |
| 5678–5678 | 13 | | |

7) The output of the second stage RAM 308 indicates the valid breakpoint detection. The address inputs of RAM 308 are the data outputs of RAMs 302 and 304.

| SECOND STAGE PROGRAMMING | |
|---|---|
| Address (oct) | Data |
| 01 03–01 07 | 1 |
| 02 01–02 07 | 1 |
| 03 01–03 07 | 1 |
| 04 01–04 07 | 1 |
| 05 01–05 07 | 1 |
| 06 01–06 07 | 1 |
| 07 01–07 07 | 1 |
| 10 01–10 07 | 1 |
| 11 01–11 04 | 1 |
| 12 01–12 07 | 1 |
| 13 01–13 06 | 1 |

Multiple Overlapping Ranges Reduction

The above examples consists of three ranges which are over-lapped with each other. The problem can be simplified by removing the overlap, resulting in fewer ranges, and fewer RAMS. Using the above example, a number-of-ranges reduction can be achieved as follows:

| first range | second range | third range | new range |
|---|---|---|---|
| 1234 5678 | | | 1234 5678 |
| 2435 5768 | 2435 5768 | | 2435 5768 |
| 4321 1234 | 4321 1234 | 4321 1234 | 4321 1234 |
| 4587 8765 | 4587 8765 | 4587 8765 | 4587 8765 |
| | 5342 7856 | 5342 7856 | 5342 7856 |
| | | 5678 9ABC | 5678 9ABC |

Three ranges are reduced to a single range in the above example. The new range is: 1234 5678–5678 9ABC, and matches a previous example, above.

Multiple Nested Range Reduction

As a special case of multiple overlap ranges, multiple nested ranges can be reduced to a smaller number of ranges. In general, two nested ranges can be reduced to one (larger) range. The process of reducing is continued until there are no more nested ranges. For example:

| 1234 5678–9ABC DEF0 | (1) |
| 4321 1234–5132 79AB | (2) |
| 2435 5768–5342 7856 | (3), yields: |

| Range (1) | Range (2) | Range (3) |
|---|---|---|
| 1234 5678 | | |
| 2435 5768 | | 2435 5768 |
| 4321 1234 | 4321 1234 | 4321 1234 |
| 5132 79AB | 5132 79AB | 5132 79AB |
| 5342 7856 | | 5342 7856 |
| 9ABC DEF0 | | |

The above three ranges ((1)–(3)) are reduced to a single range (1).

Conclusion About Range Reduction

In general, for a given number of ranges, range reduction can be performed with the following steps:
a) removing all nested ranges using multiple nested range reduction, described above;
b) removing all overlapping ranges multiple overlapping range reduction, described above;
c) solving with multiple ranges address detection, described above.

Hardware Interfaces

The expansion interfaces consists of the following:
PC/AT 20 expansion interface 68, one 64-pin connector;
external input expansion, one 64-pin connector;
ICE 100 internal controls, one 64-pin connector;
target system 14 Expansion interface 68, four 64-pin connectors; and
spare, one 64-pin connector.

This interconnection allows the PC/AT 20 bus to access ICE 100 hardware. One 64-pin connector are used for this interface. Exemplary pin assignments are as follows:

| SIGNAL | PIN | DIR | DESCRIPTION |
|---|---|---|---|
| GND | 1, 2 | | |
| PD00 | 3 | I/O | DATA BUS 00 |
| PD01 | 4 | I/O | DATA BUS 01 |
| PD02 | 5 | I/O | DATA BUS 02 |
| PD03 | 6 | I/O | DATA BUS 03 |
| GND | 7, 8 | | |
| PD04 | 9 | I/O | DATA BUS 04 |
| PD05 | 10 | I/O | DATA BUS 05 |
| PD06 | 11 | I/O | DATA BUS 06 |
| PD07 | 12 | I/O | DATA BUS 07 |
| GND | 13, 14 | | |
| PR0 | 15 | O | Page register bit 0 |
| PR1 | 16 | O | Page register bit 1 |
| PR2 | 17 | O | Page register bit 2 |
| PR3 | 18 | O | Page register bit 3 |
| GND | 19, 20 | | |
| PR4 | 21 | O | Page register bit 4 |
| PR5 | 22 | O | Page register bit 5 |
| PR6 | 23 | O | Page register bit 6 |
| PR7 | 24 | O | Page register bit 7 |
| GND | 25, 26 | | |
| MEMR* | 27 | O | Memory READ |
| GND | 28 | | |
| MEMW* | 29 | O | Memory WRITE |
| GND | 28 | | |
| EXPSEL* | 31 | O | ICE 100 SELECT |
| GND | 28 | | |
| EINTR | 33 | I | ICE 10 INTERRUPT |
| GND | 34 | | |
| CPA15_10* | 35 | O | Decode A15-A10 = 0 |
| GND | 36 | | |
| PA00 | 37 | O | address BUS 00 |
| PA01 | 38 | O | address BUS 01 |
| PA02 | 39 | O | address BUS 02 |
| PA03 | 40 | O | address BUS 03 |
| GND | 41, 42 | | |
| PA04 | 43 | O | address BUS 04 |
| PA05 | 44 | O | address BUS 05 |

-continued

| SIGNAL | PIN | DIR | DESCRIPTION |
|---|---|---|---|
| PA06 | 45 | O | address BUS 06 |
| PA07 | 46 | O | address BUS 07 |
| GND | 47, 48 | | |
| PA08 | 49 | O | address BUS 08 |
| PA09 | 50 | O | address BUS 09 |
| PA10 | 51 | O | address BUS 10 |
| PA11 | 52 | O | address BUS 11 |
| GND | 53, 54 | | |
| PA12 | 55 | O | address BUS 12 |
| PA13 | 56 | O | address BUS 13 |
| PA14 | 57 | O | address BUS 14 |
| PA15 | 58 | O | address BUS 15 |
| GND | 59, 60 | | |
| PA16 | 61 | O | address BUS 16 |
| PA17 | 62 | O | address BUS 17 |
| PA18 | 63 | O | address BUS 18 |
| PA19 | 64 | O | address BUS 19 |

This interconnection allows ICE 100 hardware to interface to the discrete external inputs. The exemplary assignments are as follows:

| SIGNAL | PIN | DIR | DESCRIPTION |
|---|---|---|---|
| BEX00 | 1 | O | External Input 00 |
| BEX01 | 3 | O | External Input 01 |
| BEX02 | 5 | O | External Input 02 |
| BEX03 | 7 | O | External Input 03 |
| BEX04 | 9 | O | External Input 04 |
| BEX05 | 11 | O | External Input 05 |
| BEX06 | 13 | O | External Input 06 |
| BEX07 | 15 | O | External Input 07 |
| BEX08 | 17 | O | External Input 08 |
| BEX09 | 19 | O | External Input 09 |
| BEX0A | 21 | O | External Input 10 |
| BEX0B | 23 | O | External Input 11 |
| BEX0C | 25 | O | External Input 12 |
| BEX0D | 27 | O | External Input 13 |
| BEX0E | 29 | O | External Input 14 |
| BEX0F | 31 | O | External Input 15 |
| BEX10 | 33 | O | External Input 16 |
| BEX11 | 35 | O | External Input 17 |
| BEX12 | 37 | O | External Input 18 |
| BEX13 | 39 | O | External Input 19 |
| BEX14 | 41 | O | External Input 20 |
| BEX15 | 43 | O | External Input 21 |
| BEX16 | 45 | O | External Input 22 |
| BEX17 | 47 | O | External Input 23 |
| BEX18 | 49 | O | External Input 24 |
| BEX19 | 51 | O | External Input 25 |
| BEX1A | 53 | O | External Input 26 |
| BEX1B | 55 | O | External Input 27 |
| BEX1C | 57 | O | External Input 28 |
| BEX1D | 59 | O | External Input 29 |
| BEX1E | 61 | O | External Input 30 |
| BEX1F | 63 | O | External Input 31 |
| GND All Even pins are GROUND. | | | |

This interconnection allows ICE 10 hardware to communicate with ICE 100 hardware for internal control purpose. A 64-pin connector is assigned for this interconnection. Its exemplary pin assignments are as follows:

| SIGNAL | ASSIGNMENT | DIR | DESCRIPTION |
|---|---|---|---|
| RICEDIR | 1 | I | Expansion IB Direction |
| RICEN* | 3 | I | Expansion IB Enable |
| RICE7 | 5 | I/O | Expansion RAW IB 7 |
| RICE6 | 7 | I/O | Expansion RAW IB 6 |
| RICE5 | 9 | I/O | Expansion RAW IB 5 |
| RICE4 | 11 | I/O | Expansion RAW IB 4 |
| RICE3 | 13 | I/O | Expansion RAW IB 3 |
| RICE2 | 15 | I/O | Expansion RAW IB 2 |
| RICE1 | 17 | I/O | Expansion RAW IB 1 |
| RICE0 | 19 | I/O | Expansion RAW IB 0 |

-continued

| SIGNAL | ASSIGNMENT | DIR | DESCRIPTION |
|---|---|---|---|
| STCTL* | 21 | I | Store control Enable |
| FHWBP* | 23 | I | Future HW breakpoint |
| SPARE | 25-63 | | |
| All odd pins between 25-63. | | | |
| GND ALL EVEN PINS | | | |

This interconnection allows ICE 100 hardware to monitor the target system 14 signals to perform advance ICE features. Four 60-pin connectors are assigned for this purpose.

A first exemplary connector pin assignment for the target system 14 interface expansion interconnection is as follows:

| SIGNAL | PIN | DIR | DESCRIPTION |
|---|---|---|---|
| Data(0) | 1 | O | Data bit 0 |
| Data(1) | 3 | O | Data bit 1 |
| Data(2) | 5 | O | Data bit 2 |
| Data(3) | 7 | O | Data bit 3 |
| Data(4) | 9 | O | Data bit 4 |
| Data(5) | 11 | O | Data bit 5 |
| Data(6) | 13 | O | Data bit 6 |
| Data(7) | 15 | O | Data bit 7 |
| Data(8) | 17 | O | Data bit 8 |
| Data(9) | 19 | O | Data bit 9 |
| Data(10) | 21 | O | Data bit 10 |
| Data(11) | 23 | O | Data bit 11 |
| Data(12) | 25 | O | Data bit 12 |
| Data(13) | 27 | O | Data bit 13 |
| Data(14) | 29 | O | Data bit 14 |
| Data(15) | 31 | O | Data bit 15 |
| Data(16) | 33 | O | Data bit 16 |
| Data(17) | 35 | O | Data bit 17 |
| Data(18) | 37 | O | Data bit 18 |
| Data(19) | 39 | O | Data bit 19 |
| Data(20) | 41 | O | Data bit 20 |
| Data(21) | 43 | O | Data bit 21 |
| Data(22) | 45 | O | Data bit 22 |
| Data(23) | 47 | O | Data bit 23 |
| Data(24) | 49 | O | Data bit 24 |
| Data(25) | 51 | O | Data bit 25 |
| Data(26) | 53 | O | Data bit 26 |
| Data(27) | 55 | O | Data bit 27 |
| Data(28) | 57 | O | Data bit 28 |
| Data(29) | 59 | O | Data bit 29 |
| Data(30) | 61 | O | Data bit 30 |
| Data(31) | 63 | O | Data bit 31 |
| GND ALL EVEN PINS | | | |

The second exemplary connector pin assignment for the target system 14 interface expansion interconnection is as follows:

| SIGNAL | PIN | DIR | DESCRIPTION |
|---|---|---|---|
| address(2) | 5 | O | address bit 2 |
| address(3) | 7 | O | address bit 3 |
| address(4) | 9 | O | address bit 4 |
| address(5) | 11 | O | address bit 5 |
| address(6) | 13 | O | address bit 6 |
| address(7) | 15 | O | address bit 7 |
| address(8) | 17 | O | address bit 8 |
| address(9) | 19 | O | address bit 9 |
| address(10) | 21 | O | address bit 10 |
| address(11) | 23 | O | address bit 11 |
| address(12) | 25 | O | address bit 12 |
| address(13) | 27 | O | address bit 13 |
| address(14) | 29 | O | address bit 14 |
| address(15) | 31 | O | address bit 15 |
| address(16) | 33 | O | address bit 16 |
| address(17) | 35 | O | address bit 17 |
| address(18) | 37 | O | address bit 18 |
| address(19) | 39 | O | address bit 19 |
| address(20) | 41 | O | address bit 20 |

| SIGNAL | PIN | DIR | DESCRIPTION |
|---|---|---|---|
| address(21) | 43 | O | address bit 21 |
| address(22) | 45 | O | address bit 22 |
| address(23) | 47 | O | address bit 23 |
| address(24) | 49 | O | address bit 24 |
| address(25) | 51 | O | address bit 25 |
| address(26) | 53 | O | address bit 26 |
| address(27) | 55 | O | address bit 27 |
| address(28) | 57 | O | address bit 28 |
| address(29) | 59 | O | address bit 29 |
| address(30) | 61 | O | address bit 30 |
| address(31) | 63 | O | address bit 31 |
| GND ALL EVEN PINS | | | |

The third exemplary connector pin assignment for the target system 14 interface expansion interconnection is as follows:

| SIGNAL | PIN | DIR | DESCRIPTION |
|---|---|---|---|
| BTHOLD | 1 | O | HOLD Request |
| BTW/R* | 3 | O | WRITE/READ control |
| BTDEN* | 5 | O | Data Enable |
| BTBLAST* | 7 | O | BURST LAST data transfer |
| BTADS* | 9 | O | address Strobe |
| BTRDY* | 11 | O | READY to terminate transfer |
| BTHOLDA | 13 | O | HOLD Acknowledge |
| BTBRDY* | 15 | O | Intel i960 CA BREADY |
| BTDACK0* | 17 | O | DMA Acknowledge 0 |
| BTDACK1* | 19 | O | DMA Acknowledge 1 |
| BTDACK2* | 21 | O | DMA Acknowledge 2 |
| BTDACK3* | 23 | O | DMA Acknowledge 3 |
| BTDREQ0* | 25 | O | DMA REQUEST 0 |
| BTDREQ1* | 27 | O | DMA REQUEST 1 |
| BTDREQ2* | 29 | O | DMA REQUEST 2 |
| BTDREQ3* | 31 | O | DMA REQUEST 3 |
| EOP/TC0* | 33 | O | EOP/Term. Cnt. |
| EOP/TC1* | 35 | O | EOP/Term. Cnt. |
| EOP/TC2* | 37 | O | EOP/Term. Cnt. |
| EOP/TC3* | 39 | O | EOP/Term. Cnt. |
| BTBE0* | 41 | O | Byte Enable 0 |
| BTBE1* | 43 | O | Byte Enable 1 |
| BTBE2* | 45 | O | Byte Enable 2 |
| BTBE3* | 47 | O | Byte Enable 3 |
| BTINT0* | 49 | O | Interrupt bit 0 |
| BTINT1* | 51 | O | Interrupt bit 1 |
| BTINT2* | 53 | O | Interrupt bit 2 |
| BTINT3* | 55 | O | Interrupt bit 3 |
| BTINT4* | 57 | O | Interrupt bit 4 |
| BTINT5* | 59 | O | Interrupt bit 5 |
| BTINT6* | 61 | O | Interrupt bit 6 |
| BTINT7* | 63 | O | Interrupt bit 7 |
| GND ALL EVEN PINS | | | |

The forth exemplary connector pin assignment for the target system 14 interface expansion interconnection is as follows:

| SIGNAL | PIN | DIR | DESCRIPTION |
|---|---|---|---|
| ICEBUS0 | 1 | O | BUS 24 Bit 0 |
| ICEBUS1 | 3 | O | BUS 24 Bit 1 |
| ICEBUS2 | 5 | O | BUS 24 Bit 2 |
| ICEBUS3 | 7 | O | BUS 24 Bit 3 |
| ICEBUS4 | 9 | O | BUS 24 Bit 4 |
| ICEBUS5 | 11 | O | BUS 24 Bit 5 |
| ICEBUS6 | 13 | O | BUS 24 Bit 6 |
| ICEBUS7 | 15 | O | BUS 24 Bit 7 |
| BMSGVLD* | 17 | O | ICE Message Valid |
| BAMARK* | 19 | O | address Valid |
| ICEMSG* | 21 | O | ICE Message (or ONCE*) |
| READY* | 23 | O | ICE Valid (or FAIL*) |
| ICEADS* | 25 | O | ICE address Strobe |
| SPARE | 27 | | |
| SPARE | 29 | | |
| BTBREQ | 31 | O | BUS Request |
| BTP10RST* | 33 | O | Processor Reset Pin |
| BTRESET* | 35 | O | Target system 14 Reset |
| BTP10HOLD | 37 | O | Processor HOLD Pin |
| BTFAIL* | 39 | O | FAIL BT |
| BACKOFF | 41 | O | Processor BACKOFF Pin |
| BTCLKMODE | 43 | O | CLOCK MODE |
| BTSCNMOD* | 45 | O | SCAN MODE |
| BTNMI* | 47 | O | Non Maskable Interrupt |
| BTLOCK* | 49 | O | BUS LOCK |
| BTD/C* | 51 | O | DATA or CODE |
| BTSUP* | 53 | O | SUPERVISOR ACCESS |
| BTDMA* | 55 | O | DMA ACCESS |
| BTWAIT* | 57 | O | WAIT by internal wait state |
| BTDT/R* | 59 | O | Data Transmit/Receive |
| SPARE | 61 | | |
| TCLKxx | 63 | O | Processor Target system 14 Clock |
| GND ALL EVEN PINS | | | |

Note: 1) Input and output in this table are with respect to ICE 10.

SMB right angle connectors are used for the trigger input and output signals.

The power supply connection is done via a 4-pin right angle MOLEX connector. Exemplary pin

| SIGNAL | PIN | DESCRIPTION |
|---|---|---|
| Vcc | 1, 4 | +5V Power Supply |
| GND | 2, 3 | GND Reference |

Programming Interface

SOFTWARE INTERFACE BETWEEN THE PC/AT 20 AND THE ICE 100 SYSTEM

ICE 100 is attached to the PC/AT 20 host via a 40-pin ribbon cable. ICE 100 appears to be a peripheral device in the memory and I/O address spaces of PC/AT 20. ICE 100 has selectable I/O map, memory map, and interrupt assignments such that add-on card conflicts with ICE 100 addresses and/or interrupt assignment can be avoided. ICE 100 occupies a single I/O address, one 64K byte block of memory space, and reserves only one interrupt line on the I/O channel. The I/O address is assigned to a page register. The page register comprises 8-bit output that defines 256 different pages of 64K bytes of memory. All other ICE 100 resources are mapped into the 64K byte memory window the PC/AT 20 bus.

I/O map, memory map, interrupt, and command/-status bit assignment are described below in further detail.

ICE 100 occupies one single I/O address on the I/O channel. Most of the I/O channel mapping addresses have been preassigned for different devices.

Possible I/O address for ICE 100 are: 100H and 310H.

One or the other of the above addresses is used such that no other card in the system conflicts. ICE 100 addresses can be altered by changing jumper(s) on a board. There are two jumpers on the board for the I/O address selection (e.g., JP1 and JP2). These jumpers provide four integer codes, 0-3. When the jumper is OUT, it is considered to be circuit 1.

| JP2 = IN, JP1 = IN. | | |
|---|---|---|
| ADDRESS | R/W | ASSIGNMENT |
| 0100 | R | ICE 100 Page Register READ BACK |

-continued

| ADDRESS | R/W | ASSIGNMENT |
|---|---|---|
| 0100 | W | ICE 100 Page Register |

JP2 = OUT, JP1 = IN.
JPyy = OUT, JPxx = OUT.

| ADDRESS | R/W | ASSIGNMENT |
|---|---|---|
| 310 | R | ICE 100 Page Register READ BACK |
| 310 | W | ICE 100 Page Register |

The Page Register is the READ/WRITE register so as to allows the control processor (PC/AT 20) to map different memory and I/O resources into the PC/AT 20 64K bytes window.

The Page Register bit assignments are as follows:

| BIT | NAME | ASSIGNMENT |
|---|---|---|
| 0 | PR0 | Page Register bit 0 |
| 1 | PR1 | Page Register bit 1 |
| 2 | PR2 | Page Register bit 2 |
| 3 | PR3 | Page Register bit 3 |
| 4 | PR4 | Page Register bit 4 |
| 5 | PR5 | Page Register bit 5 |
| 6 | PR6 | Page Register bit 6 |
| 7 | PR7 | Page Register bit 7 |

The page register can be read by the PC/AT 20 to verify its content. It is cleared to 00H during power up reset. Most of the I/O channel interrupt request lines have been preassigned for different devices. Interrupt level 7 is the primary selection for ICE 100. Interrupt level 4, be the alternate choice if for some reason the interrupt level 7 is not available. The interrupt level 7 is assigned to the parallel (printer) port 1 while interrupt 4 is assigned to the serial port 1. It also is noted that if interrupt level 4 is selected, the PC/AT 20 interface card is modified to accommodate this change. Currently, the PC/AT 20 interface can only support interrupt level 7. ICE 10/O (with the exception the Page Register) and memory are both mapped into the host (PC/AT 20) memory space. ICE 100 occupies one 64K byte segment the PC/AT 20 memory space. Possible starting address for ICE 100 memory are xDxxxxH and xBxxxxH. The default selection the 64K window address is xDxxxxH. This default address (xDxxxxH) can be reconfigured to some other address (such as xBxxxxH) by jumper selectable. The jumper selection for the memory page selection is as follows:

| JP4 | JP3 | MEMORY ADDRESS SELECTION |
|---|---|---|
| IN | IN | xD0000H-xDFFFFH |
| IN | OUT | xB0000H-xBFFFFH |

The starting address of ICE 100 is, in this example, defaulted at xDxxxxH. Other addresses are also useable. If another starting address is used e.g., xBxxxxH, then it is offset accordingly. The PR7-0 Page register bits control that resource is mapped into the 64K window. ICE 100 resources are mapped into the host 64K byte window as follows:

PR7-0 ICE 100 Memory-Mapped Resource

00: Invalid Page. Not used All ICE 100 resources are disable from the PC/AT 20 bus if the PR=00

01: Select all ICE 10/0 registers. Each board in ICE 100 must decode the address bus along with this page register value to form a unique group of I/O addresses.

02: Select the shadow memory 60.

03-07: Reserve for possible future shadow memory 60

08-0B: Select the target system 14 Hardware trace buffer 202. Including the Time-tag trace buffer 202 on board 2 for ICE 100 if possible. If it is hard to change then the Time-tag trace buffer 202 is mapped into some other pages.

0C-0F: Select ICE 100 board 2 BUS 24 trace buffer 202.

10-13: Select ICE 100 board 2 BUS 24 matchword Detection.

14-17: Select ICE 100 board 2 address matchword Detection.

18-1B: Select ICE 100 board 2 Data matchword Detection.

1C: Select ICE 100 board 2 wide bus matchword Detection.

1D: Select ICE 100 board 2 Pass Counter RAM. Only require 32 bytes. The other alternative is to use memory map I/O.

20-27: Select ICE 100 board 2 multi-level trigger and Store control state machine 208.

28-FE: undefined

FF: undefined

Here is the memory mapped I/O assignment for ICE 100. The PC/AT 20 accesses these addresses when PR7-0=01H.

The address assignment for the memory mapped I/O are as follows:

| ADDRESS | R/W | NAME | ASSIGNMENT |
|---|---|---|---|
| xD0000H | W | EXPCR0 | ICE 100 Command Register 0. |
| xD0000H | R | EXPSR0 | ICE 100 Status Register 0. |
| xD0001H | W | EXPCR1 | ICE 100 Command Register 1. |
| xD0001H | R | EXPSR1 | ICE 100 Status Register 1. |
| xD0002H | W | SMCR0 | ICE 100 state machine 208 CR 0. |
| xD0002H | R | SMSR0 | ICE 100 state machine 208 SR 0. |
| xD0003H | W | SMCR1 | ICE 100 state machine 208 CR 1. |
| xD0003H | R | SMSR1 | ICE 100 state machine 208 SR 1. |
| xD0004H | W | CPIBDAT | BUS 24 data register. |
| xD0004H | R | TCNTR0 | trace buffer 202 CNT LSByte READ. |
| xD0005H | W | SMARL | shadow memory 60 Pointer Low. |
| xD0005H | R | TCNTR1 | trace buffer 202 CNT MSByte READ. |
| xD0006H | W | SMARH | shadow memory 60 Pointer High. |
| xD0006H | R | SPARE | |
| xD0007H | W | SPARE | |
| xD0007H | R | HWLOCK0 | Hardware LOCK code byte 0 |
| xD0017H | R | HWLOCK1 | Hardware LOCK code byte 1 |
| xD0027H | R | HWLOCK2 | Hardware LOCK code byte 2 |
| xD0037H | R | HWLOCK3 | Hardware LOCK code byte 3 |
| xD0047H | R | HWLOCK4 | Hardware LOCK code byte 4 |
| xD0057H | R | HWLOCK5 | Hardware LOCK code byte 5 |
| xD0067H | R | HWLOCK6 | Hardware LOCK code byte 6 |
| xD0077H | R | HWLOCK7 | Hardware LOCK code byte 7 |
| xD0008H | W | PCLO | position counter 82 Low Byte. |

-continued

| ADDRESS | R/W | NAME | ASSIGNMENT |
|---|---|---|---|
| xD0008H | R | RSTREQ | PC/AT 20 commands SM to generate the Reset sequence |
| xD0009H | W | PCAH | position counter 82 High Byte. |
| xD0009H | R | SPARE | |
| xD000AH | W | CPMC | Marker Counter Initial data. |
| xD000AH | R | SPARE | |
| xD000BH | W | EBPCR | External breakpoint control Register. |
| xD000BH | R | EBPSR | External breakpoint Status Register. |
| xD000CH | W | EBPDR | External breakpoint Data Register. |
| xD000CH | R | BKREQ | PC/AT 20 commands SM to send of the Asynchronous asynchronous halt request. |
| xD000DH | W | SPARE | |
| xD000DH | R | FBREQ | PC/AT 20 commands SM to send of the Fast Asynchronous halt command. |
| xD000EH | W | SPARE | |
| xD000EH | R | INTCLR | PC/AT 20 Clears intr. from ICE 100 |
| xD000FH | W | TCNTCLR | HW trace address CNT Clear. |
| xD000FH | R | REARM | PC/AT 20 commands SM to REARM the trace. |
| CONTROL FOR BOARD 200 | | | |
| xD0010H | W | B2_CR0 | ICE 100 Command Register 0 |
| xD0010H | R | B2_SR0 | ICE 100 Status Register 0 |
| xD0011H | W | B2_CR1 | ICE 100 Command Register 1 |
| xD0011H | R | B2_SR1 | ICE 100 Status Register 1 |
| xD0012H | W | B2_PCLO | board 200 position Counter 2 Low Byte. |
| xD0013H | W | B2_PCH1 | board 200 position Counter 2 High Byte. |
| xD0014H | W | B2_TACLR | board 200 Time-tag trace address CNT Clear. |
| xD0015H | W | B2_IBTACLR | board 200 IB trace address CNT Clear. |
| xD0014H | R | B2_IBTAR0 | board 200 IB trace buffer 202 CNT LSByte READ. |
| xD0015H | R | B2_IBTAR1 | board 200 IB trace buffer 202 CNT MSByte READ. |
| xD0016H | R | B2_TTR0 | board 200 TT Counter READ byte 0. |
| xD0017H | R | B2_TTR0 | board 200 TT Counter READ byte 1. |
| xD0018H | R | B2_TTR0 | board 200 TT Counter READ byte 2. |
| xD0019H | R | B2_TTR0 | board 200 TT Counter READ byte 3. |
| xD001AH | R | B2_TTR0 | board 200 TT Counter READ byte 4. |

The bit assignment for the control/status registers are as follows: The EXPCR0 is the first ICE 100 Command register that controls the pipeline operation of ICE 100. This is not available in ICE 10. No programming of this register is necessary.

| ADDRESS | BITS | NAME | ASSIGNMENT |
|---|---|---|---|
| (PR = 01) | | | |
| xD0000 | 0 | PR0S0 | Pipeline Register 0 Select 0. |
| | 1 | PR0S1 | Pipeline Register 0 select 1. |
| | 2 | PR1S0 | Pipeline Register 1 Select 0. |
| | 3 | PR1S1 | Pipeline Register 1 select 1. |
| | 4-7 | SPARE | |

There are two pipeline register stages in front the hardware trace buffer 202. The first pipeline register is controlled by the PR0Sx and the second pipeline register is controlled by the PR1Sx. The two selection bits PRxS0 and PRxS1 are encoded to select the number of pipeline levels in each register. The encoding is as follows:

| PRxS1 | PRxS0 | Number of Pipelines Selected |
|---|---|---|
| 0 | 0 | Select 1 level of pipeline |
| 0 | 1 | Select 2 levels of pipeline |
| 1 | 0 | Select 3 levels of pipeline |
| 1 | 1 | Select 4 levels of pipeline |

The above mentioned pipeline stages are required in the ICE 100 device with Store control capability. It allows the software to program the number of pipelines to be inserted in front the trace buffer 202. The number of pipeline stages inserted is programmable from 2 to 8.

The EXPCR1 is the second ICE 100 Command register that controls the internal operation of ICE 100.

| ADDRESS | BITS | NAME | ASSIGNMENT |
|---|---|---|---|
| (PR = 01) D0001 | | | |
| | 0 | CKSENSE0 | Target system 14 CLK Sense 0 |
| | 1 | CKSENSE1 | Target system 14 CLK Sense 1 |
| | 2 | SWRST | ICE 100 Software Reset |
| | | 0 ≧ | Remove SWRST from ICE 100 |
| | | 1 ≧ | Reset ICE 100 HW. |
| | 3 | INTREN | ICE 100 Interrupt Enable |
| | | 0 ≧ | Disable ICE 100 interrupt |
| | | 1 ≧ | Enable ICE 100 interrupt |
| | 4-5 | SPARE | |
| | 6 | HOLDEN | ICE 100 Target system 14 HOLD ENABLE |
| | | 0 ≧ | Disable Target system 14 HOLD |
| | | 1 ≧ | Enable Target system 14 HOLD |
| | 7 | CP_VLD | ICE 100 Enable ICEBUS Message |
| | | 0 ≧ | Disable BUS 24 Message |
| | | 1 ≧ | Enable ICEBUS Message |

The CKSENSEx signals are used to sense the target system clock in conjunction with the CKDETx signals. The CKDETx signal be later described. The software toggles the CKSENSEx signals and monitor the CKDETx signals. If the CKDETx signals follow the CKSENSEx signals then the target system 14 clock is running. The EXPSR0 is the READ ONLY register so as to allow the control processor (PC/AT 20) to monitor the interrupt status of ICE 100.

There is a single interrupt request line from ICE 100 to the PC/AT 20. Multiple source of internal interrupts are logically OR'ed together to generate ICE 100 interrupt signal. The software must read the EXPSR0 register to determine the source of interrupt(s) while executing the interrupt service procedure. The EXPSR0 is the READ ONLY register so as to allows the control processor (PC/AT 20) to monitor the Clock Detect (CKDETx) signals.

The CP software check the WRAP bit for the trace buffer wrap around condition. If the WRAP bit was NOT SET then the trace buffer entries are valid from location 0 to the current location pointed by reading TCNTR0 and TCNTR1. If the WRAP was SET then the entire trace buffer is valid with the latest entry being the current location pointed by reading TCNTR0 and TCNTR1. A READ to this address (xD000CH) causes BUS 24 state machine 208 to send "Asynchronous asynchronous halt request" message to target microprocessor 26. The control processor should issue this command only if target microprocessor 26 is in the run mode 62. The read data is unpredictable. A READ to this address (xD000DH) causes state machine 208 to send of the halt command to target microprocessor 26. Target microprocessor 26 is in mode 66 when it receives this command from the control processor. The control processor must preassemble the fast asynchronous halt command in the shadow memory 60 and set up the shadow memory 60 address pointer register prior to issuing this command. The read data is unpredictable. A READ to this address (xD0008H) causes state machine 208 to start of the reset sequence to target microprocessor 26. The control processor must set up other reset conditions prior to issuing this command to state machine 208. The read data is unpredictable. A READ to this address (xD000EH) removes the current interrupt request from ICE 100. The PC/AT 20 reads this address when it is in the interrupt service routine for ICE 100. The read data is unpredictable. A READ to this address (xD000FH) activates the Rearm function that is related to the Passive trace feature. This needs careful investigation. The read data is unpredictable.

A WRITE to these addresses (xD000FH and xD00014H) with dummy data causes the trace Counter address to be CLEARED. The CP issues this command when it wants to capture target system 14 data into the trace buffer 202 starting at location 0. A WRITE to this address (xD0015H) with dummy data causes BUS 24 trace Counter address (on-board 2) to be CLEARED. The CP issues this command when it wants to capture BUS 24 data into BUS 24 trace buffer 202 starting at location 0. The HWLOCK device allows ICE 100 software to READ ICE 100 hardware ID for the purpose of locking a copy of software to a particular ICE 100 hardware. The control processor (PC/AT 20) can read up to 7 bytes of hard coded ID from the HWLOCK device based on the following table.

| ADDRESS | BITS | NAME | ASSIGNMENT | |
|---------|------|------|------------|---|
| (PR = 01) | | | | |
| xD0007 | 0-7 | HWLOCK0 | HWLOCK byte 0. | Bit 0-7 |
| xD0017 | 0-7 | HWLOCK1 | HWLOCK byte 1. | Bit 0-7 |
| xD0027 | 0-7 | HWLOCK2 | HWLOCK byte 2. | Bit 0-7 |
| xD0037 | 0-7 | HWLOCK3 | HWLOCK byte 3. | Bit 0-7 |
| xD0047 | 0-7 | HWLOCK4 | HWLOCK byte 4. | Bit 0-7 |
| xD0057 | 0-7 | HWLOCK5 | HWLOCK byte 5. | Bit 0-7 |
| xD0067 | 0-7 | HWLOCK6 | HWLOCK byte 6. | Bit 0-7 |
| xD0077 | 0-7 | HWLOCK7 | HWLOCK byte 7. | Bit 0-7 |

The shadow memory 60 is organized as a 64K×8-bit block of memory. It is mapped into 64K bytes of system memory in PC/AT 20 (xDxxxxH) (e.g., when the page register value equals 02H). shadow memory 60 provides the "handles" for PC/AT 20 to interface to target microprocessor 26 via BUS 24. The target system 14 hardware trace buffer 202 is organized as "8K×32-byte records. Each 32-byte record is captured and stored for each target system clock cycle. The hardware trace buffer 202 occupies four 64K byte pages (PR =8, 9, A, B). The target system 14 hardware trace buffer 202 allows ICE 100 software to reconstruct the target system 14 processor execution path by examining BUS 24. It also allows a user to examine the target system 14 processor bus activity.

It is desirable to locate the time-tag trace buffer 202 as part of the target System Hardware trace buffer 202.

BUS 24 trace buffer 202 is organized as a 64K ×4 byte records. Each 4-byte record is captured and stored for each control store target system 14 clock cycle. BUS 24 trace buffer 202 occupies four 64K byte pages (PR=0C, 0D, 0E, 0F). BUS 24 trace buffer 202 allows ICE 100 software to implement advance ICE feature such as performance analysis.

BUS 24 matchword is organized as three 64K×5 bit sections. It occupies three 64K byte pages (PR=10, 11, 12) and can be classified as follows: 1) First stage, lower 16-bit BUS 24 detection 2) First stage, upper 16-bit BUS 24 detection 3) Second stage BUS 24 matchword detection The first 64K byte page (PR=10) is assigned to the first stage, lower 16-bit BUS 24 address detection.

The five-bit output of the first stage, lower 16-bit BUS 24 matchword detection is routed into the second stage of BUS 24 matchword detection circuit 210. The second 64K byte page (PR=11) is assigned to the first stage, upper 16-bit BUS 24 address detection.

The five-bit output of the first stage, upper 16-bit BUS 24 matchword detection is routed into the second stage of BUS 24 matchword detection circuit 210. The third 64K byte page (PR=12) is assigned to the second stage of BUS 24 address detection.

The address matchword is organized as three 64K×5 bit sections. It occupies three 64K byte pages (PR=14, 15, 16) and can be classified as follows:
1) First stage, lower 16-bit detection;
2) First stage, upper 16-bit address bus detection; and
3) Second stage address bus matchword detection.

The first 64K byte page (PR=14) is assigned to the first stage, lower 16-bit address bus address detection.

The 16-bit address input the first stage, lower 16-bit address bus matchword detection is assigned as follows:

| address | Assignment |
|---------|------------|
| 15-0 | address bus bit 15-0 |

The five-bit output of the first stage, lower 16-bit address bus matchword detection is routed into the second stage the address bus matchword detection circuit 210.

The second 64K byte page (PR=15) is assigned to the first stage, upper 16-bit address bus address detection.

The 16-bit address input the first stage, upper 16-bit address bus matchword detection is assigned as follows:

| address | Assignment |
|---------|------------|
| 15-0 | address bus bit 31-16 |

The five-bit output of the first stage, upper 16-bit address bus matchword detection is routed into the second stage the address bus matchword detection circuit 210.

The third 64K byte page (PR=16) is assigned to the second stage the address bus address detection. The 16-bit address input the second stage address bus matchword detection is assigned as follows:

| address | Assignment |
|---|---|
| 4-0 | LOWER 16-bit address bus detection bit 4-0 |
| 9-5 | UPPER 16-bit address bus detection bit 4-0 |
| 10 | Qualifier: BE0 |
| 11 | Qualifier: BE1 |
| 12 | Qualifier: BE2 |
| 13 | Qualifier: BE3 |
| 14 | Qualifier: reserved |
| 15 | Qualifier: reserved |

The Qualifier bit assignment can be changed to ease the software programming. It is investigated prior to finalizing the hardware design. The five-bit output of the address bus matchword indicates one of the 31 available matchword detection the address bus. It is routed to the input of multi-level trigger/store control mechanism 208. The Data matchword is organized as three 64K×5 bit sections. It occupies three 64K byte pages (PR=18, 19, 1A). and can be classified as follows:
1) First stage, lower 16-bit Data bus detection;
2) First stage, upper 16-bit Data bus detection;
3) Second stage Data bus matchword detection.

The first 64K byte page (PR=18) is assigned to the first stage, lower 16-bit Data bus address detection.

The 16-bit address input the first stage, lower 16-bit Data bus matchword detection is assigned as follows:

| address | Assignment |
|---|---|
| 15-0 | Data bus bit 15-0 |

The five-bit output of the first stage, lower 16-bit Data bus matchword detection is routed into the second stage the data bus matchword detection circuit 210.

The second 64K byte page (PR=19) is assigned to the first stage, upper 16-bit Data bus address detection. The 16-bit address input the first stage, upper 16-bit Data bus matchword detection is assigned as follows:

| address | Assignment |
|---|---|
| 15-0 | Data bus bit 31-16 |

The five-bit output of the first stage, upper 16-bit Data bus matchword detection is routed into the second stage the data bus matchword detection circuit 210. The third 64K byte page (PR=1A) is assigned to the second stage the data bus address detection.

The 16-bit address input the second stage Data bus matchword detection is assigned as follows:

| address | assignment |
|---|---|
| 4-0 | LOWER 16-bit Data bus detection bit 4-0 |
| 9-5 | UPPER 16-bit Data bus detection bit 4-0 |
| 10 | Qualifier: BE0 |
| 11 | Qualifier: BE1 |
| 12 | Qualifier: BE2 |
| 13 | Qualifier: BE3 |
| 14 | Qualifier: reserved |
| 15 | Qualifier: reserved |

The Qualifier bit assignment can be changed to ease the software programming. It is investigated prior to finalizing the hardware design.

The five-bit output of the data bus matchword indicates one of the 31 available matchword detection the data bus. It is routed to the input of multi-level trigger/store control mechanism 208.

The wide bus matchword detection is organized as one 64K×5 bit sections It occupies one 64K byte pages (PR=1C). The 16-bit address input the wide bus matchword detection is assigned as follows:

| address | assignment |
|---|---|
| 4-0 | Data matchword bit 4-0 |
| 9-5 | address matchword bit 4-0 |
| 10 | μP C/D signal |
| 11 | μP W/R signal |
| 12 | μP READY signal |
| 13 | μP WAIT* signal |
| 14 | μP DMA* signal |
| 15 | μP Valid Cycle |

The bit assignment can be changed to ease the software programming. It is investigated prior to finalizing the hardware design.

The five-bit output of the wide bus matchword indicates one of the 31 available matchword detection the wide bus.

The multi-level trigger/Store control is organized as a 256K×16-bit memory array. It occupies eight 64K byte pages (PR=20-27). Each page of 64K byte can be thought of as a 32K×16-bit array.

The 18-bit address input the multi-level trigger/Store control RAM-based state machine 208 is assigned as follows:

| address | Assignment |
|---|---|
| 4-0 | BUS 24 matchword bit 4-0 |
| 9-5 | wide bus matchword bit 4-0 |
| 10 | Discrete External matchword |
| 11 | trigger Input |
| 12 | MUX for DACK3-0 and INTR (9) |
| 13 | Pass Counter TC |
| 17-14 | PSTATE 3-0. Define the PRESENT STATE |

The 16-bit data output of the multi-level trigger/Store control RAM-based state machine 208 is assigned as follows:

| Data | Assignment |
|---|---|
| 3-0 | NSTATE 3-0. Define the NEXT STATE |
| 4 | PCNTCTL. Pass Counter control (Enable/Load) |
| 5 | BUS 24 Store control |
| 6 | wide bus Store control |
| 7 | BREAK. To stop of the Intel i960 CA |
| 8 | trigger out |
| 12-9 | SEL 3-0. Four-bit selection of DACKx and INTRy |
| 15-13 | No physical memory exists for these bits |

The pass counter RAM is organized as a 16×16-bit memory array. It occupies the first 32 bytes of one 64K byte pages (PR=1D). The even and odd bytes the memory are mapped into the lower and the upper byte the pass counter respectively. The pass counter can be loaded with different value at each level. These values are preprogrammed by software prior to activating the multi-level trigger/Store control state machine 208.

Software Programming

The following describes the hardware/software interaction within the system. ICE 100 software can update the page register by writing to the I/O address for this register. The software can read the content of the page register for verification. By writing and reading the page register the software can check if ICE 100 is not functional. If the software can not read back the previous written value then one or more the following is true.
1) ICE 100 power is OFF;
2) The I/O address jumper setting on ICE 100 is wrong; and
3) ICE 100 is NOT functional.

Even if the software can write and read the functional. The PR7-0 page register bits is written with 01 to enable the memory mapped I/O register page into the DxxxxH 64K window.

To access the memory mapped I/O registers, ICE 100 software should follow this sequence:
1) Set PR7-0 to be 01;
2) The memory mapped I/O register page is mapped into D0000H-DFFFFH; and
3) Start accessing (Read or Write) the memory mapped I/O registers. All memory mapped I/O inputs are read only and outputs are written only. ICE 100 software 4 must maintain an image of all output registers in the internal RAM.

The PR7-0 page register bits is written with 02 to enable the shadow memory 60 into the DxxxxH 64K window. To access the shadow memory 60, ICE 100 software should follow this sequence:
1) Set PR7-0 to be 02;
2) The shadow memory 60 is mapped into D0000H-DFFFFH; and
3) Start accessing (Read or Write) the shadow memory 60.

The shadow memory 60 is available to the control processor only if a halt command is not being sent to target microprocessor 26 by BUS 24 state machine 208.

Before accessing the shadow memory 60, the PC/AT 20 must poll the status register to determine if the shadow memory 60 is available.

The CP can not access the shadow memory 60 when it is being used by BUS 24 state machine 208 to communicate with target microprocessor 26. If the CP writes into shadow memory 60 during this time, the written data is lost. If the CP reads the shadow memory 60 during this time, the read data is invalid (FF).

The PR7-0 page register bits are written with the correct page (08H-0BH) to enable the target system 14 hardware trace buffer 202 into the DxxxxH 64K window.

The target system 14 hardware trace buffer 202 comprises four contiguous 2k×32 byte sections. Each section is mapped into the PC/AT 20 64K byte window with its own page number.

The trace buffer 202 memory is available to the control processor only if it is not being used to "trace" the target system 14 information. The CP controls who can access the trace buffer 202. If the ARMTRACE (SMCR0 bit 0) signal equals 0 then the CP can access the trace buffer 202. If the ARMTRACE signal equals 1 then the trace buffer 202 belongs to the target system 14.

BUS 24 trace buffer 202 memory is available to the control processor only if it is not being used to "trace" the target system 14 BUS 24 information. The CP controls who can access BUS 24 trace buffer 202. If the IB_TRACE (EXP3CR0 bit 0) signal equals 0 then the CP can access BUS 24 trace buffer 202. If the IB TRACE signal equals 1 then BUS 24 trace buffer 202 belongs to the target system 14.

Data matchword detection RAM is available to the control processor only if it is not being used to "detect" the target system 14 data address information. The control processor controls who can access the Data matchword Detection RAM. If the DETECT (EXP3CR0 bit 1) signal equals 0 then the control processor can access the Data matchword Detection RAM. If the DETECT signal equals 1 then the Data matchword Detection belongs to the target system 14.

If the control processor writes into the Data matchword Detection RAM when DETECT=1, the written data is lost. If the control processor reads the Data matchword Detection RAM when DETECT equals 1, the read data is invalid (FF).

The PR7-0 page register bits are written with the correct page (1C) to enable the wide bus matchword Detection RAM into the DxxxxH 64K window. (This refers to wide bus of the address, data, and control signals of the target microprocessor, which is essentially all signals.)

The wide bus matchword detection RAM is available to the control processor only if it is not being used to "detect" the target system 14 wide bus address information. The control processor controls who can access the wide bus matchword Detection RAM. If the DETECT (EXP3CR0 bit 1) signal equals 0 then the control processor can access the trace buffer 202. If the DETECT signal equals 1 then the wide bus matchword Detection belongs to the target system 14.

If the control processor writes into the wide bus matchword Detection RAM when DETECT=1, the written data is lost. If the control processor reads the wide bus matchword detection RAM when DETECT equals 1, the read data is invalid (FF).

The PR7-0 page register bits are written with the correct page (1D) to enable the Pass Counter RAM into the DxxxxH 64K window.

The Pass Counter RAM is available to the control processor only if it is not being used to 12 "Detect" the target system 14 trigger/Store control information. The control processor controls who can access the Pass Counter RAM. If the DETECT (EXP3CR0 bit 1) signal equals 0 then the control processor can access the Pass Counter RAM. If the DETECT signal equals 1 then the Pass Counter can not be accessed by the control processor.

If the control processor writes into Pass Counter RAM when DETECT=1, the written data is lost. If the control processor reads the Pass Counter RAM when DETECT equals 1, the read data is invalid (FF).

The PR7-0 page register bits are written with the correct page (20H-27H) to enable the multi-level trigger/Store control state machine 208 RAM into the DxxxxH 64K window.

The multi-level trigger/Store control state machine 208 RAM comprises eight contiguous 32K×2 byte sections. Each section is mapped into the PC/AT 20 64K byte window with its own page number.

The multi-level trigger/Store control state machine 208 RAM is available to the control processor only if it is not being used to "Detect" the target system 14 trigger/Store control information. The control processor controls who can access the multi-level trigger/Store control state machine 208 RAM. If the DETECT (EXP3CR0 bit 1) signal equals 0 then the control processor can access the multi-level trigger/Store control state machine 208 RAM. If the DETECT signal equals 1 then the Multilevel trigger/Store control state machine 208 RAM can not be accessed by the control processor.

If the control processor writes into the multi-level trigger/Store control state machine 208 RAM when DETECT=1, the written data is lost. If the control processor reads the multi-level trigger/Store control state machine 208 RAM when DETECT equals 1, the read data is invalid (FF).

There are 64K bytes of shadow memory 60 in ICE 100 system. The first 44K bytes (AFFF-0000) are dedicated to several predefined functions. The remaining 20K bytes (FFFF-B000) of shadow memory 60 are available to is used by ICE 100. ICE 100 uses a portion of this area to compose commands 71. Commands 71 are set to target microprocessor 26 during mode 66 with the assistance of BUS 24 state machine 208. The commands 71 are sent to target microprocessor 26 using the following sequence assuming that target microprocessor 26 is in mode 66:

1) The PC/AT 20 monitors the CDONE signal (SMSR0 register bit 5) until the shadow memory 60 is available to be accessed by the PC/AT 20;
2) The PC/AT 20 creates the halt command and fills the designated shadow memory 60 with this halt command;
3) The PC/AT 20 programs the shadow memory address counter 76 registers with the starting address of the halt command in the shadow memory 60;
4) The PC/AT 20 issues the "Send mode 66 command" to the control state machine 208 by reading address D000DH with PR=01 (CREQ);
5) state machine 208 has the completion the halt command transfer; and
6) The PC/AT 20 must monitor state machine 208 status to determine if the previous command was sent before setting up and issuing another halt command:

The Code coverage feature are implemented by utilizing BUS 24 matchword detection circuitry, the multilevel trigger/store control circuitry and BUS 24 trace buffer 202.

The software invokes the following sequence:
1) set up BUS 24 matchword detection circuitry to detect all CALL addresses. A user can specify an optional exclusion list of CALL addresses to filter out unwanted functions such as timing wait-loop etc.;
2) program the multi-level trigger and store control circuitry to store all CALL addresses on BUS 24 into BUS 24 trace buffer 202;
3) program the condition to stop BUS 24 trace buffer 202 depending on a user input. e.g., Stop tracing when the trace buffer 202 is full OR some other condition exists; and
4) after tracing is completed, the FUNCTION level code 17 coverage feature is derived by (software) analyzing BUS 24 trace buffer 202 data. This data can then be presented to a user as the code coverage data.

The software can optionally capture multiple traces of data to provide code coverage for a longer time period.

There are two type of histograms: address histogram and time histogram.

The address histogram feature is implemented by utilizing BUS 24 matchword detection circuitry, the multilevel trigger/store control circuitry and BUS 24 trace buffer 202.

The software invoke the following sequence:
1) Set up BUS 24 matchword detection circuitry to detect a list of up to 16 CALL addresses;
2) Program the multi-level trigger and store control circuitry to store the above list of CALL addresses on BUS 24 into BUS 24 trace buffer 202;
3) Program the condition to stop BUS 24 trace buffer 202 depending on a user input. e.g., Stop tracing when the trace buffer 202 is full OR some other condition exists; and
4) After tracing is completed, the software create a bar chart using BUS 24 trace buffer 202 data. The FUNCTION address Histogram feature is presented to a user using the above information.

The time histogram feature is implemented by utilizing BUS 24 matchword detection circuitry, the multilevel trigger/store control circuitry and BUS 24 trace buffer 202.

The software invoke the following sequence:
1) Set up BUS 24 matchword detection circuitry to detect a list of up to 16 CALL and RETURN pair addresses;
2) Program the multi-level trigger and store control circuitry to store the above list of CALL and RETURN addresses on BUS 24 into BUS 24 trace buffer 202;
3) Program the condition to stop BUS 24 trace buffer 202 depending on a user input. e.g., Stop tracing when the trace buffer 202 is full OR some other condition exists; and
4) After tracing is completed, the software correlates each CALL and RETURN pair and the time-tag information to provide a user minimum, maximum, mean and average execution for each function.

The time-tag is captured and stored at the same time the CALLs and RETURNs are stored on BUS 24.

The Time Measurement Between Two Points Of Execution feature is implemented by utilizing the two internal instruction breakpoints of the Intel i960 CA processor.

The software invokes the following sequence:
1) Load the first address into the Intel i960 CA first instruction breakpoint register;
2) Load the second address into the Intel i960 CA second instruction breakpoint register;
3) Program the Intel i960 CA to generate BREAK EVENTS for the two instruction breakpoints;
4) Program BUS 24 matchword to detect BREAK EVENTS generated by the Intel i960 CA instruction breakpoint registers;
5) Program the multi-level trigger and store control circuit to store the instruction BREAK EVENTS on BUS 24 into BUS 24 trace buffer 202;
6) Program the condition to stop BUS 24 trace buffer 202 depending on a user input. e.g., Stop tracing when the trace buffer 202 is full OR some other condition exists;
7) After tracing is completed, the software correlates 19 BREAK EVENTS and the time-tag information to provide a user minimum, maximum, mean and average time measurements between two points of execution.

The time-tag is captured and stored at the same time the BREAK EVENTS are stored on BUS 24.

Programming the state machine 208 comprises loading the proper data bit patterns into state machine 208 RAM, based on a user-defined setup, such that the desired data outputs appears when given a particular address input pattern.

The following guideline should be kept in mind when programming state machine 208:

1) The setup at each level is independent of the other levels;
2) Any unused level (not branched to by a user-defined setup) is defaulted to a known state that force state machine 208 back to level 0, the starting level;
3) Any state machine 208 inputs not causing a level change must sample the present level. This is how state machine 208 remains at a particular level while waiting for a branch condition; and
4) Once the trigger state (level 15) is entered state machine 208 is programmed to remain there until one of the external conditions (e.g., position counter 82 TC) forces it to return to state 0.

The matchword detection circuit 210 has multiple outputs for the level triggering scheme that is different from the original approach.

Although the present invention has been described in terms of the presently first embodiments, it is to be understood that the disclosure is not to be interpreted as limiting. Various alterations and modifications no doubt become apparent to those skilled in the art after having read the above disclosure. Accordingly, it is intended that the appended claims be interpreted as covering all alterations and modifications as fall within the true spirit and scope the invention.

What is claimed is:

1. An in-circuit emulator (ICE) for connection with a target system, comprising:
   umbilical means for connecting the target system to a microprocessor;
   a low level control interface with means for accessing and modifying a target system memory, means for displaying and modifying a set of target system processor registers, means for hardware and software breakpointing to said target system, means for single and multiple stepping said target system and means for disassembling machine code into assembly code resident in a set of memory locations in said target system, the low level control interface being connected in communication with the umbilical means;
   clocking means for triggering a circuit analyzer according to comparisons between user-defined external bits and trace signals derived from the target system, the clocking means being connected in communication with the umbilical means; and
   in-line assembler/disassembler means coupled to said target system memory for examining and changing memory locations in the target system through the use of mnemonics communicated to a user such that a program machine code can be patched and tested, wherein the readability of program memory by a user is improved.

2. The ICE of claim 1, wherein:
   the umbilical means comprises a single continuous flexible circuit with a target system connector, an interface pod proximate to said target system connector and means for connection to ICE, wherein each of said target system connector, said interface pod and ICE connection means have a rigid printed circuit board section layered onto said single flexible circuit.

3. A method of in-circuit emulation with a bond-out chip temporarily connected to a vacant microprocessor socket in a target system to provide debug visibility of execution of instructions from an on-board target microprocessor cache memory, comprising the steps of:
   collecting trace data from a bond-out interface of said bond-out chip which provides a deterministic, yet discontinuous address stream during execution of a target system machine code program in said bond-out chip with an umbilical cable that attaches to said vacant target system microprocessor socket and that communicates said target system trace data to a trace buffer;
   disassembling said trace data in said trace buffer into an assembler code representation;
   displaying said assembler code using assembler mnemonics on a computer terminal screen for reading by a user with a means to scroll through said assembler code display;
   displaying on said screen at least one line of a source code program that compiles into said assembler source code; and
   highlighting a particular line of said displayed source code program that generates in compiling a particular line of assembler code then displayed and selected on said screen.

4. The method of claim 3, wherein:
   the displaying is such that said mnemonics comprise those that are substantially similar to mnemonics associated with a particular commercial brand of target system microprocessor.

5. A method of reconstructing the path of execution from information present on a special bond-out interface bus of a microprocessor bond-out chip substituted for a target microprocessor during target program execution, comprising the steps of:
   reading from said bond-out interface bus a discontinuous address stream that comprises program branch data that corresponds to jumps and/or calls executed during a debugging of said target program in said target system;
   interpolating from said program branch data a sequence of machine level execution cycles that must necessarily occur for a particular type of target microprocessor between at least two points in said target program identified by said program branch data; and
   disassembling said sequence of machine level execution cycles into a corresponding sequence of assembler source code statements.

6. A method of buffering and latching digital data from a device-under-test (DUT) synchronous with a clock from the DUT to a memory device where device propagation delays caused by the buffering are substantial in relation to data hold times required for the latching, the method comprising the steps of:
   buffering said DUT clock to reduce loading on said DUT and to provide a buffered DUT clock output;
   buffering said DUT data to reduce loading on said DUT and to provide a buffered DUT data output;
   generating from said buffered DUT clock output a local clock synchronous to said DUT clock with means able to track substantial variations in said frequency of said DUT clock, said local clock leading said buffered DUT clock output by a predetermined and fixed period of time; and latching said buffered DUT data output using said local clock, said predetermined and fixed period of time being such that said latching satisfies a data setup and a data hold time associated with said memory device.

7. An in-circuit emulator (ICE) for connection to a target system the ICE comprising:

umbilical means for connecting said ICE in between said target system and a target microprocessor, the umbilical means being on a single continuous flexible circuit and having a target system connector, an interface pod proximate to said target system connector and means for connection to said ICE; and each of said target system connector, said interface pod and said ICE connection means including rigid printed circuit board laminations on said single flexible circuit, wherein the umbilical means provides a single continuous flexible circuit that maintains good transmission line characteristics throughout;

a low level control interface with means for accessing and modifying a target system memory, means for displaying and modifying a set of target system processor registers, means for hardware and software breakpointing to said target system, means for single and multiple stepping said target system and means for disassembling machine code into assembly code resident in a set of memory locations in said target system, the low level control interface being connected in communication with the umbilical means;

in-line assembler/disassembler means coupled to said target system memory for examining and changing memory locations in the target system through the use of mnemonics communicated to a user such that a program machine code can be patched and tested, wherein the readability of program memory by a user is improved;

trace data means for collecting trace data from said target system during execution of said target microprocessor program in communication with the umbilical means and for storing said trace data in a trace buffer, the trace data means having, clock buffering means coupled through the umbilical means for buffering a target system clock to reduce loading on said target system, data buffering means coupled through the umbilical means for buffering said target system data to reduce loading on said target system, oscillator means coupled through the umbilical means for generating a local clock synchronous to said target system clock, said local clock able to track substantial variations in said frequency said target system clock, said local clock leading said buffered target system clock by a predetermined and fixed period of time, and latch means coupled to said data buffering means for latching buffered target system data with said local clock;

program branch reading means coupled to said target system processor through the umbilical means for reading program branch data that corresponds to jumps and/or calls taken by said target microprocessor;

interpolating means coupled to the program branch reading means for interpolating from said program branch data a sequence of machine level execution cycles that necessarily occur between at least two points in said target microprocessor program that are identified by said program branch data;

program machine code disassembly means coupled to the trace data means for disassembling said trace data and interpolations and for presenting said result in assembler mnemonics;

screen monitor display means coupled to the program machine code disassembly means for displaying said assembler mnemonics on a computer terminal screen for reading by a user with a means to scroll through said assembler code display;

source code display means coupled to the program machine code disassembly means for displaying on said computer terminal screen at least one line of a source code program that compiles into said assembler source code; and outlining means coupled to the source code display means for highlighting a particular line of said displayed source code program.

8. An apparatus for diagnosing program execution in a microprocessor having an on-chip cache memory and a bond-out interface that provides a deterministic address stream that communicates externally an instruction pointer, at a minimum, when said microprocessor advances to a new sequential address, the apparatus comprising:

execution path reconstruction means coupled to said bond-out interface for reconstructing a path of execution from a discontinuous address trace, the execution path reconstruction means having means to read machine code instructions into a target memory;

machine code disassembly means coupled to the execution path reconstruction means for disassembling said machine code instructions into assembler code;

monitor means coupled to the machine code disassembly means for displaying to a user a set of disassembled machine code instructions with corresponding program memory addresses; and indexing means coupled to the machine code disassembly means for determining a number to add to an instruction pointer index such that a pointer displayed on the monitor means can indicate an address of a next instruction to be disassembled to said user; and annunciation means coupled to the machine code disassembly means for issuing a special flag when said microprocessor executes any one of a call, a return, a branch and an interrupt.

9. The apparatus of claim 8, further comprising:

a synchronized output signal means coupled to said microprocessor and having an ICE internal time-tag counter for externally synchronizing an additional ICE, wherein multi-processor in-circuit emulation is provided.

* * * * *